(12) United States Patent
Woodgate et al.

(10) Patent No.: US 10,408,992 B2
(45) Date of Patent: Sep. 10, 2019

(54) SEGMENTED IMAGING DIRECTIONAL BACKLIGHTS

(71) Applicant: RealD Spark, LLC, Beverly Hills, CA (US)

(72) Inventors: Graham J. Woodgate, Henley on Thames (GB); Michael G. Robinson, Boulder, CO (US); Jonathan Harrold, Leamington Spa (GB); Robert Ramsey, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 15/940,252

(22) Filed: Mar. 29, 2018

(65) Prior Publication Data
US 2018/0284341 A1    Oct. 4, 2018

Related U.S. Application Data

(60) Provisional application No. 62/480,852, filed on Apr. 3, 2017.

(51) Int. Cl.
F21V 8/00    (2006.01)

(52) U.S. Cl.
CPC ......... *G02B 6/0078* (2013.01); *G02B 6/0048* (2013.01); *G02B 6/0055* (2013.01); *G02B 6/0056* (2013.01); *G02B 6/0068* (2013.01)

(58) Field of Classification Search
None
See application file for complete search history.

(56) References Cited

U.S. PATENT DOCUMENTS

| 1,128,979 A | 2/1915 | Hess |
|---|---|---|
| 1,970,311 A | 8/1934 | Ives |

(Continued)

FOREIGN PATENT DOCUMENTS

| CN | 1142869 A | 2/1997 |
|---|---|---|
| CN | 1377453 A | 10/2002 |

(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.

(Continued)

*Primary Examiner* — Jerry Rahll
(74) *Attorney, Agent, or Firm* — Penny L. Lowry; Neil G. J. Mothew

(57) ABSTRACT

An imaging directional backlight apparatus includes a waveguide and a light source array, providing large area directed illumination from localized light sources. The waveguide may include a stepped structure, and the steps may further include extraction features optically hidden to guided light, propagating in a forward direction. Returning light propagating in a backward direction may be refracted, diffracted, or reflected by the features to provide discrete illumination beams exiting from the top surface of the waveguide. Viewing windows are formed through imaging individual light sources and define the relative positions of system elements and ray paths. The imaging directional backlight apparatus further includes multiple waveguides with light extraction features arranged to provide uniform output luminance at the seam between the waveguides.

45 Claims, 53 Drawing Sheets

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,172,723 B1 | 1/2001 | Inoue et al. |
| 6,199,995 B1 | 3/2001 | Umemoto et al. |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,488 B2 | 1/2005 | Travis |
| 6,859,240 B1 | 2/2005 | Brown et al. |
| 6,867,828 B2 | 3/2005 | Taira et al. |
| 7,001,058 B2 | 2/2006 | Inditsky |
| 7,058,252 B2 | 6/2006 | Woodgate et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,524,053 B2 | 4/2009 | Lipton |
| 7,528,893 B2 | 5/2009 | Schultz et al. |
| 7,545,429 B2 | 6/2009 | Travis |
| 7,614,777 B2 | 11/2009 | Koganezawa et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,698 B2 | 9/2010 | Segawa |
| 7,798,699 B2 | 9/2010 | Laitinen et al. |
| 7,864,253 B2 | 1/2011 | Tajiri |
| 8,016,475 B2 | 9/2011 | Travis |
| 8,223,296 B2 | 7/2012 | Lee et al. |
| 8,556,491 B2 | 10/2013 | Lee |
| 8,684,588 B2 | 4/2014 | Ajichi et al. |
| 8,760,762 B1 | 6/2014 | Kelly et al. |
| 8,926,112 B2 | 1/2015 | Uchiike et al. |
| 8,942,434 B1 | 1/2015 | Karakotsios et al. |
| 9,197,884 B2 | 11/2015 | Lee et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113866 A1 | 8/2002 | Taniguchi et al. |
| 2003/0117790 A1 | 6/2003 | Lee et al. |
| 2003/0133191 A1 | 7/2003 | Morita et al. |
| 2003/0137821 A1 | 7/2003 | Gotoh et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0066480 A1 | 4/2004 | Yoshida et al. |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0267040 A1 | 11/2006 | Baek et al. |

(56) References Cited

U.S. PATENT DOCUMENTS

| | | |
|---|---|---|
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0055221 A1 | 3/2008 | Yabuta et al. |
| 2008/0079662 A1 | 4/2008 | Saishu et al. |
| 2008/0084519 A1 | 4/2008 | Brigham et al. |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316303 A1 | 12/2008 | Chiu et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0161368 A1 | 6/2009 | Pakhchyan et al. |
| 2009/0167651 A1 | 7/2009 | Benitez et al. |
| 2009/0168459 A1 | 7/2009 | Holman et al. |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0002169 A1 | 1/2010 | Kuramitsu et al. |
| 2010/0033558 A1 | 2/2010 | Horie et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |
| 2010/0103649 A1 | 4/2010 | Hamada |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0044056 A1 | 2/2011 | Travis et al. |
| 2011/0044579 A1 | 2/2011 | Travis et al. |
| 2011/0051225 A1 | 3/2011 | Pakhchyan et al. |
| 2011/0051237 A1 | 3/2011 | Hasegawa et al. |
| 2011/0115997 A1 | 5/2011 | Kim |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0219180 A1 | 8/2012 | Mehra |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0314145 A1 | 12/2012 | Robinson |
| 2012/0327101 A1 | 12/2012 | Blixt et al. |
| 2012/0327172 A1 | 12/2012 | El-Saban et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0265625 A1 | 10/2013 | Fäcke et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308339 A1* | 11/2013 | Woodgate ............ G02B 6/0078 362/609 |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |

(56) References Cited

U.S. PATENT DOCUMENTS

| | | |
|---|---|---|
| 2014/0126238 A1 | 5/2014 | Kao et al. |
| 2014/0126239 A1 | 5/2014 | Huang et al. |
| 2014/0240344 A1 | 8/2014 | Tomono et al. |
| 2014/0240828 A1 | 8/2014 | Robinson et al. |
| 2014/0267584 A1 | 9/2014 | Atzpadin et al. |
| 2014/0340728 A1 | 11/2014 | Taheri |
| 2014/0368602 A1 | 12/2014 | Woodgate et al. |
| 2015/0116212 A1 | 4/2015 | Freed et al. |
| 2015/0160404 A1 | 6/2015 | Robinson et al. |
| 2015/0177447 A1 | 6/2015 | Woodgate et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |
| 2017/0336661 A1 | 11/2017 | Harrold et al. |
| 2017/0339398 A1 | 11/2017 | Woodgate et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1826553 A | 8/2006 |
| CN | 1900785 A | 1/2007 |
| CN | 1908753 A | 2/2007 |
| CN | 101029975 A | 9/2007 |
| CN | 101049028 A | 10/2007 |
| CN | 101114080 A | 1/2008 |
| CN | 101142823 A | 3/2008 |
| CN | 101266338 A | 9/2008 |
| CN | 102147079 A | 8/2011 |
| EP | 0653891 A1 | 5/1995 |
| EP | 0830984 A2 | 3/1998 |
| EP | 0860729 A2 | 8/1998 |
| EP | 0939273 A1 | 9/1999 |
| EP | 1394593 A1 | 3/2004 |
| EP | 2219067 A1 | 8/2010 |
| EP | 2451180 A2 | 5/2012 |
| GB | 2405542 | 2/2005 |
| JP | H10142556 A | 5/1998 |
| JP | 2003215705 A | 7/2003 |
| JP | 2005181914 A | 7/2005 |
| JP | 2006010935 A | 1/2006 |
| JP | 2007094035 A | 4/2007 |
| JP | 2007109255 A | 4/2007 |
| JP | 2007273288 A | 10/2007 |
| JP | 2008204874 A | 9/2008 |
| JP | 2010160527 A | 7/2010 |
| JP | 2012060607 A | 3/2012 |
| JP | 2013015619 | 1/2013 |
| KR | 20090932304 | 12/2009 |
| KR | 20110006773 A | 1/2011 |
| KR | 20110017918 A | 2/2011 |
| KR | 20120049890 A | 5/2012 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001061241 A1 | 8/2001 |
| WO | 2007111436 A1 | 10/2007 |
| WO | 2011020962 A1 | 2/2011 |
| WO | 2012158574 A1 | 11/2012 |

OTHER PUBLICATIONS

Bahadur, "Liquid crystals applications and uses," World Scientific, vol. 1, pp. 178 (1990).

Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].

Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].

Cootes et al., "Active Appearance Models", IEEE Trans. Pattern Analysis and Machine Intelligence, 23(6):681-685, 2001.

Cootes et al., "Active Shape Models—Their Training and Application" Computer Vision and Image Understanding 61 (1):38-59 Jan. 1995.

Dalal et al., "Histogram of Oriented Gradients for Human Detection", Computer Vision and Pattern Recognition, pp. 886-893, 2005.

Drucker et al., "Support Vector Regression Machines", Advances in Neural Information Processing Systems 9, pp. 155-161, NIPS 1996.

Ho, "Random Decision Forests", Proceedings of the 3rd International Conference on Document Analysis and Recognition, Montreal, QC, pp. 278-282, Aug. 14-16, 1995.

Ian Sexton et al: "Stereoscopic and autostereoscopic display-systems", - IEEE Signal Processing Magazine, May 1, 1999 (May 1, 1999), pp. 85-99, XP055305471, Retrieved from the Internet: RL:http://ieeexplore.ieee.org/iel5/79/16655/00768575.pdf [retrieved on Sep. 26, 2016].

Kalantar, et al. "Backlight Unit With Double Surface Light Emission," J. Soc. Inf. Display, vol. 12, Issue 4, pp. 379-387 (Dec. 2004).

Kononenko et al., "Learning to Look Up: Realtime Monocular Gaze Correction Using Machine Learning", Computer Vision and Pattern Recognition, pp. 4667-4675, 2015.

Languy et al., "Performance comparison of four kinds of flat nonimaging Fresnel lenses made of polycarbonates and polymethyl methacrylate for concentrated photovoltaics", Optics Letters, 36, pp. 2743-2745.

Lipton, "Stereographics: Developers' Handbook", Stereographic Developers Handbook, Jan. 1, 1997, XP002239311, p. 42-49.

Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].

Lowe, "Distinctive Image Features from Scale-Invariant Keypoints", International Journal of Computer Vision 60 (2), pp. 91-110, 2004.

Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].

Marjanovic, M.,"Interlace, Interleave, and Field Dominance," http://www.mir.com/DMG/interl.html, pp. 1-5 (2001).

Ozuysal et al., "Fast Keypoint recognition in Ten Lines of Code", Computer Vision and Pattern Recognition, pp. 1-8, 2007.

Tabiryan et al., "The Promise of Diffractive Waveplates," Optics and Photonics News, vol. 21, Issue 3, pp. 40-45 (Mar. 2010).

Travis, et al. "Backlight for view-sequential autostereo 3D", Microsoft E&DD Applied Sciences, (date unknown), 25 pages.

Travis, et al. "Collimated light from a waveguide for a display," Optics Express, vol. 17, No. 22, pp. 19714-19719 (2009).

Viola and Jones, "Rapid Object Detection using a Boosted Cascade of Simple Features", pp. 1-9 CVPR 2001.

Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.

Zach et al., "A Duality Based Approach for Realtime TV-L1 Optical Flow", Pattern Recognition (Proc. DAGM), 2007, pp. 214-223.

PCT/US2018/025156 International search report and written opinion of international searching authority dated Jul. 17, 2018.

\* cited by examiner

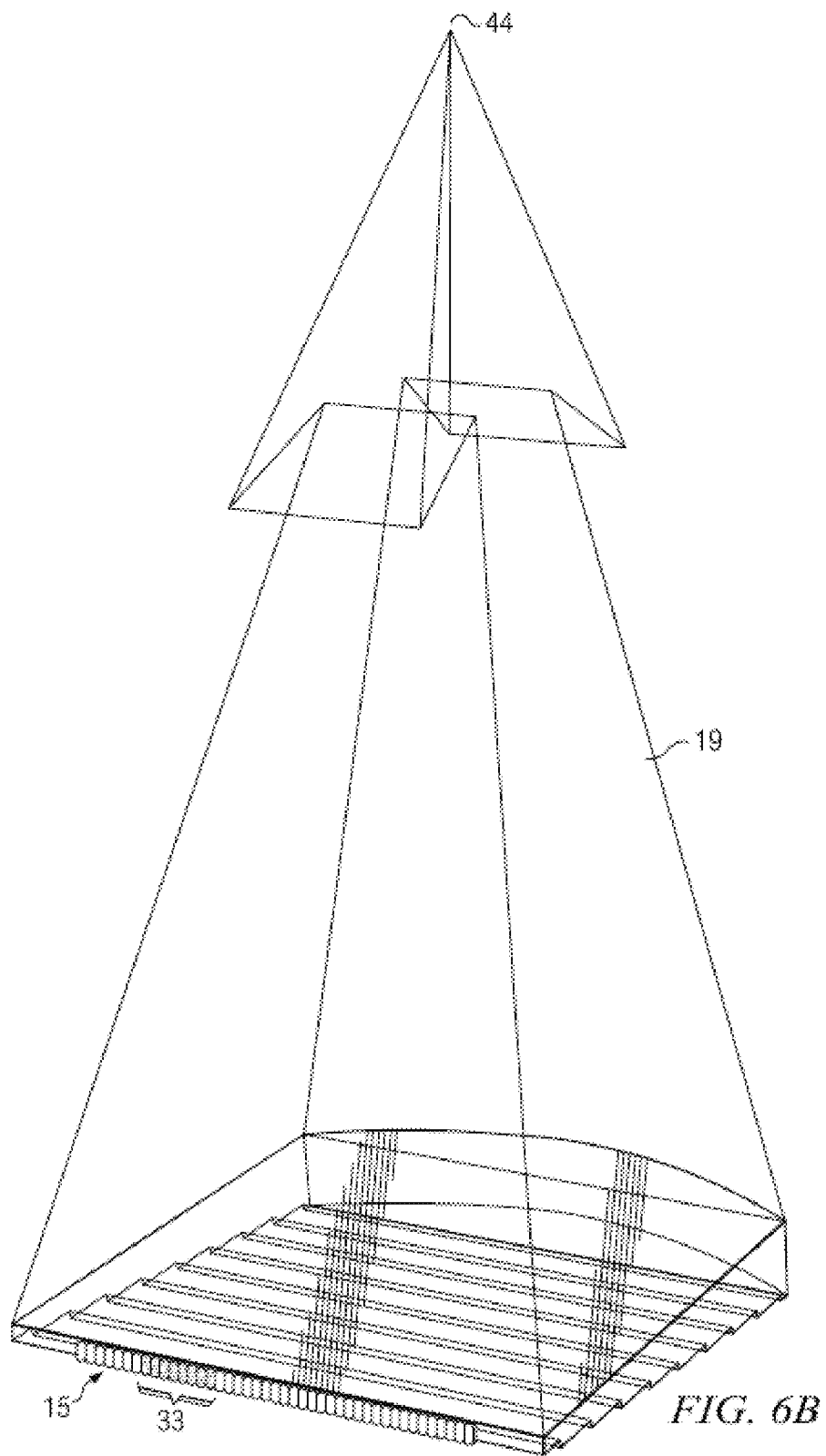

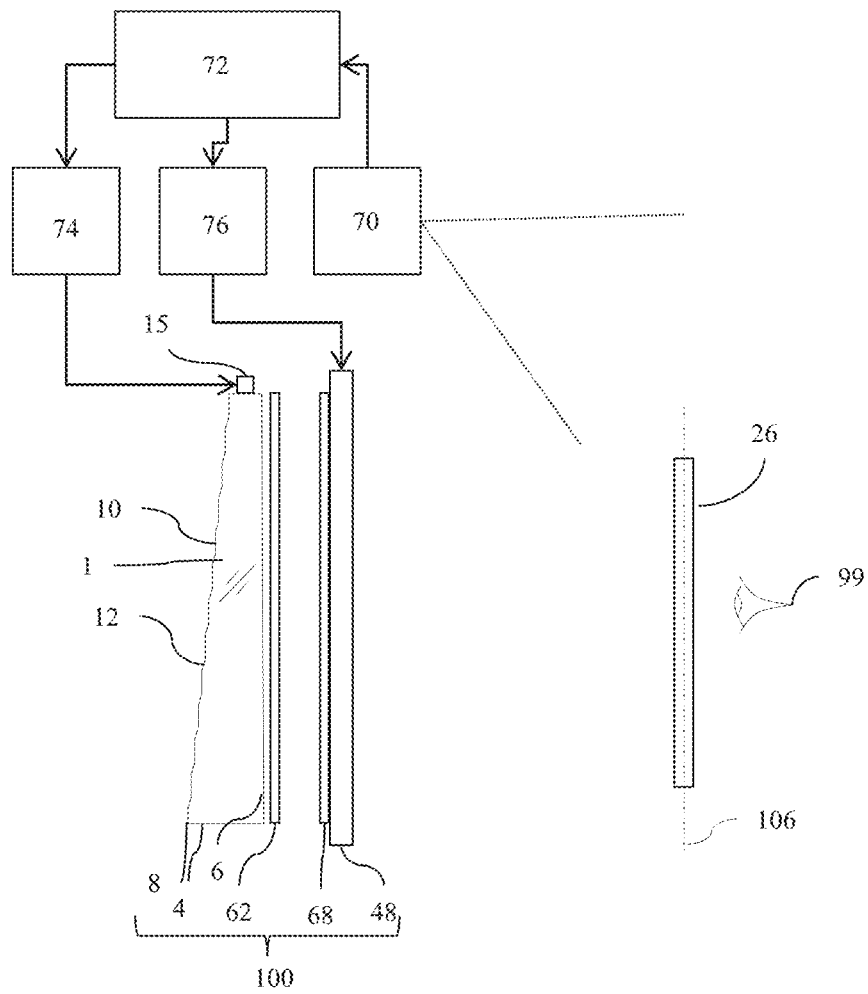
FIG. 11
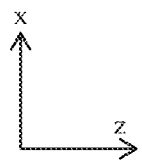

SEGMENTED IMAGING DIRECTIONAL BACKLIGHTS

TECHNICAL FIELD

This disclosure generally relates to illumination of light modulation devices, and more specifically relates to control of directional displays for directional display applications including automotive applications and light guides for providing large area illumination from localized light sources for use in 2D, privacy, night mode, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can compromise addressing electronics in the spatial light modulator.

BRIEF SUMMARY

According to the present disclosure, a directional illumination apparatus may include an imaging directional backlight for directing light and an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is incorporated by reference herein in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. Ideally, no light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure there may be provided a directional display device comprising: plural waveguides, wherein each waveguide comprises: an input end arranged to receive input light; a reflective end; first and second, opposed guide surfaces extending between the input end and the reflective end for guiding light along the waveguide from the input end to the reflective end for reflection of the input light back along the waveguide as reflected input light; and sides extending between the opposed guide surfaces and between the input end and the reflective end, wherein the first guide surface is arranged to guide light by total internal reflection, and the second guide surface comprises light extraction features and intermediate regions between the light extraction features, the light extraction features being arranged to deflect the reflected input light in directions allowing exit through the first guide surface as output light, the intermediate regions being arranged to direct light along the waveguide without extraction; and in respect of each of the plural waveguides, an array of light sources disposed at different input positions along the input side of the waveguide and arranged to input input light into the waveguide, a transmissive spatial light modulator, the plural waveguides being arranged in a tiled array alongside each other with the first guide surfaces of the plural waveguides facing the spatial light modulator and the first ends of the plural waveguides on the same side of the array of plural waveguides, the spatial light modulator 48 being arranged to receive and modulate the output light from each of the plural waveguides; the plural waveguides including a first waveguide and a second waveguide that are adjacent, wherein the light extraction features of the second waveguide are shaped differently from the light extraction features of the first waveguide, and, along the sides of the first and second waveguides that are adjacent, the ends of the light extraction features of the second waveguide are aligned angularly with respect to the lateral direction with the ends of the light extraction features of the first waveguide.

Advantageously a directional display with different directionality characteristics in different portions may be provided. Such a display in a privacy mode may provide an image for one user across part of the display while providing substantially no image to a second user. The portions may be switched to wide angle mode wherein both users may see an image from a given portion. Further the waveguides may be arrange such that at the boundary between the portions light extraction features may be arranged to provide substantially the same luminance output on both sides of the boundary, achieving reduced boundary visibility.

In a lateral direction between the sides of the first waveguide, the light extraction features of the first waveguide may be curved and have positive optical power with respect to the reflected input light, and in a lateral direction between the sides of the second waveguide, the light extraction features of the second waveguide may be curved and have negative optical power with respect to the reflected input light.

Advantageously off-axis users may be provided with an image that does not have visibility of image voids in a privacy mode, and other off-axis users do not see light from the privacy portion of the display.

The light extraction features of the first waveguide may be straight and inclined with respect to a lateral direction between the sides of the first waveguide, and in a lateral direction between the sides of the second waveguide, the light extraction features of the second waveguide may be curved and have negative optical power with respect to the reflected input light.

The user in a privacy or wide angle mode for the first portion will see a lateral luminance distribution at the edge of the portion that increases at the edge of the portion when a user moves towards the edge. Advantageously the display luminance varies in a comfortable manner for lateral observer movement.

The first waveguide may be arranged at one end of the array of plural waveguides. Advantageously in an automotive application, reflections from side windows may be reduced. Further off-axis privacy users may conveniently see the near side of the display with a private image.

The reflective end of each of the plural waveguides may have positive optical power in the lateral direction. Advantageously the lateral luminance distribution may be similar for the height of the display.

The reflective end of the first waveguide and the light extraction features of the first waveguide may have respective optical axes that are offset from each other in the lateral direction. Advantageously off-axis use may be provided with reduced or no image voids for the privacy user or degraded privacy performance for at least one other user.

The sides of the first and second waveguides that are adjacent may be separated by a medium having a lower refractive index than the first and second waveguides. The medium that separates the sides of the first and second waveguides that are adjacent may be air. The sides of the first and second waveguides that are adjacent may be separated by a reflective layer.

The waveguides may be optically separated, advantageously achieving independent control of uniformity in wide angle modes of operation.

The first waveguide may be arranged to image the light sources disposed at different input positions along the input side of the first waveguide, in the lateral direction, so that the output light from the first waveguide is directed into respective optical windows in output directions that are distributed in dependence on the input positions of the light sources.

Advantageously a tunable optical window profile may be provided, including for observer position or for switching between privacy and wide angle modes for example.

The directional display may further comprise a rear reflector disposed behind the second guide surface of each of the plural waveguides, the rear reflector comprising an array of reflective facets arranged to reflect reflected input light that is transmitted through the light extraction features of the first and second waveguides, back through the first and second waveguides to exit through the first guide surface, wherein the rear reflector has parts behind each of the plural waveguides and the reflective facets are curved in the lateral direction with different optical power in the parts of the rear reflector behind the first and second waveguides.

Advantageously display luminance and efficiency may be increased while achieving similar optical window imaging to that achieved by the waveguide alone. Further, mixed optical window structures may be achieved, providing increased comfort for an observer moving in the lateral direction.

The spatial light modulator may be arranged to modulate a first polarization component, the directional display device may further comprise a reflective polarizer disposed between the first guide surfaces of the plural waveguide and the spatial light modulator and arranged to transmit the first polarization component and to reflect a second polarization component of the output light that is orthogonal to the first polarization component as rejected light, and the rear reflector may further comprise intermediate facets extending between the reflective facets of the rear reflector and inclined in opposite senses from the reflective facets of the rear reflector in a common plane, so that pairs of a reflective facet and an intermediate facet together form corner facets arranged to reflect the rejected light for supply back to the spatial light modulator, the pairs of a reflective facet and an intermediate facet being inclined in a plane that is oriented around the normal to the spatial light modulator so that the rear reflector converts the second polarization component of the rejected light into the first polarization component on reflection.

Advantageously display luminance and efficiency may be increased. Further, the angular light output in the direction orthogonal to the lateral direction may be provided with increased symmetry, achieving increased uniformity for vertical movement of an observer.

According to a second aspect of the present disclosure there is provided a directional display apparatus comprising: a directional display device according to the first aspect; and a control system arranged to control the light sources.

Advantageously a switchable directional display may be provided. Switching may achieve adjustable optical window profile, including for observer position or for switching between privacy and wide angle modes for example.

According to a third aspect of the present disclosure there is provided a directional display device comprising: plural waveguides, wherein each waveguide comprises: an input end arranged to receive input light; a reflective end; first and second, opposed guide surfaces extending between the input end and the reflective end for guiding light along the waveguide from the input end to the reflective end for reflection of the input light back along the waveguide as reflected input light; and sides extending between the opposed guide surfaces and between the input end and the reflective end, wherein the first guide surface is arranged to guide light by total internal reflection, and the second guide surface comprises light extraction features and intermediate regions between the light extraction features, the light extraction features being arranged to deflect the reflected input light in directions allowing exit through the first guide surface as output light, the intermediate regions being arranged to direct light along the waveguide without extraction; and in respect of each of the plural waveguides, an array of light sources disposed at different input positions along the input side of the waveguide and arranged to input input light into the waveguide, a transmissive spatial light modulator, the plural waveguides being arranged in a tiled array alongside each other with the first guide surfaces of the plural waveguides facing the spatial light modulator and the first ends of the plural waveguides on the same side of the array of plural waveguides, the spatial light modulator 48 being arranged to receive and modulate the output light from each of the plural waveguides; the plural waveguides including a first waveguide and a second waveguide that are adjacent, wherein in a lateral direction between the sides of the first waveguide, the light extraction features of the first waveguide are curved and have positive optical power with respect to the reflected input light, and in a lateral direction between the sides of the second waveguide, the light extraction features of the second waveguide are straight and have zero optical power with respect to the reflected input light, or are curved and have negative optical power with respect to the reflected input light.

Advantageously the lateral luminance profile for the portion of the display that is illuminated by the second waveguide may have a comfortable variation with user position. Further a privacy image may be provided to a user viewing the portion of the display that is illuminated by the first waveguide without image voids. Both portions may be arranged to provide wide angle viewing.

The first waveguide may be arranged at one end of the array of plural waveguides. The reflective end of each of the plural waveguides may have positive optical power in the lateral direction. The reflective end of the first waveguide and the light extraction features of the first waveguide may have respective optical axes that are offset from each other in the lateral direction. In the lateral direction between the sides of the second waveguide, the light extraction features of the second waveguide may have negative optical power with respect to the reflected input light.

The sides of the first and second waveguides that are adjacent may be separated by a medium having a lower refractive index than the first and second waveguides. The medium that separates the sides of the first and second waveguides that are adjacent may be air. The sides of the first and second waveguides that are adjacent may be separated by a reflective layer.

Along the sides of the first and second waveguides that are adjacent, the ends of the light extraction features of the second waveguide may be aligned angularly with respect to the lateral direction with the ends of the light extraction features of the first waveguide. Advantageously, the visibility of the seam between adjacent waveguides may be reduced.

The first waveguide may be arranged to image the light sources disposed at different input positions along the input side of the first waveguide, in the lateral direction, so that the output light from the first waveguide is directed into respective optical windows in output directions that are distributed in dependence on the input positions of the light sources.

The directional display device may further comprise a rear reflector disposed behind the second guide surface of each of the plural waveguides, the rear reflector comprising an array of reflective facets arranged to reflect reflected input light that is transmitted through the light extraction features of the first and second waveguides, back through the first and second waveguides to exit through the first guide surface, wherein the rear reflector has parts behind each of the plural waveguides and the reflective facets are curved in the lateral direction with different optical power in the parts of the rear reflector behind the first and second waveguides.

The spatial light modulator may be arranged to modulate a first polarization component, the directional display device further comprises a reflective polarizer disposed between the first guide surfaces of the plural waveguide and the spatial light modulator and arranged to transmit the first polarization component and to reflect a second polarization component of the output light that is orthogonal to the first polarization component as rejected light, and the rear reflector further comprises intermediate facets extending between the reflective facets of the rear reflector and inclined in opposite senses from the reflective facets of the rear reflector in a common plane, so that pairs of a reflective facet and an intermediate facet together form corner facets arranged to reflect the rejected light for supply back to the spatial light modulator, the pairs of a reflective facet and an intermediate facet being inclined in a plane that is oriented around the normal to the spatial light modulator so that the rear reflector converts the second polarization component of the rejected light into the first polarization component on reflection.

According to a fourth aspect of the present disclosure there is provided a directional display apparatus comprising: a directional display device according to the third aspect; and a control system arranged to control the light sources.

According to a fifth aspect of the present disclosure there is provided a directional display device comprising: plural waveguides, wherein each waveguide comprises: an input end arranged to receive input light; a reflective end; first and second, opposed guide surfaces extending between the input end and the reflective end for guiding light along the waveguide from the input end to the reflective end for reflection of the input light back along the waveguide as reflected input light; and sides extending between the opposed guide surfaces and between the input end and the reflective end, wherein the reflective end has positive optical power in the lateral direction between the sides of the waveguide, and the first guide surface is arranged to guide light by total internal reflection, and the second guide surface comprises light extraction features and intermediate regions between the light extraction features, the light extraction features being arranged to deflect the reflected input light in directions allowing exit through the first guide surface as output light, the intermediate regions being arranged to direct light along the waveguide without extraction; and in respect of each of the plural waveguides, an array of light sources disposed at different input positions along the input side of the waveguide and arranged to input input light into the waveguide, a transmissive spatial light modulator, the plural waveguides being arranged in a tiled array alongside each other with the first guide surfaces of the plural waveguides facing the spatial light modulator and the first ends of the plural waveguides on the same side of the array of plural waveguides, the spatial light modulator being arranged to receive and modulate the output light from each of the plural waveguides; the plural waveguides including a first waveguide and a second waveguide that are adjacent, wherein the light extraction features of the second waveguide are shaped differently from the light extraction features of the first waveguide.

Advantageously the directional output may be arranged to be different for different adjacent portions of the directional display. At least one portion may be provided with a privacy image while another portion may be provided with a wide angle image for a given observer location. The luminance at the boundary of the waveguides may be controlled to minimize visibility. Privacy images may be seen without voids for desirable users (such as passengers in vehicle cabin) and without illumination regions for snoopers (such as a driver for a vehicle cabin).

In a lateral direction between the sides of the first waveguide, the light extraction features of the first waveguide may be curved and have positive optical power with respect to the reflected input light, and the reflective end of the first waveguide and the light extraction features of the first waveguide may have respective optical axes that are offset from each other in the lateral direction. Advantageously off-axis privacy viewing may be provided.

In a lateral direction between the sides of the second waveguide, the light extraction features of the second waveguide may be curved and have negative optical power with respect to the reflected input light. Advantageously boundary visibility between adjacent waveguides may be provided.

In a lateral direction between the sides of the second waveguide, the light extraction features of the second waveguide may be straight. Advantageously comfortable image appearance for observer motion may be provided.

In a lateral direction between the sides of the second waveguide, the light extraction features of the second waveguide may be curved and have positive optical power with respect to the reflected input light. The reflective end of the second waveguide and the light extraction features of the second waveguide may have respective optical axes that are offset from each other in the lateral direction in an opposite sense from the sense in which the optical axes of the reflective end of the first waveguide and the light extraction features of the first waveguide may be offset. The light extraction features of the first waveguide may be straight and inclined with respect to a lateral direction between the sides of the first waveguide. In a lateral direction between the sides of the second waveguide, the light extraction features of the second waveguide may be curved and have negative optical power with respect to the reflected input light. In a lateral direction between the sides of the second waveguide, the light extraction features of the second waveguide may be straight. The light extraction features of the second waveguide may be inclined with respect to the lateral direction between the sides of the second waveguide in an opposite sense from the sense in which the light extraction features of the first waveguide are inclined with respect to the lateral direction between the sides of the first waveguide. The first waveguide may be arranged at one end of the array of plural waveguides. The sides of the first and second waveguides that are adjacent may be separated by a medium having a lower refractive index than the first and second waveguides. The medium that separates the sides of the first and second waveguides that are adjacent may be air. The sides of the first and second waveguides that are adjacent may be separated by a reflective layer. Along the sides of the first and second waveguides that are adjacent, the ends of the light extraction features of the second waveguide may be aligned angularly with respect to the lateral direction with the ends of the light extraction features of the first waveguide. The first waveguide may be arranged to image the light sources disposed at different input positions along the input side of the first waveguide, in the lateral direction, so that the output light from the first waveguide is directed into respective optical windows in output directions that are distributed in dependence on the input positions of the light sources.

The directional display device may further comprise a rear reflector disposed behind the second guide surface of each of the plural waveguides, the rear reflector comprising an array of reflective facets arranged to reflect reflected input light that is transmitted through the light extraction features of the first and second waveguides, back through the first and second waveguides to exit through the first guide surface, wherein the rear reflector may have parts behind each of the plural waveguides and the reflective facets are curved in the lateral direction with different optical power in the parts of the rear reflector behind the first and second waveguides.

The spatial light modulator may be arranged to modulate a first polarization component, the directional display device may further comprise a reflective polarizer disposed between the first guide surfaces of the plural waveguide and the spatial light modulator and may be arranged. to transmit the first polarization component and to reflect a second polarization component of the output light that is orthogonal to the first polarization component as rejected light, and the rear reflector may further comprise intermediate facets extending between the reflective facets of the rear reflector and inclined in opposite senses from the reflective facets of the rear reflector in a common plane, so that pairs of a reflective facet and an intermediate facet may together form corner facets arranged to reflect the rejected light for supply back to the spatial light modulator, the pairs of a reflective facet and an intermediate facet being inclined in a plane that is oriented around the normal to the spatial light modulator so that the rear reflector converts the second polarization component of the rejected light into the first polarization component on reflection.

According to a sixth aspect of the present disclosure there may be provided a directional display apparatus comprising: a directional display device according to the fifth aspect; and a control system arranged to control the light sources.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve, for example, power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiments may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 6B is a schematic diagram illustrating another embodiment of the generation of a second viewing window in a time multiplexed directional display device in a second time slot, in accordance with the present disclosure;

FIG. 11 is a schematic diagram illustrating a directional display apparatus comprising a directional display device and a control system, in accordance with the present disclosure;

DETAILED DESCRIPTION

Figure 1A:
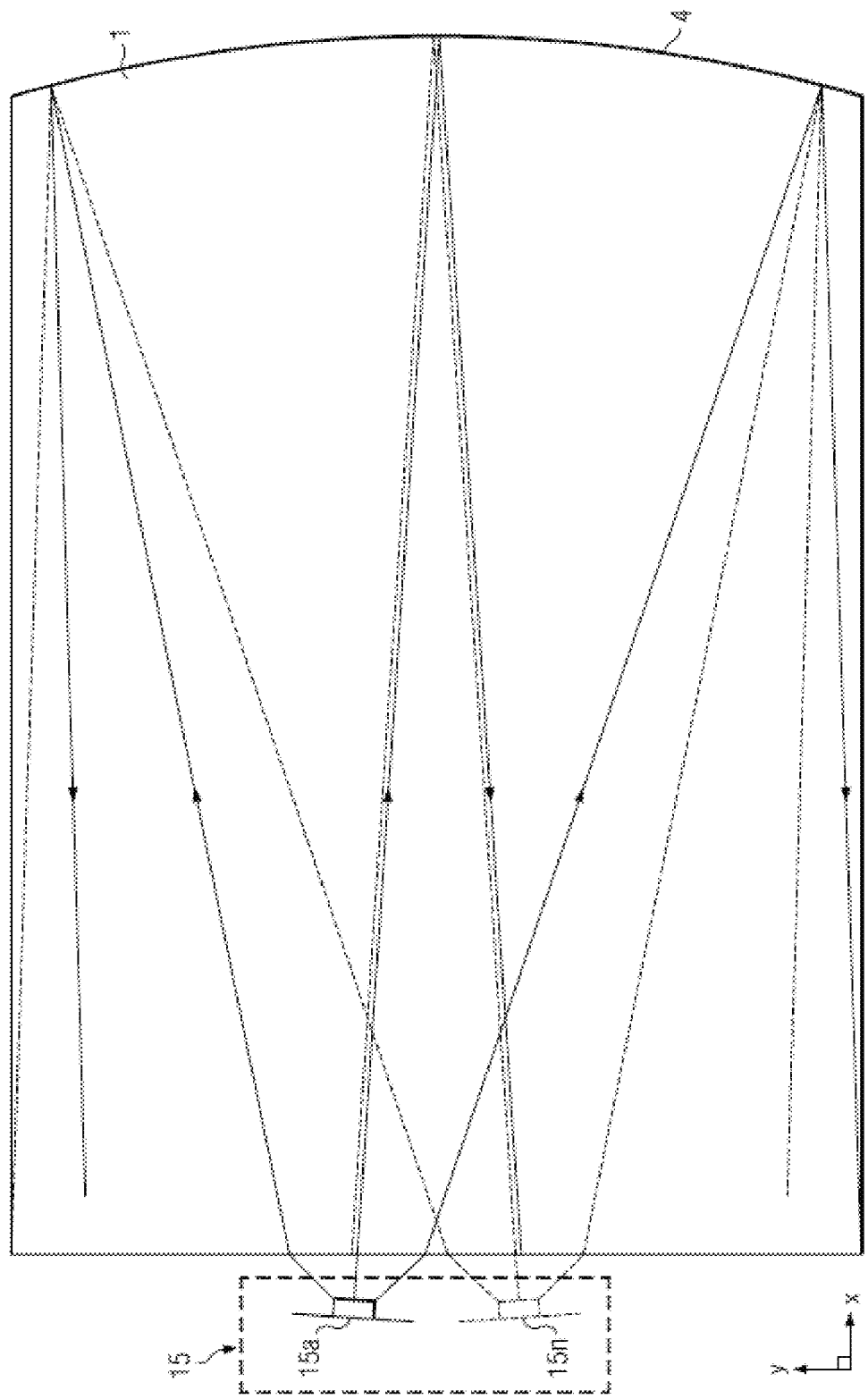
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. Pat. No. 9,519,153 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 1a). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. Pat. No. 9,519,153, which is incorporated by reference herein in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. Pat. No. 9,519,153 which may be referred to herein as an "optical valve" or "optical valve directional backlight," all of which are incorporated by reference herein in their entireties.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
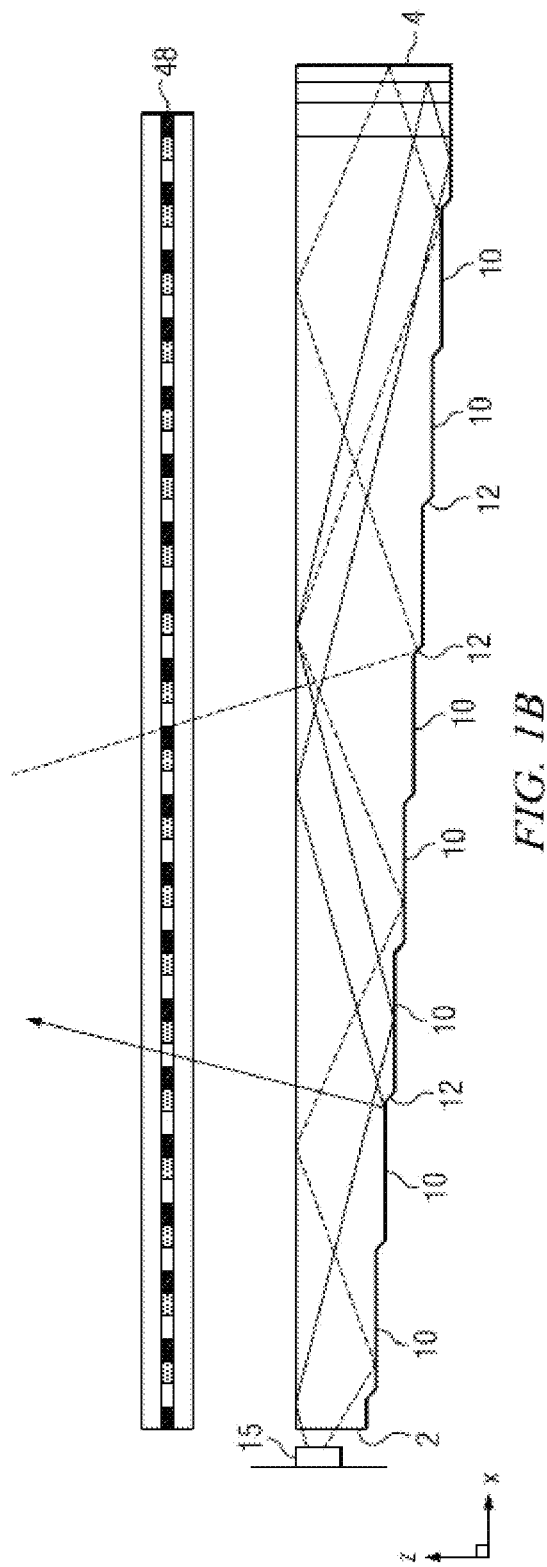
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs), Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may be a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
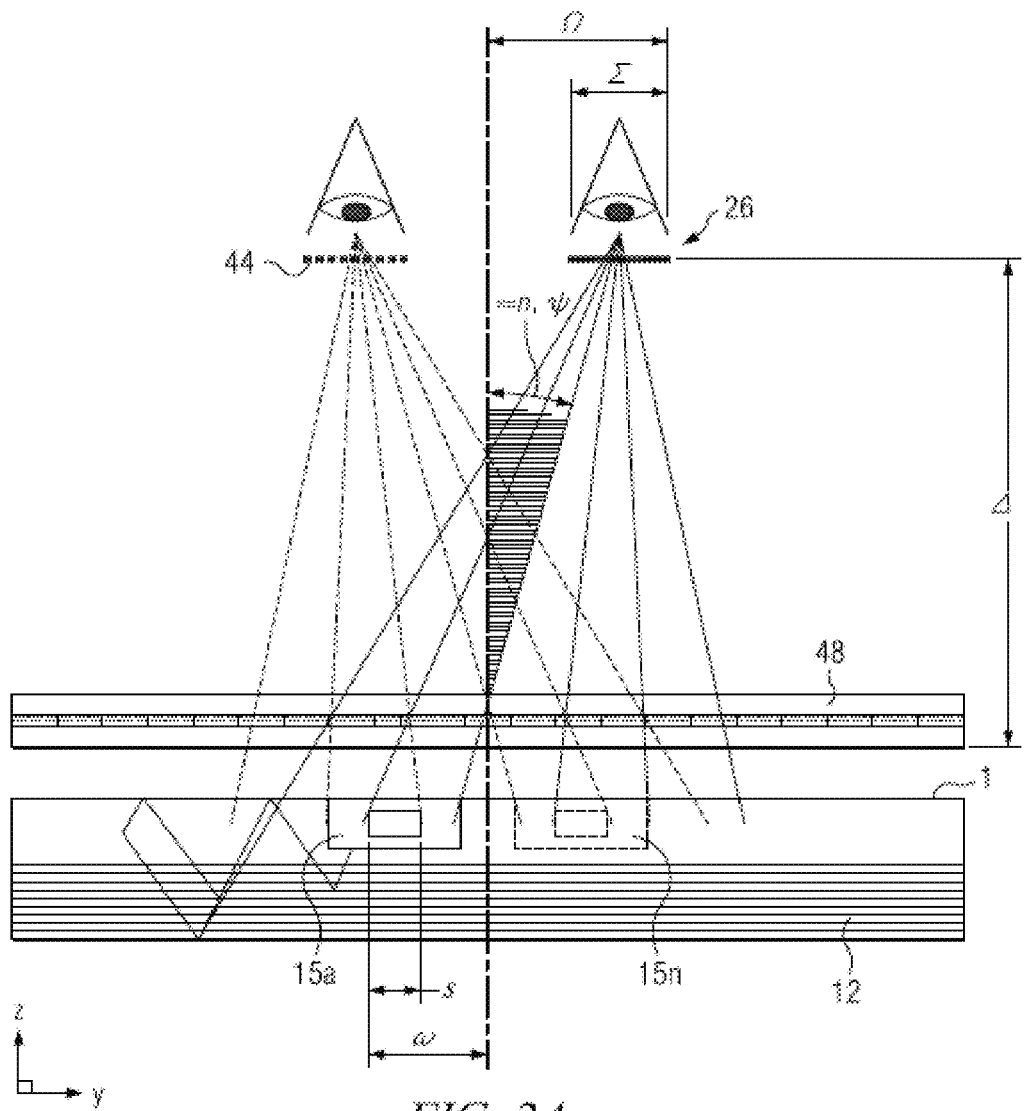
FIG. 2A is a schematic diagram illustrating in a top view of light propagation in another embodiment of a directional display device, in accordance with the present disclosure.
Figure 2B:
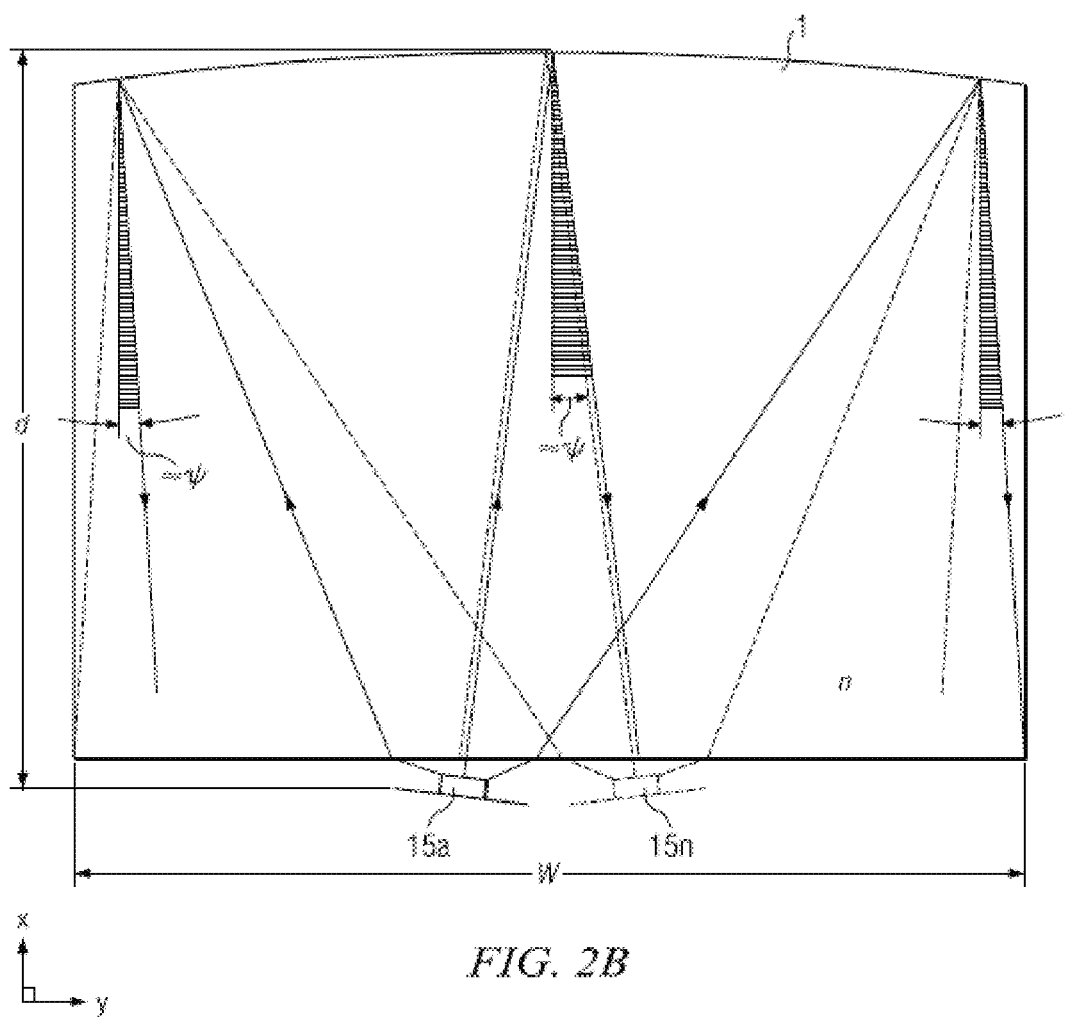
FIG. 2B is a schematic diagram illustrating light propagation in a front view of the directional display device of FIG. 2A, in accordance with the present disclosure.
Figure 2C:
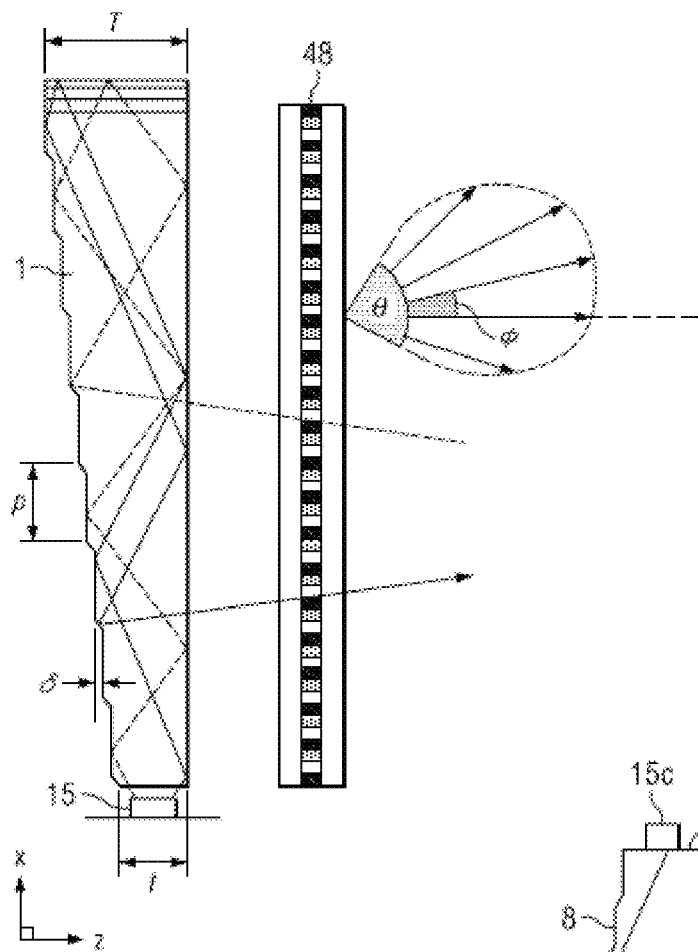
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
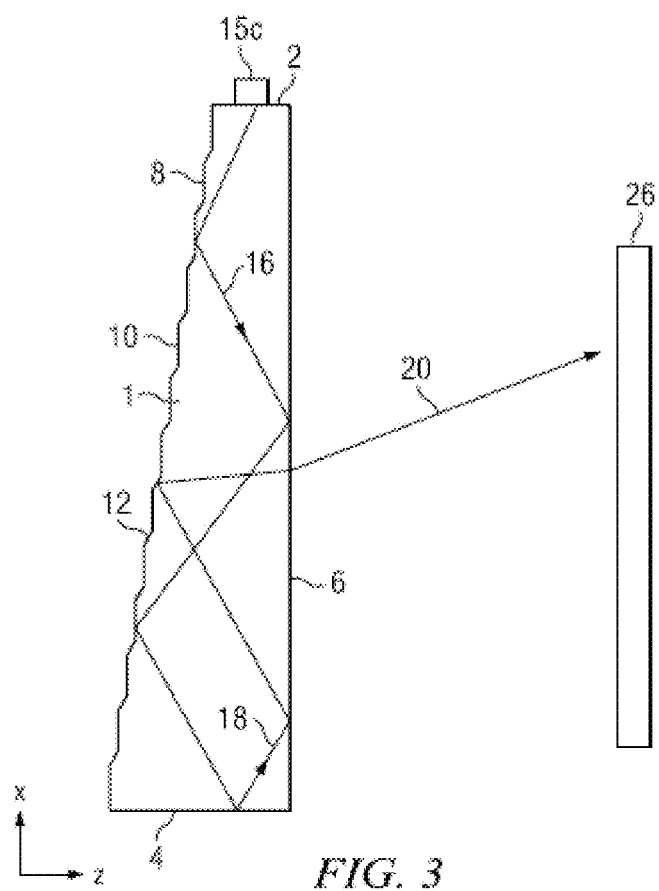
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
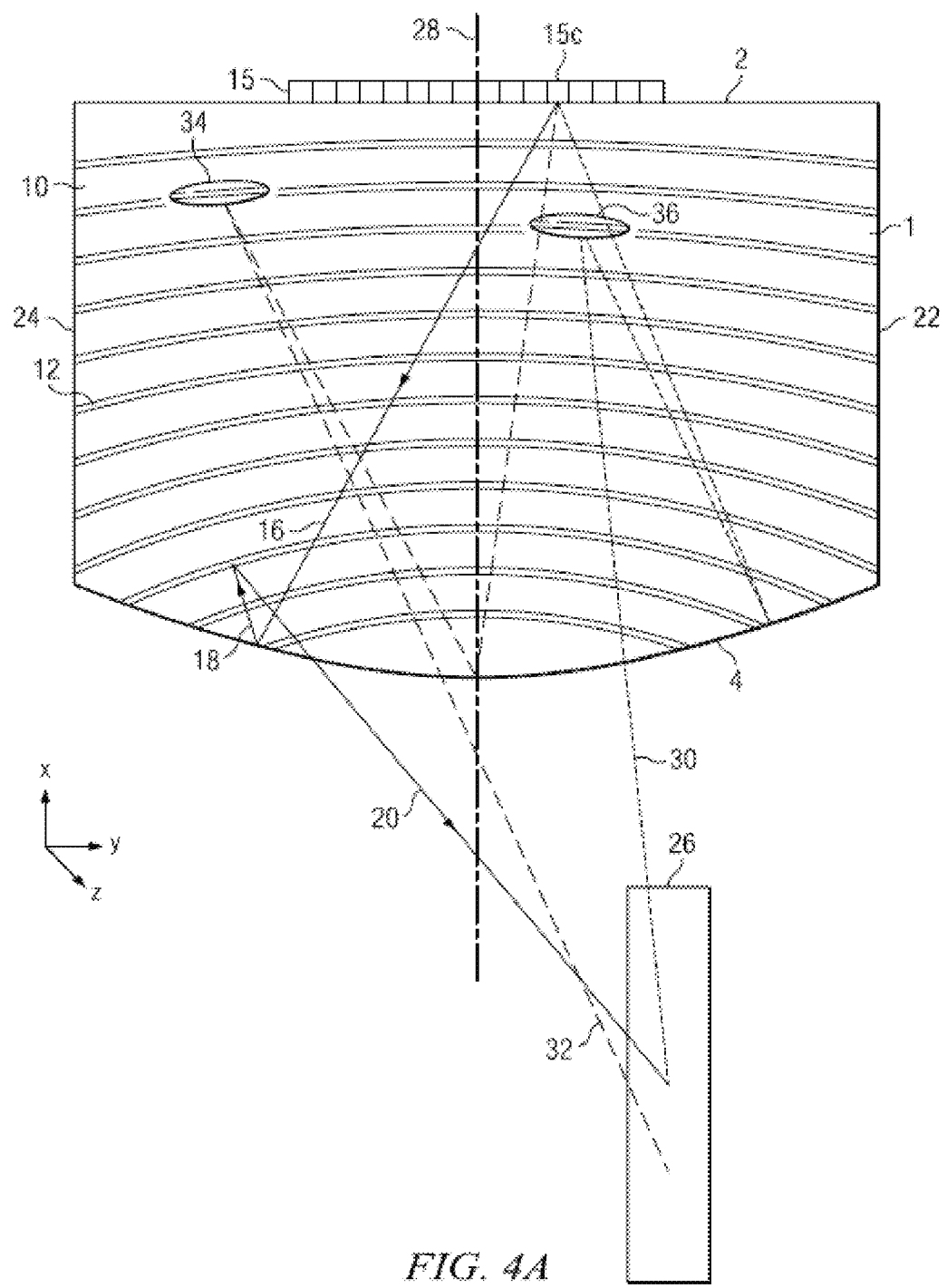
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
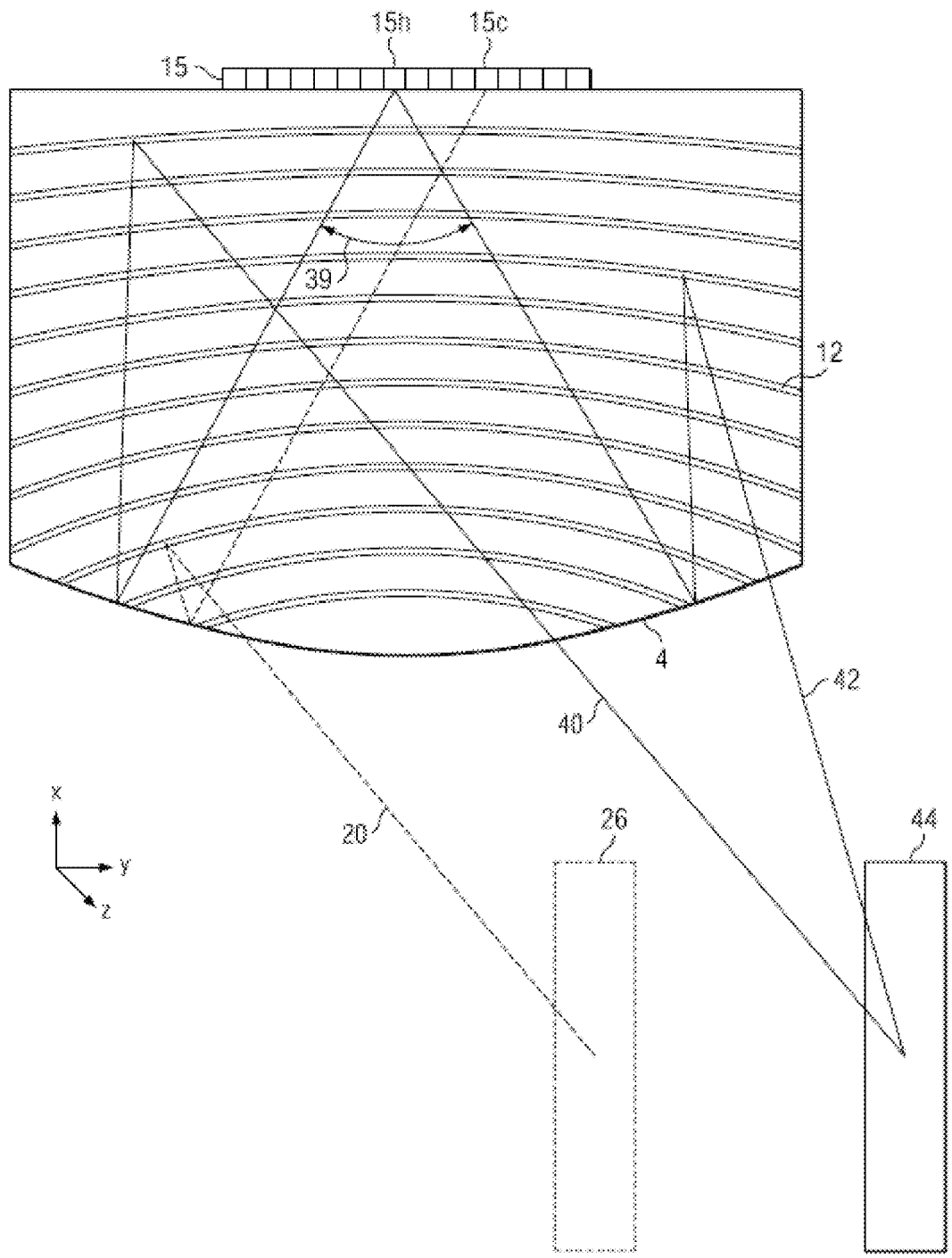
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may be illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
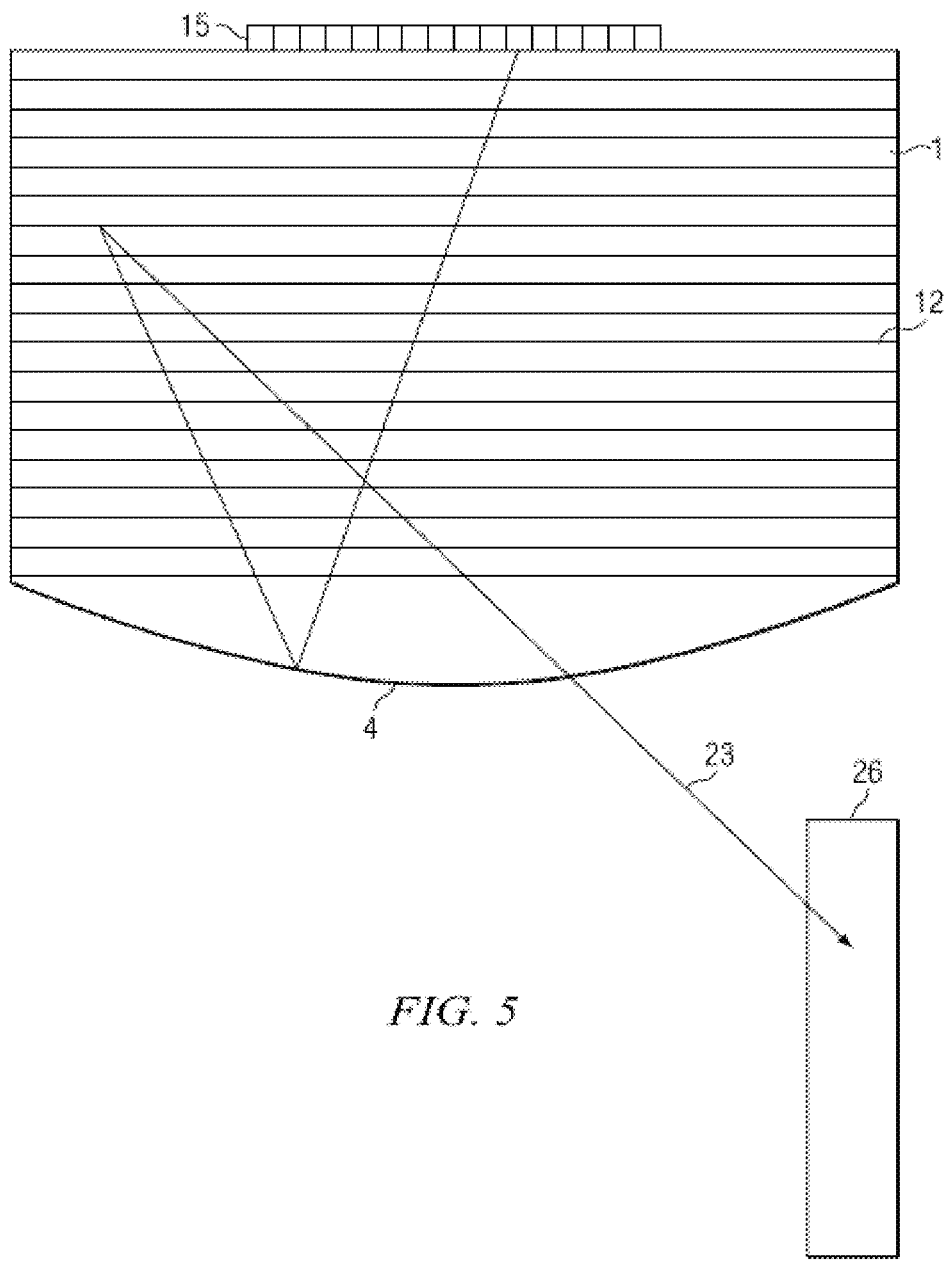
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
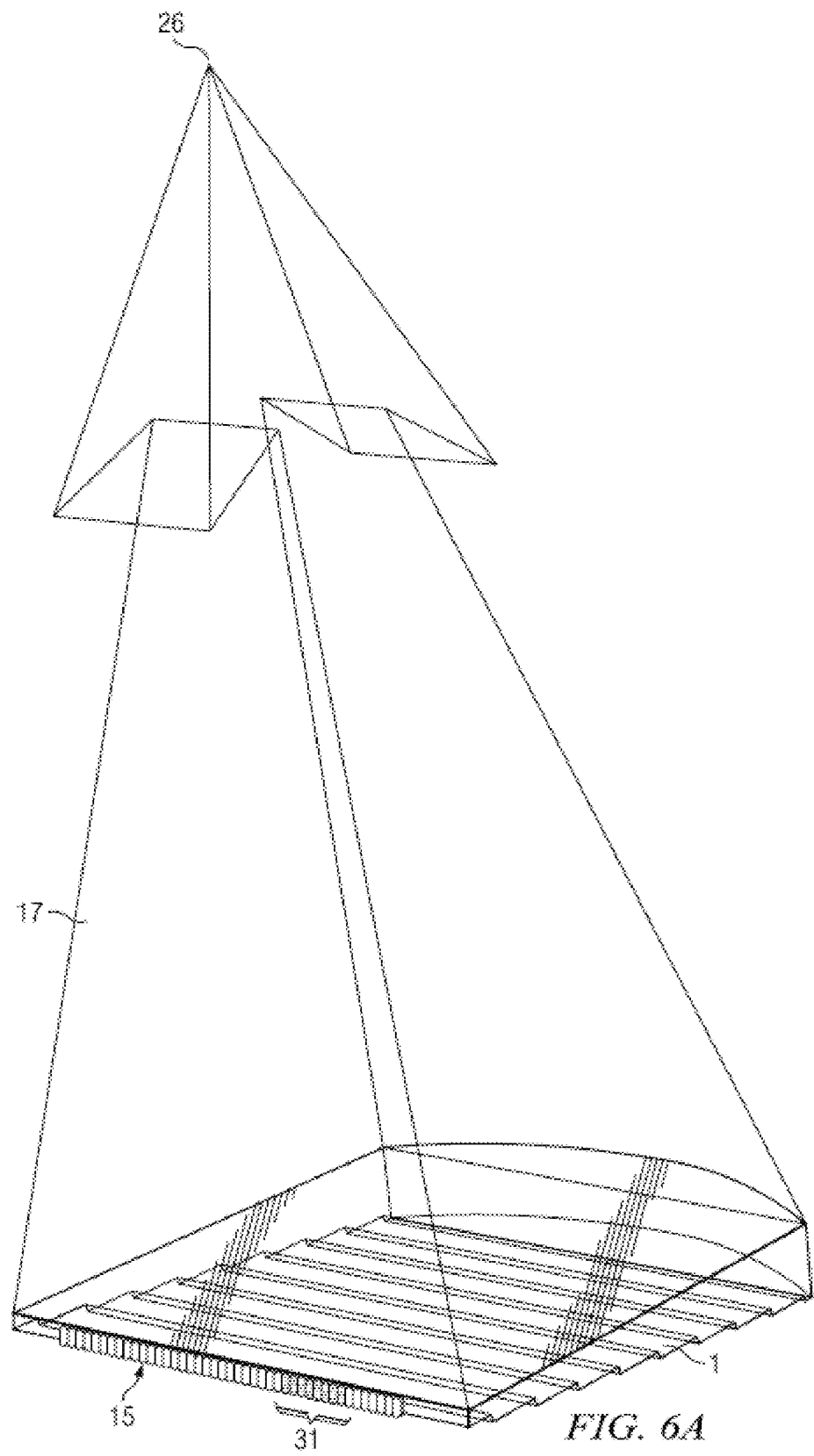
FIG. 6A is a schematic diagram illustrating one embodiment of the generation of a first viewing window in a time multiplexed directional display device in a first time slot, in accordance with the present disclosure.
Figure 6C:
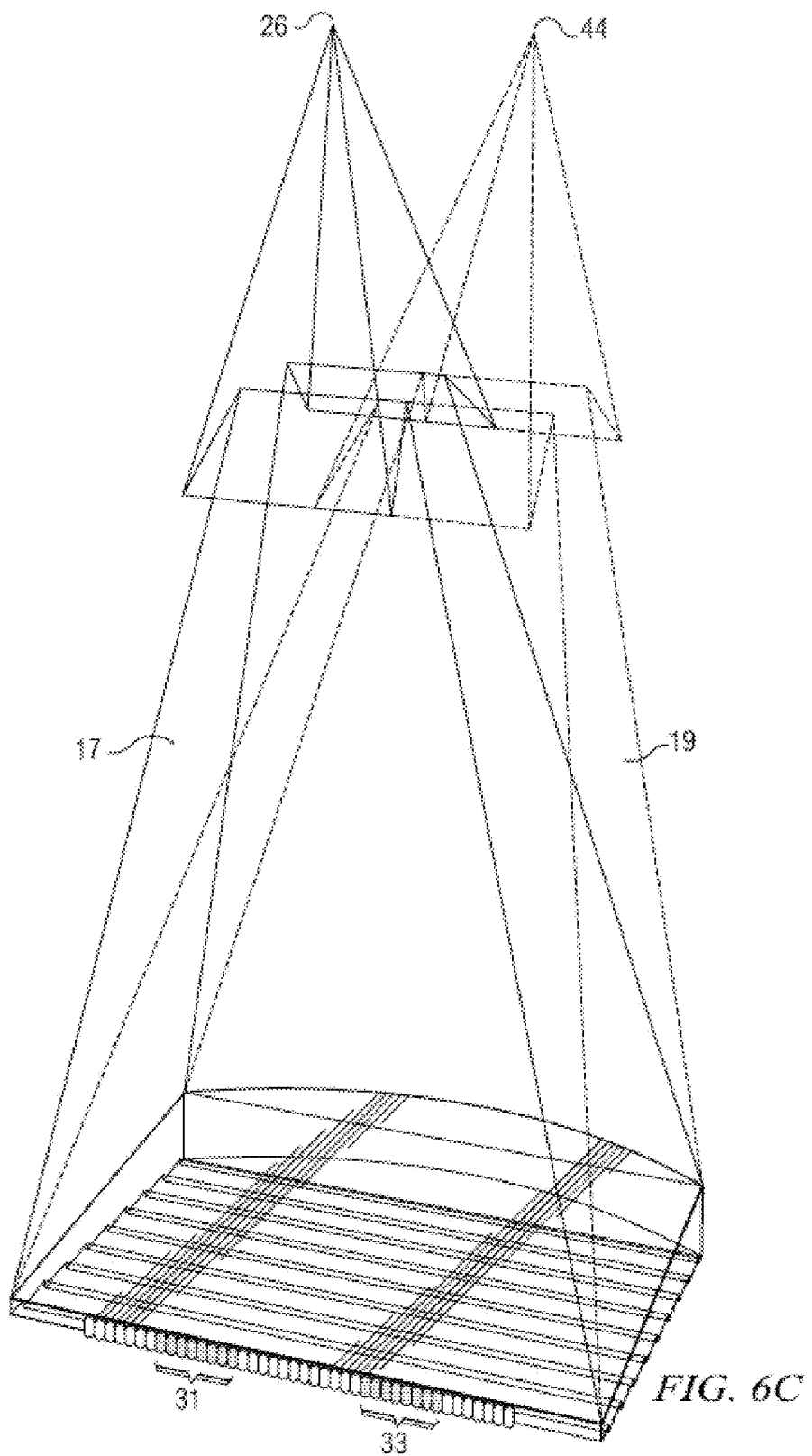
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
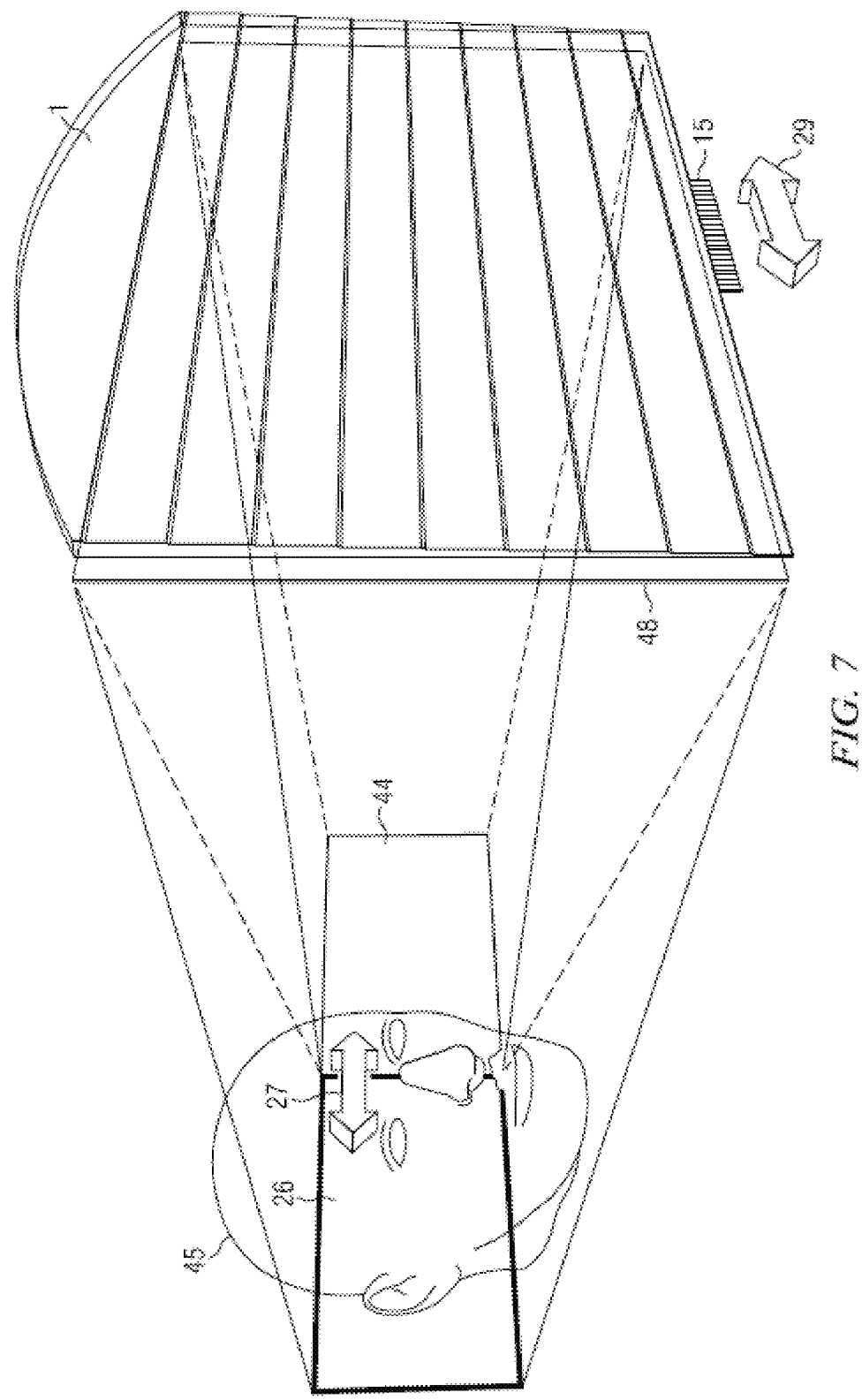
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers left and right eyes providing 3D to all viewers. Again similar operation can be achieved with all the directional backlights described herein.

Figure 8:
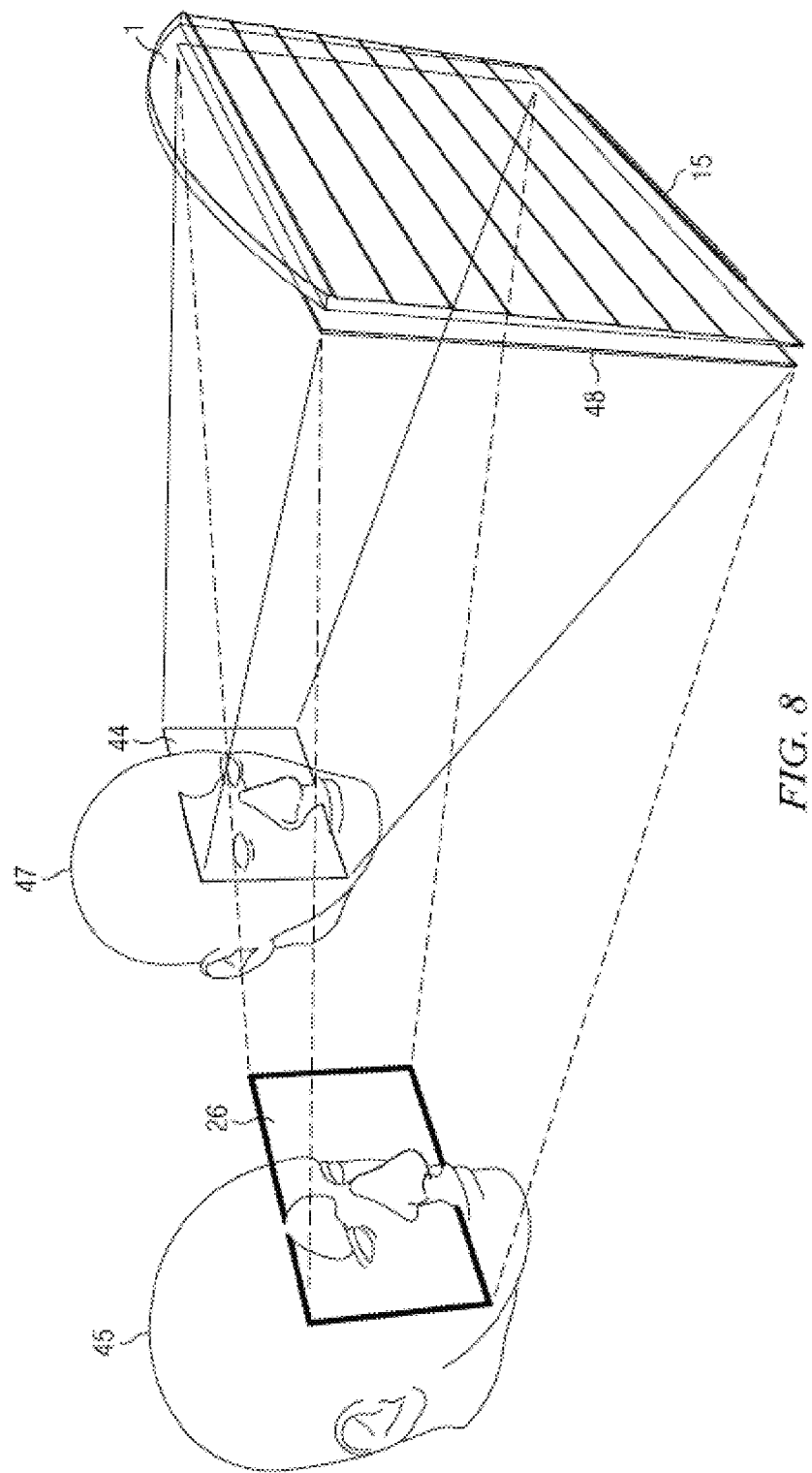
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
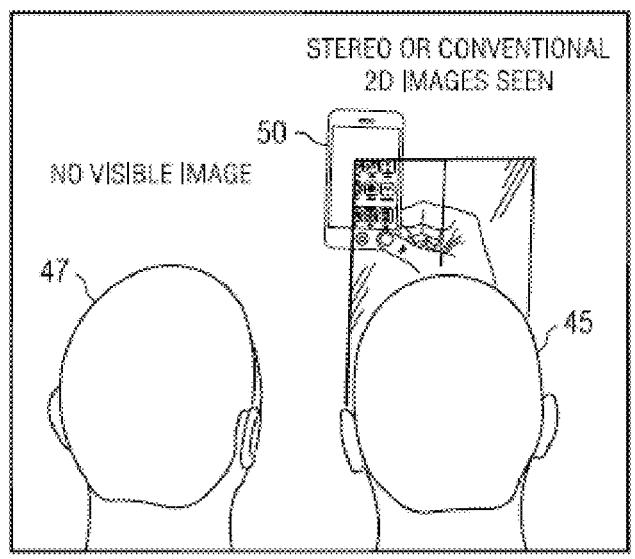
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
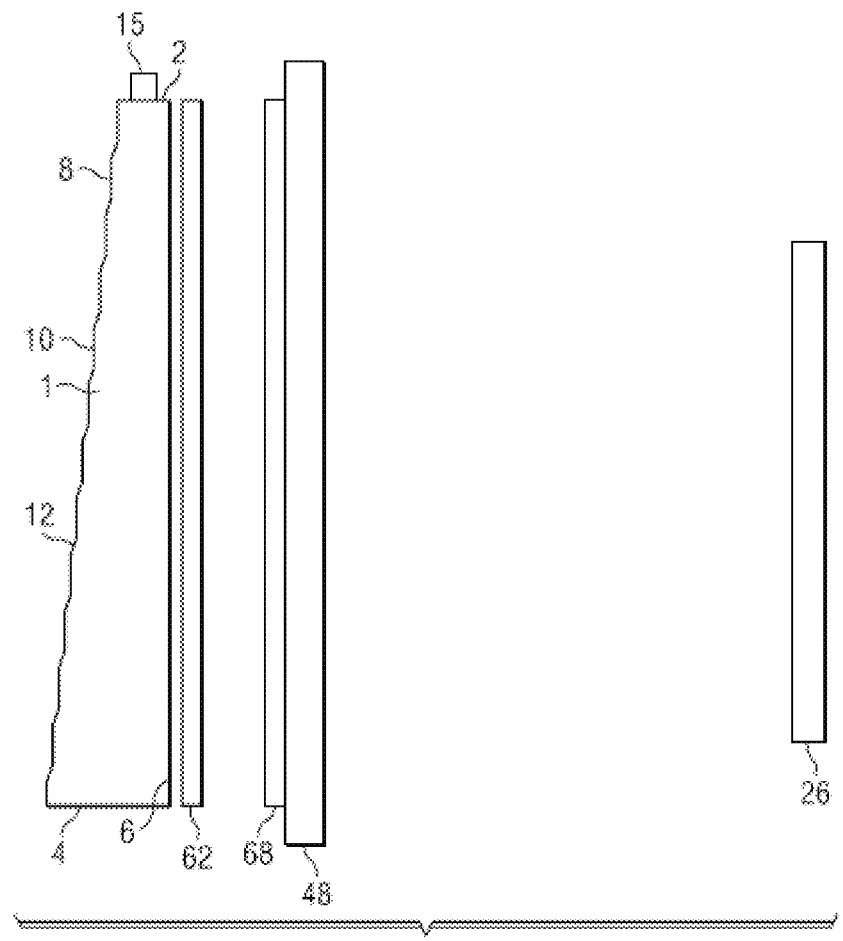
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further. FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and tight eyes of the observer. In this manner, the output directionality of the waveguide 1 may be achieved to correspond with the viewer position so that a first image may be directed to the observer's right eye in a first phase and directed to the observer's left eye in a second phase.

Figure 12:
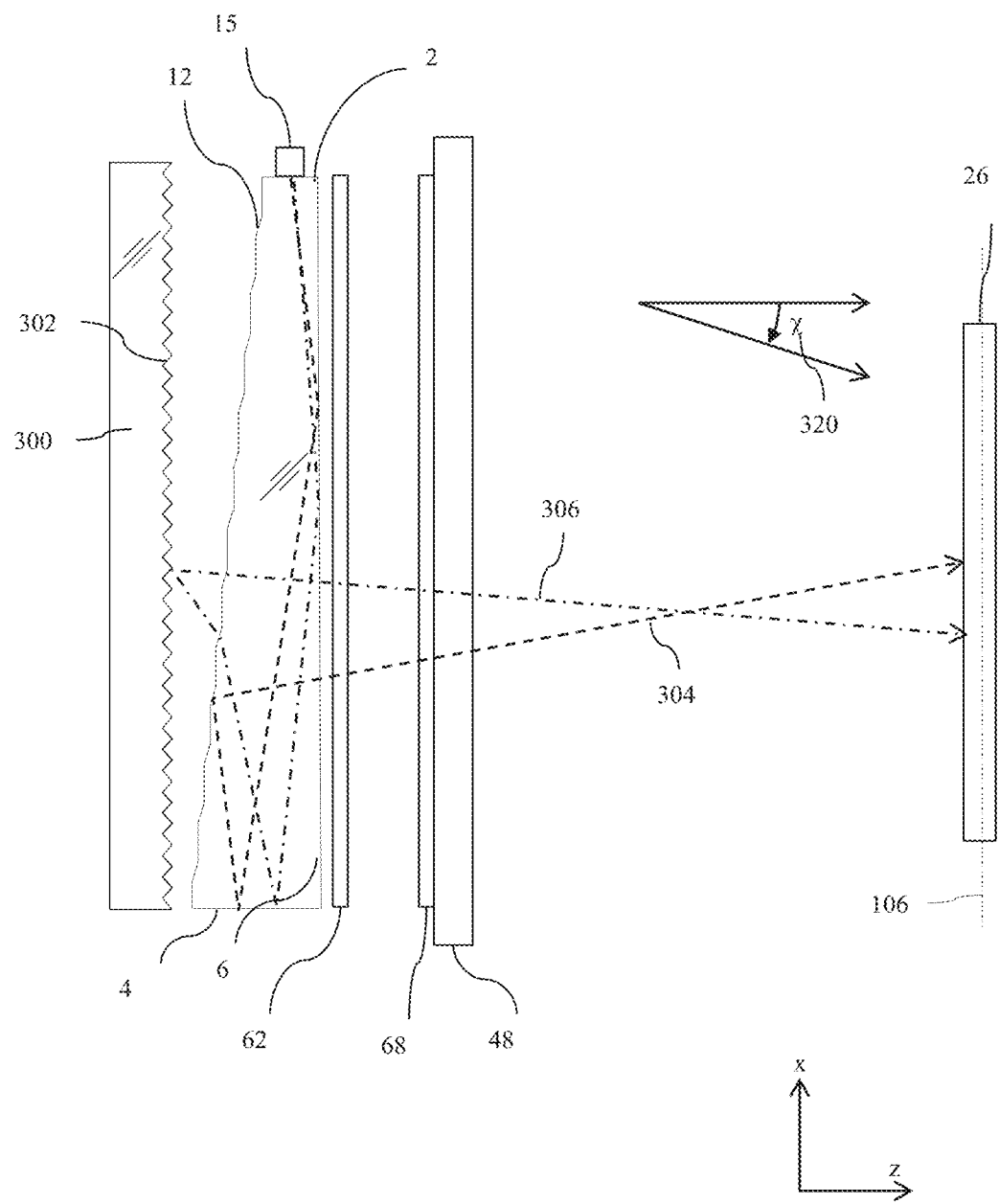
FIG. 12 is a schematic diagram illustrating in perspective view the formation of an optical window by a directional waveguide, in accordance with the present disclosure.

FIG. 12 is a schematic diagram illustrating a side view of a directional display device with a rear reflector 300. The directional display device may include a directional backlight and a transmissive spatial light modulator 48. The rear reflector 300 may include an array of reflective facets 302. The array is a linear array in that it repeats in a linear direction (e.g. vertically in FIG. 12), Light rays 304 that are reflected from light extraction features 12. of the waveguide 1 are directed to a vertical viewing position in the viewing window 26, with an angular distribution in the direction 320. In the absence of rear reflector 300, light rays 306 that are transmitted through the features 12 are lost to the system, or may interact with materials behind the display and scatter to produce undesirable cross talk between respective viewing windows.

In the present disclosure an optical window refers to the image of a single light source in the window plane. By way of comparison, a viewing window 26 is a region in the window plane 106 in which light is provided and which may include image data of substantially the same image from across the display area. Thus a viewing window may be formed from multiple optical windows. Typically the optical windows have a small lateral extent (y-axis direction) and a large extent in a vertical direction orthogonal to the lateral extent (x-axis direction).

In the present embodiment, light rays 306 that are transmitted through the features 12 are incident on the reflective facets of rear reflector 300. The light rays 306 are thus redirected. towards the viewing window 26. For a given light source of the array 15, the lateral extent and position of the respective optical windows for rays 304, 306 is substantially the same; however the distribution of light in the vertical direction may be different for light ray bundles directed by reflection or transmission at features 12.

A directional backlight may thus include a waveguide and an array of light sources disposed at different input positions in a lateral direction across the input end of the waveguide.

The waveguide may have an input end, may include first and second opposed guide surfaces for guiding light along the waveguide, and a reflective end facing the input end for reflecting the input light back through the waveguide. The first guide surface may be arranged to guide light by total internal reflection and the second guide surface may have a stepped shape which may include a plurality of facets oriented to reflect light from the light sources, after reflection from the reflective end, through the first guide surface into optical windows in output directions. The output directions may be distributed in a lateral direction to the normal to the first guide surface in dependence on the input positions, and intermediate regions between the facets that are arranged to direct light through the waveguide without extracting it. The directional backlight may also include a rear reflector which may include a linear array of reflective facets arranged to reflect light from the light sources that is transmitted through the plurality of facets of the waveguide, back through the waveguide to exit through the first guide surface into the optical windows.

A directional display device may thus also include a directional backlight and a transmissive spatial light modulator 48 arranged to receive the output light from the first guide surface. A display apparatus may thus also include a directional display device, and a control system arranged to selectively operate the light sources to direct light into viewing windows corresponding to the output directions. The display apparatus may be an autostereoscopic display apparatus in which the control system is further arranged to control the display device to display temporally multiplexed left and right images and synchronously to direct the displayed images into viewing windows in positions corresponding to left and right eyes of an observer. The control system may further include a sensor system arranged to detect the position of an observer across the display device. The control system may be arranged to direct the displayed images into viewing windows in positions corresponding to left and right eyes of an observer, in dependence on the detected position of the observer.

Advantageously, the optical windows and viewing windows 26 achieved by the rays 304, 306 may substantially overlap in the lateral direction. Thus the cross talk of the display may be substantially maintained. Further the total intensity of light rays directed to viewing window 26 may be increased and the display brightness may be increased. The battery lifetime of a mobile display device may be increased, and the cost and number of light sources may be reduced for a desired brightness level. Further cross talk from unwanted transmitted light through features 12 is reduced or eliminated. Further, the reflector 300 may be formed in a thin film that may be mounted in the case of a display system, thus minimizing cost and thickness. Alternatively the structure of the reflector 300 may be formed on a rear case of the backlight, for example by molding the structure of the reflector 300 as part of the display case and then coating with a metallization layer. Advantageously this may provide a stiff and flat structure, achieving high window quality for the viewing windows 26 that are reflected from the reflector 300.

Figure 13:
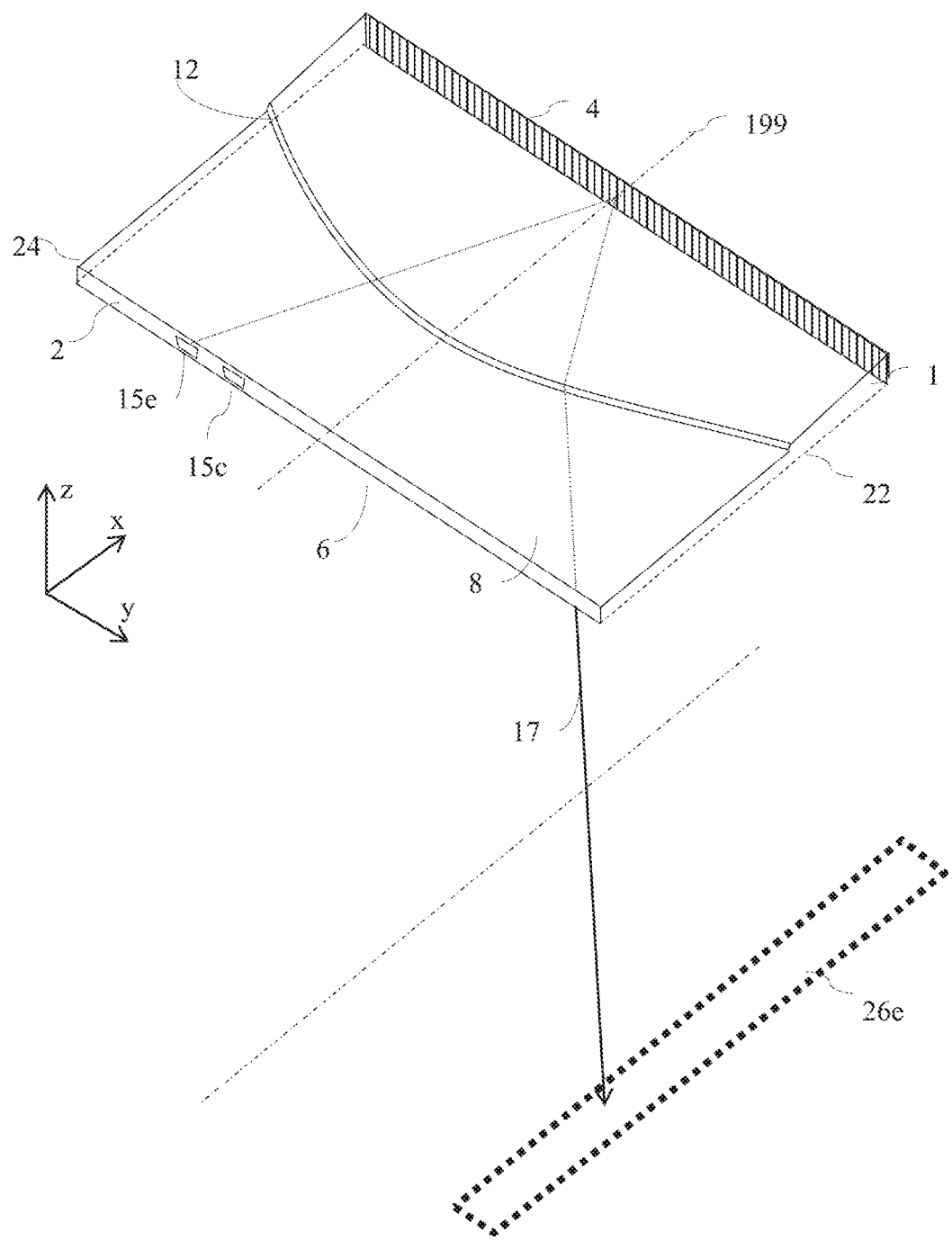
FIG. 13 is a schematic diagram illustrating in perspective view, the formation of an optical window by an optical valve, in accordance with the present disclosure.

FIG. 13 is a schematic diagram illustrating in perspective view, the formation of an optical window by an optical valve. Light source 15e may be arranged to provide optical window 26e after propagation in the waveguide 1, Light source 15e may be arranged to the right of the optical axis 199 when viewed from the position of the optical window 26e.

Figure 14:
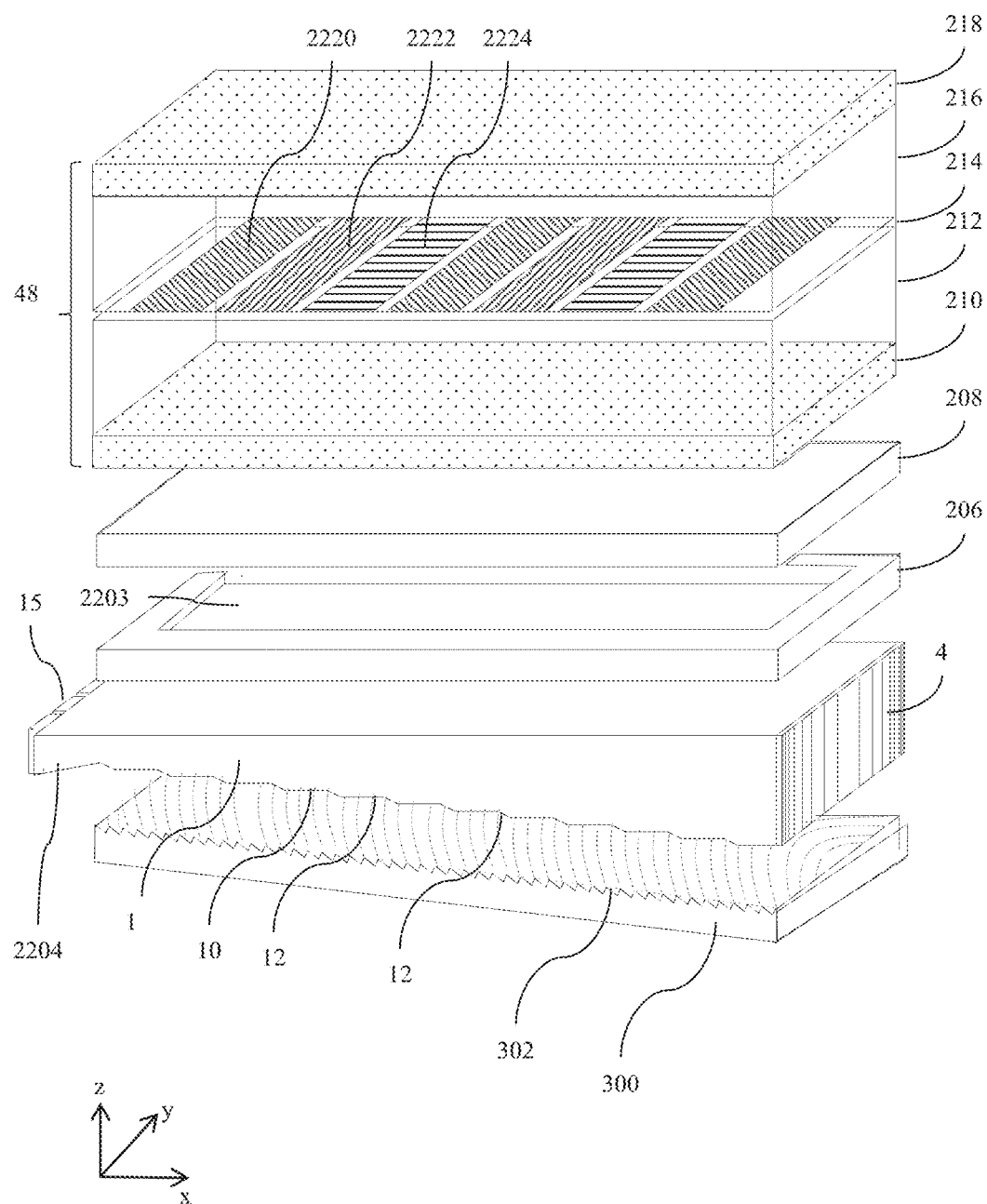
FIG. 14 is a schematic diagram illustrating in side view, a directional display comprising an optical valve, in accordance with the present disclosure.

FIG. 14 is a schematic diagram illustrating in side view, a directional display comprising a waveguide 1 arranged with a spatial light modulator 48. Reflective end 4 may be provided by a Fresnel mirror. Taper region 2204 may be arranged at the input to the waveguide 1 to increase input coupling efficiency from the light sources 15a-15n of the array of illuminator elements 15 and to increase illumination uniformity. Shading layer 206 with aperture 2203 may be arranged to hide light scattering regions at the edge of the waveguide 1. Rear reflector 300 may comprise facets 2202 that are curved and arranged to provide viewing windows 26 from groups of optical windows provided by imaging light sources of the array 15 to the window plane 106. Optical stack 208 may comprise reflective polarizers, retarder layers and diffusers. Rear reflectors 300 and optical stack 208 are described further in U.S. Patent Publ. No. 2014-0240828, incorporated by reference herein in its entirety.

Spatial light modulator 48 may comprise a liquid crystal display that may comprise an input polarizer 210, TFT glass substrate 212, liquid crystal layer 214, color filter glass substrate 216 and output polarizer 218. Red pixels 2220, green pixels 2222 and blue pixels 2224 may be arranged in an array at the liquid crystal layer 214. White, yellow, additional green or other color pixels (not shown) may be further arranged in the liquid crystal layer to increase transmission efficiency, color gamut or perceived image resolution.

In the embodiment of FIG. 14, injection of input light into the waveguide is along the long edge. The physical size of the LED packages of the array 15 and scatter from waveguide and other surfaces near the input end 2 limit the minimum bezel width that can be achieved. It would be desirable to reduce the width of the side bezel along the long edges of the waveguide.

Figure 15:
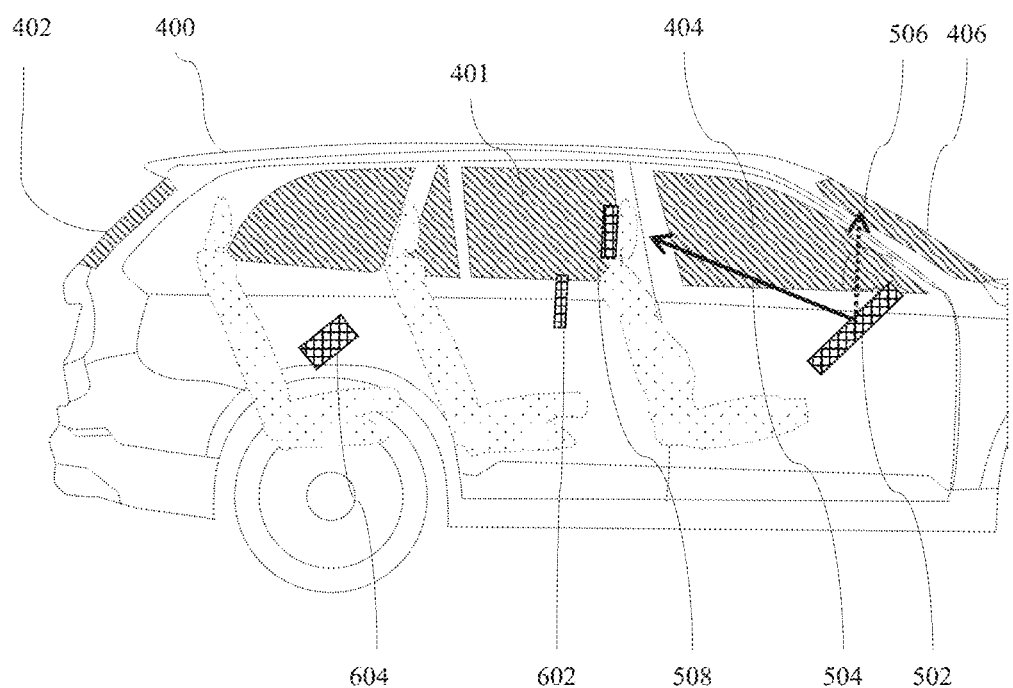
FIG. 15 is a schematic diagram illustrating in side view an automotive cabin, in accordance with the present disclosure.

FIG. 15 is a schematic diagram illustrating in side view, the location of displays in a vehicle cabin 401 as described in U.S. Patent Publ. No. 2017-0336661, incorporated by reference herein in its entirety. Displays such as 502 are mounted to or built-in to the vehicle 400. The output from such displays may be directed to the driver 504 but may also be visible in reflection 506 from the windshield 406. The cabin 401 may also contain seat back displays 508 and portable phones 602 or tablet devices 604 that are not fixed to the vehicle but are "co-located". With such displays in the vehicle 400, then the overall cabin 401 luminance and reflections from glass, for example 406, 404 and 402 can be both distracting for the driver at nighttime and the amount of blue and green light in the display output may impair the driver's night vision adaption, thereby reducing the safety of the vehicle operation.

In the following paragraphs some of the descriptions are made with respect to a passenger vehicle shown in FIG. 16; however this disclosure is not limited to such a vehicle and may apply to five-seat cars, two-seat cars, motorcycles, bicycles, trucks, buses, trains, boats, aircraft, and other vehicles without limitation.

Further the displays of the present embodiments may be provided for other directional display applications including laptops, notebooks, tablets, cell phones, automated teller machines, monitors and other known display types.

Figure 16:
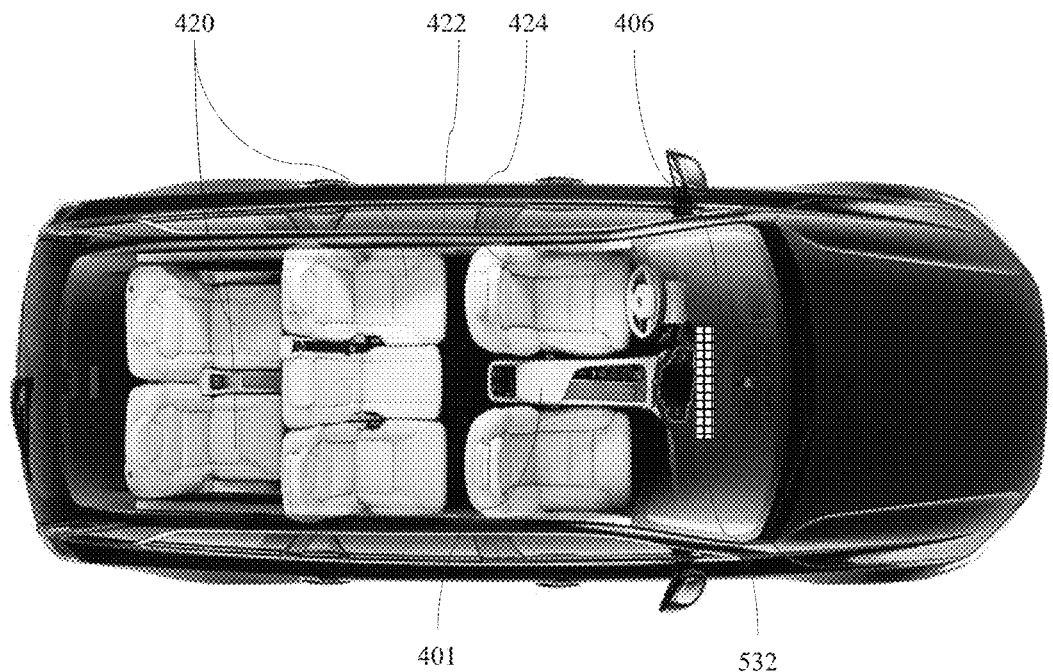
FIG. 16 and FIG. 17 are schematic diagrams illustrating in top view an automotive cabin, in accordance with the present disclosure.
Figure 17:
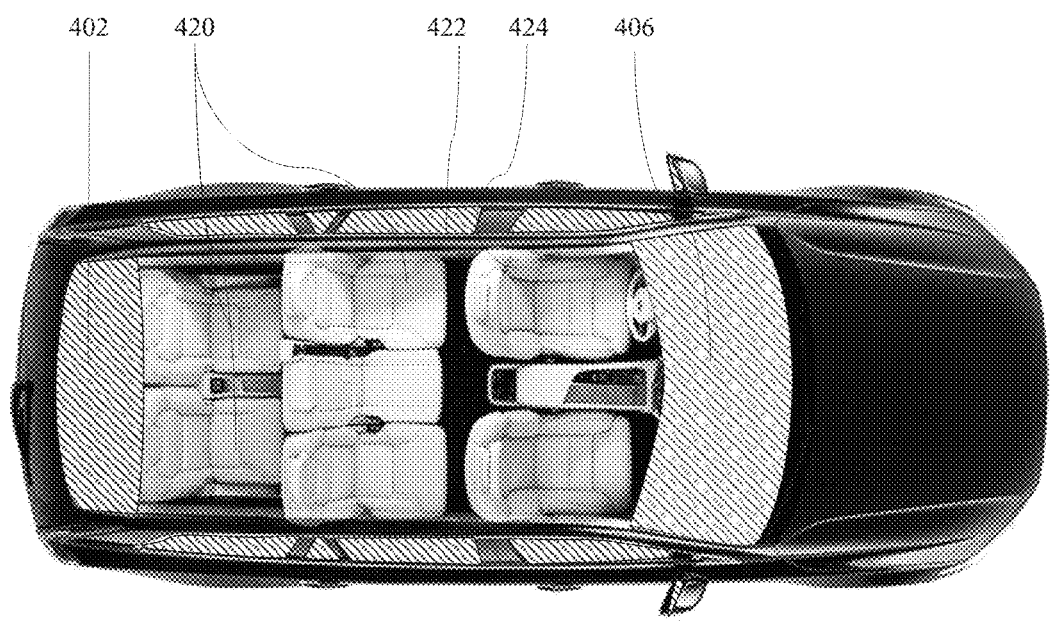

FIGS. 16-17 are schematic diagrams illustrating in top view a typical vehicle cabin 401. The cabin 401 may contain displays mounted to the vehicle such as the Driver Information Display (DID) or instrument cluster display (not labelled) for primary use of the driver in seat 424. The cabin 401 may also contain portable personal devices such as phones, tablets or video players used by passengers for example in seats 420. All of these display have the potential to produce unwanted and distracting reflections in vehicle glass shown hatched in FIG. 17, for example 406, 402 and 422.

Further displays may direct light from display information intended for the passenger to the driver and vice versa. It would be desirable to reduce light levels for night time driving, further it would be desirable to limit viewing of content to display users depending on their location.

Figure 18A:
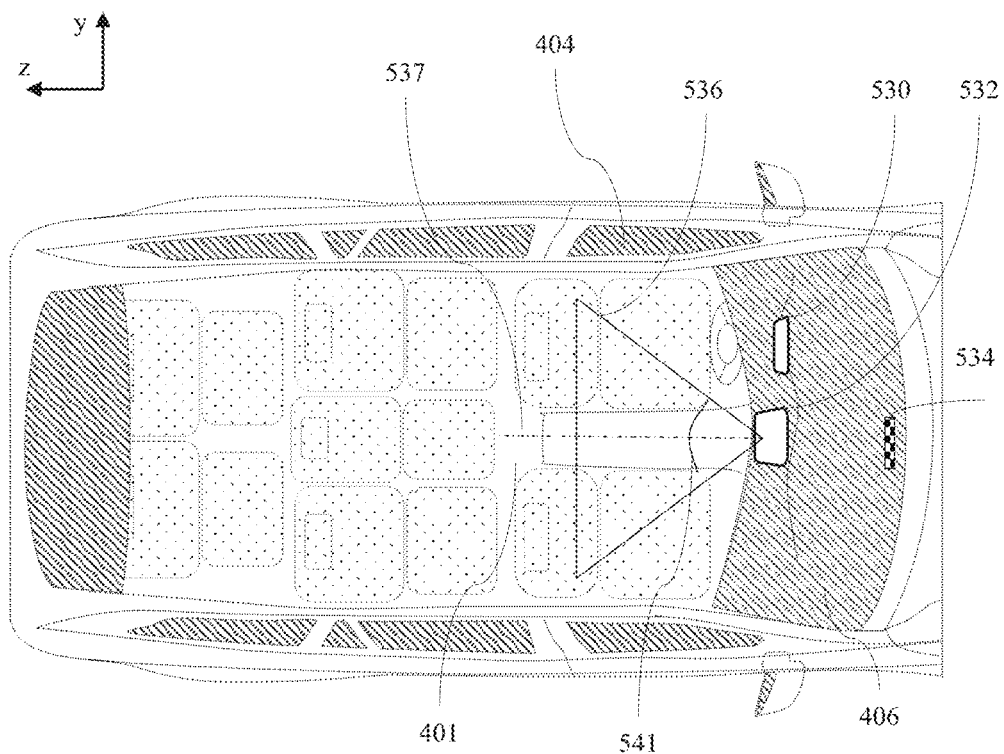
FIG. 18A and FIG. 18B are schematic diagrams illustrating in top view an automotive cabin and respective angular output light distributions from a center console directional display in a first and second modes of operation, in accordance with the present disclosure.
Figure 18B:
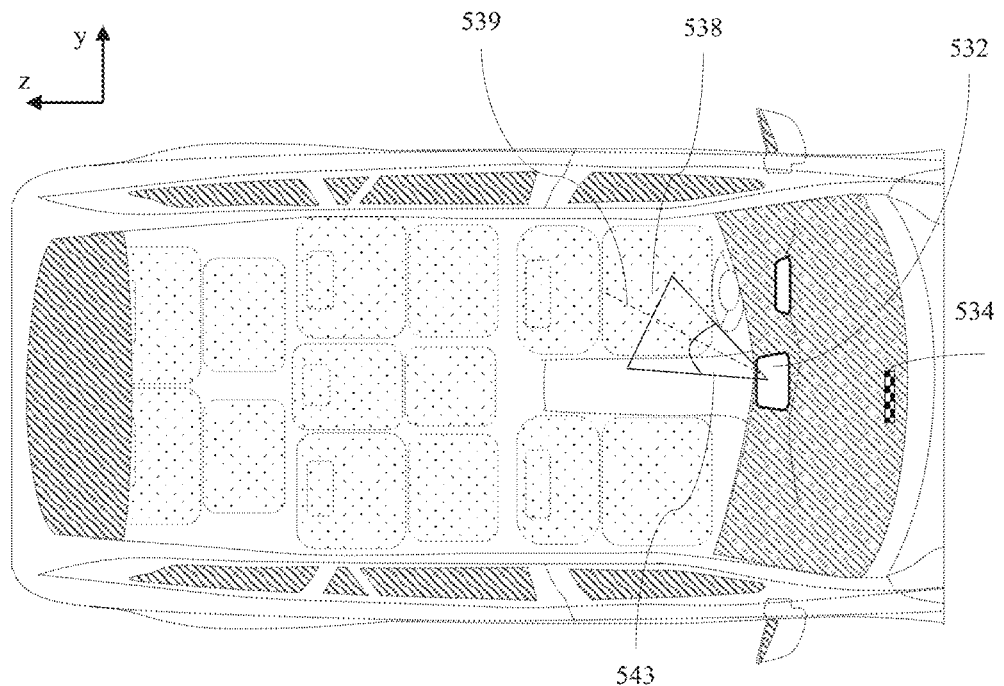

FIGS. 18A-B are schematic diagrams illustrating in top view of a typical vehicle cabin 401 and respective angular output light distributions 536, 538 from a center stack directional display 532 in a first and second modes of operation.

Automotive displays may differ from conventional mobile display applications in that they can be expected to provide clear readability for both very high illuminance conditions for example in bright sunlight and very low illuminance conditions such as at night time. In daytime operation it would be desirable to increase display luminance without substantially increasing display power consumption. For night time operation, light that is not directed to occupants' eyes can degrade the outside vision of the driver by means of (i) reflections of the display surface from windscreens and (ii) reflection from non-specular surfaces in the vehicle that provide a background illumination that may compete with externally illuminated objects, thus degrading driver night vision. The trend to fit both more and larger displays to vehicles coupled with the reduction in windshield angles (to improve aerodynamic efficiency) may all contribute to degraded driver outside vision.

It would be desirable to provide a reduction in reflections from specular surfaces such as glass surfaces including windows 404 and windshield 406 for light from displays such as a Center Stack Display (CSD), 532 which is built-in or mounted to the vehicle. In particular it would be desirable to enable increase the size of CSD 532 while achieving low visibility of specular reflections such as from glass surfaces.

In a first mode of operation, center stack display 532 may be arranged to provide angular output light distribution 536 with angular width illustrated as cone angular size 541 in direction 537 normal to the display 532. For illustrative convenience the angular output light distributions such as 536 and 538 are used to show the extent of the angular illuminance output of displays (in this case CSD 532) at reference angles 541, 543 at which the display angular output drops to, for example, 20% of the peak illuminance output. The length of the angular output light distribution cones 536, 538 represent the relative peak illuminance of display 532. In FIG. 18A, the angular output light distribution 536 is configured such that the display can conveniently be seen by driver, passenger and other occupants (not shown). In a second mode of operation as illustrated in FIG. 18B, such as for use in environments with low ambient lighting levels, angular output light distribution 538 may be provided with direction 539, reduced cone angular size 543 and reduced illuminance. As illustrated, angular output light distribution 538 has a smaller length indicating lower display illuminance.

Advantageously the total illuminance of the cabin including from specular surfaces such as glass windows 404, 406 and non-specular surfaces such as seats and headlining is reduced. The display power consumption may be reduced, increasing vehicle efficiency. Advantageously the reflection from glass areas of cabin 401 may be reduced.

Further location specific information may be provided to driver and not passenger(s) and vice versa.

Figure 19:
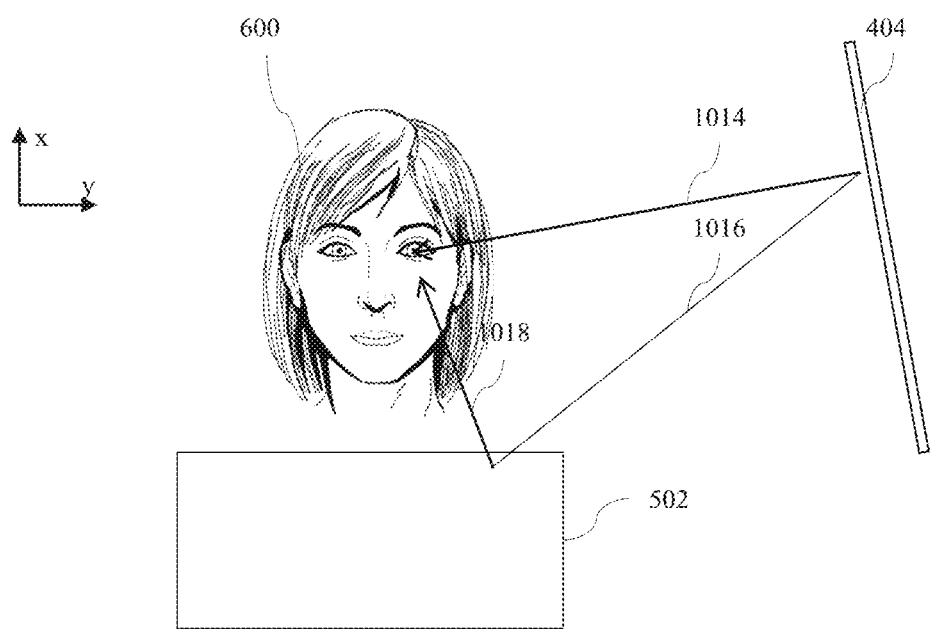
FIG. 19 is a schematic diagram illustrating in front view an automotive cabin and respective angular output light distributions from a directional display and side window, in accordance with the present disclosure.

FIG. 19 is a schematic diagram illustrating in front view part of an automotive cabin. Light from display 502 may reach the occupant 600 both directly via path 1018 or may also reach the occupant 600 by reflection off side window glass 404 following path 1016, 1014.

It would be desirable to reduce distracting reflections at side glass 404. Advantageously a directional display as described herein which can alter the angular output angle can reduce side window reflections. Such a display may also adjust intensity and the image contrast of the images to reduce distracting reflections.

Segmented directional displays will now be described for application to an automotive cabin.

Figure 20:
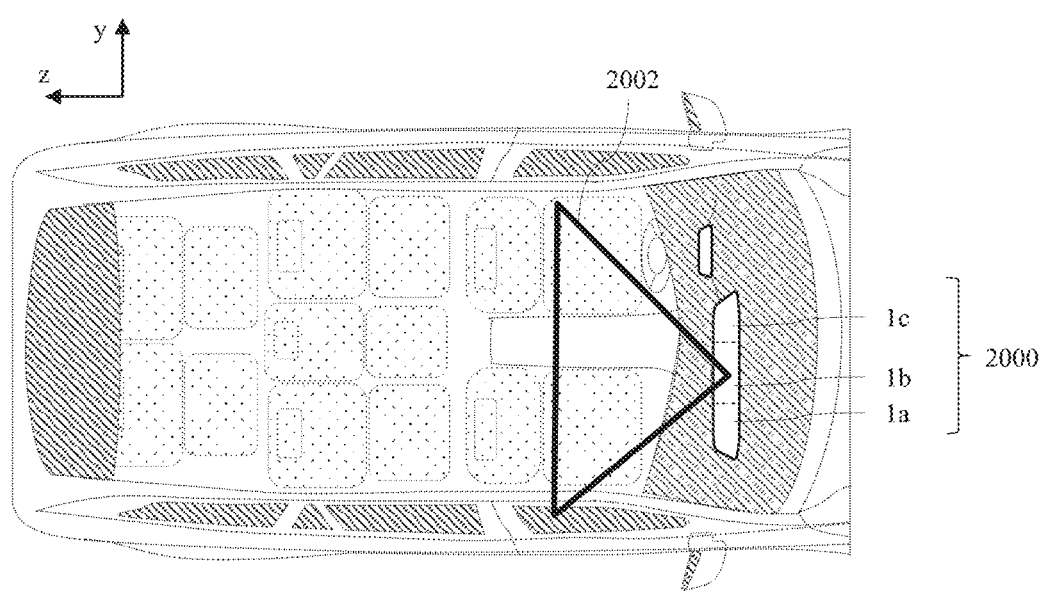
FIG. 20 is a schematic diagram illustrating in top view an automotive cabin and wide format display comprising a segmented directional backlight operating in wide angle mode, in accordance with the present disclosure.

FIG. 20 is a schematic diagram illustrating in top view an automotive cabin and wide format display comprising a segmented directional backlight operating in wide angle mode.

Wide angle viewing in cone 2002 may be provided by display 2000 that has multiple segments 1a, 1b, 1c. Advantageously the display can be arranged to be viewable from a wide range of positions within the cabin.

It would be desirable to provide portions of the display that are only viewable by a passenger, while other portions are viewable by the driver or other passengers. Alternatively or additionally it would be desirable to provide portions of the display that are only viewable by a driver.

Figure 21A:
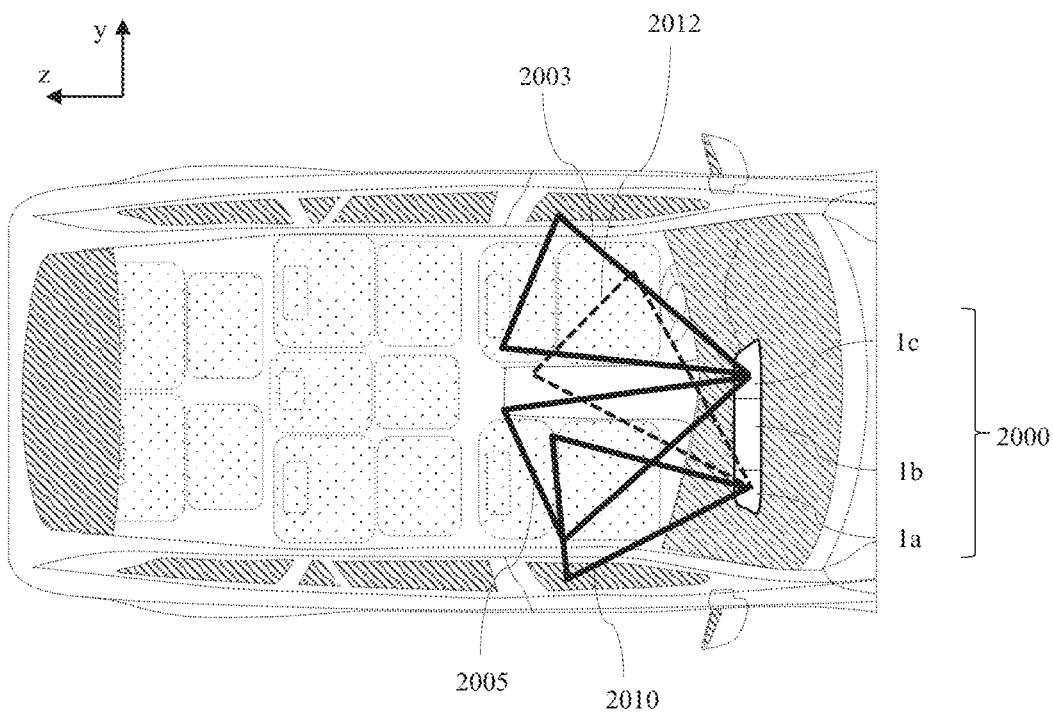
FIG. 21A is a schematic diagram illustrating in top view an automotive cabin and wide format display comprising a segmented directional backlight operating in selective narrow angle modes, in accordance with the present disclosure.

FIG. 21A is a schematic diagram illustrating in top view an automotive cabin and wide format display comprising a segmented directional backlight operating in selective narrow angle modes.

Segment 1a may be arranged to provide light cones 2005 to driver and passenger respectively while segment 1c may be arranged to provide light cone 2010 to the passenger but substantially no light in cone 2012 to the driver.

Advantageously content may be provided on the passenger display segment that is not permitted for use by the driver while the vehicle is in motion, for example entertainment.

Further the multiple segments 1a, 1b, 1c may be independently controllable. Advantageously a single display package may be provided for multiple display directionality operating modes.

The operating modes of the directional output may include very high luminance for bright daylight operation, low light spill for night mode operation, or privacy for display of information for driver only, or for non-driving occupants.

Figure 21B:
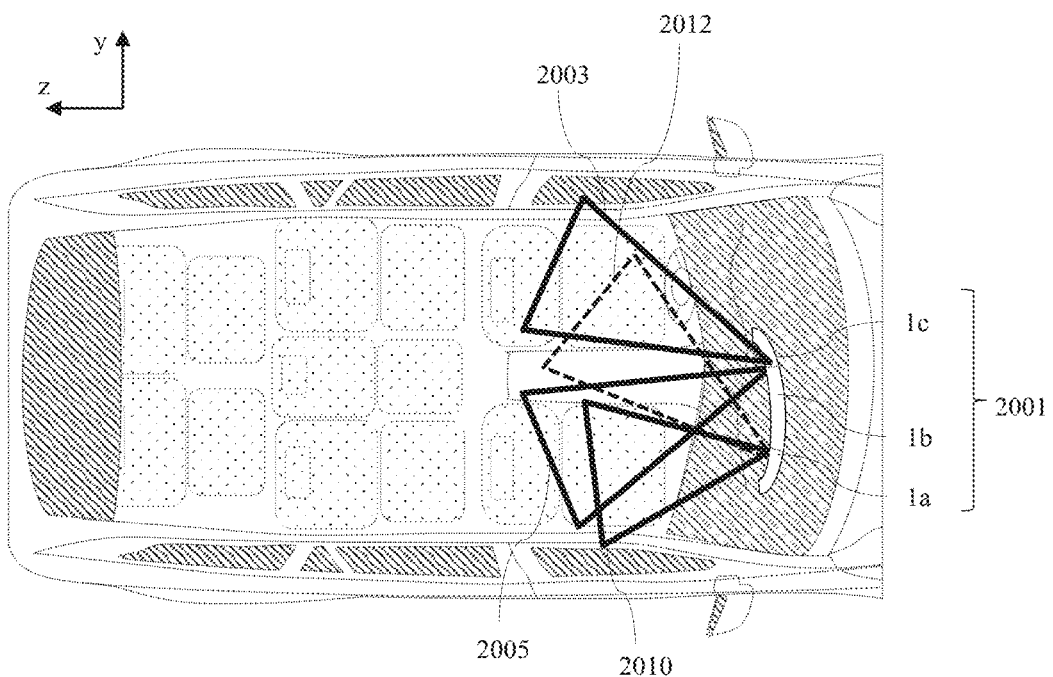
FIG. 21B is a schematic diagram illustrating in top view an automotive cabin and wide format curved display comprising a segmented directional curved backlight operating in selective narrow angle modes, in accordance with the present disclosure.

FIG. 21B is a schematic diagram illustrating in top view an automotive cabin and wide format curved display comprising a segmented directional curved backlight operating in selective narrow angle modes.

The optical valves of the present embodiments comprise waveguides that may be curved. For suitable bend radii, light may be arranged to propagate within the waveguide until an extraction feature is encountered by propagating light, at which point the extraction feature may be arranged to output light towards the driver or passenger. The tilt and orientation of the light extraction feature may be modified with respect to the radius of curvature of the display to provide optical windows appropriately located for head positions for driver and passenger respectively.

Advantageously, curved displays may be provided that may be conveniently located within the cabin space and design.

The operation of displays comprising segmented backlights will now be described.

Figure 22:
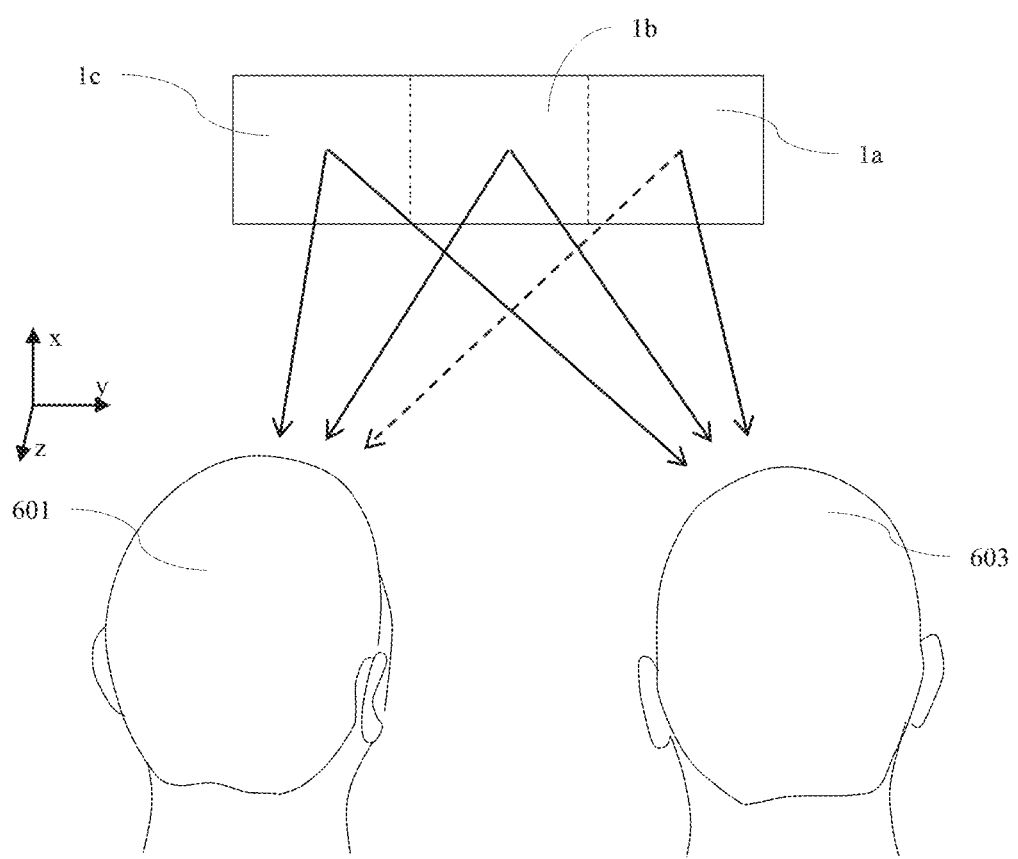
FIG. 22 is a schematic diagram illustrating in perspective view light directionality towards a driver and a passenger from a wide format display comprising a segmented directional backlight, in accordance with the present disclosure.

FIG. 22 is a schematic diagram illustrating in perspective view light directionality towards a driver 601 and a passenger 603 from a wide format display 2000 comprising a segmented directional backlight with segments 1a, 1b, 1c.

Advantageously driver 601 and passenger 603 may be provided with different illumination from each segment in a compact display package.

Figure 23A:
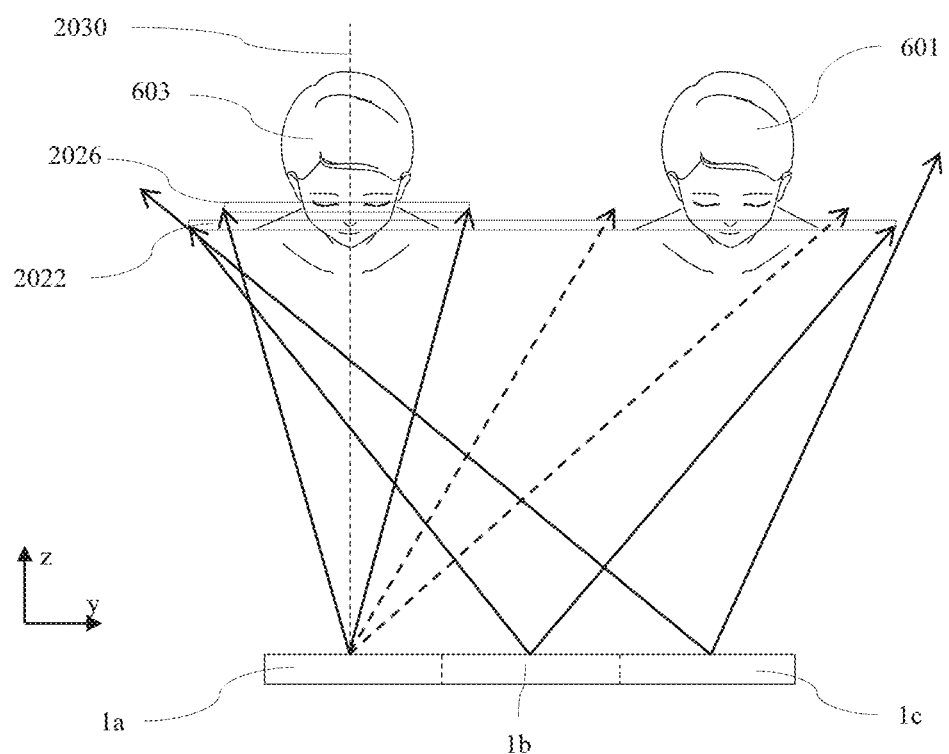
FIG. 23A is a schematic diagram illustrating in top view light directionality towards a driver and a passenger from a wide format display comprising a segmented directional backlight where the passenger or driver is aligned with the optical axis of one of the directional backlights, in accordance with the present disclosure.

FIG. 23A is a schematic diagram illustrating in top view light directionality towards a driver and a passenger from a wide format display comprising a segmented directional backlight where the passenger 603 or driver 601 is aligned with the center-line 2030 of one of the directional backlight segments 1c. Narrow optical window 2026 may be provided to the passenger 603, while wide optical windows 2022 may be provided to the driver and passenger by the segments 1a, 1b.

Figure 23B:
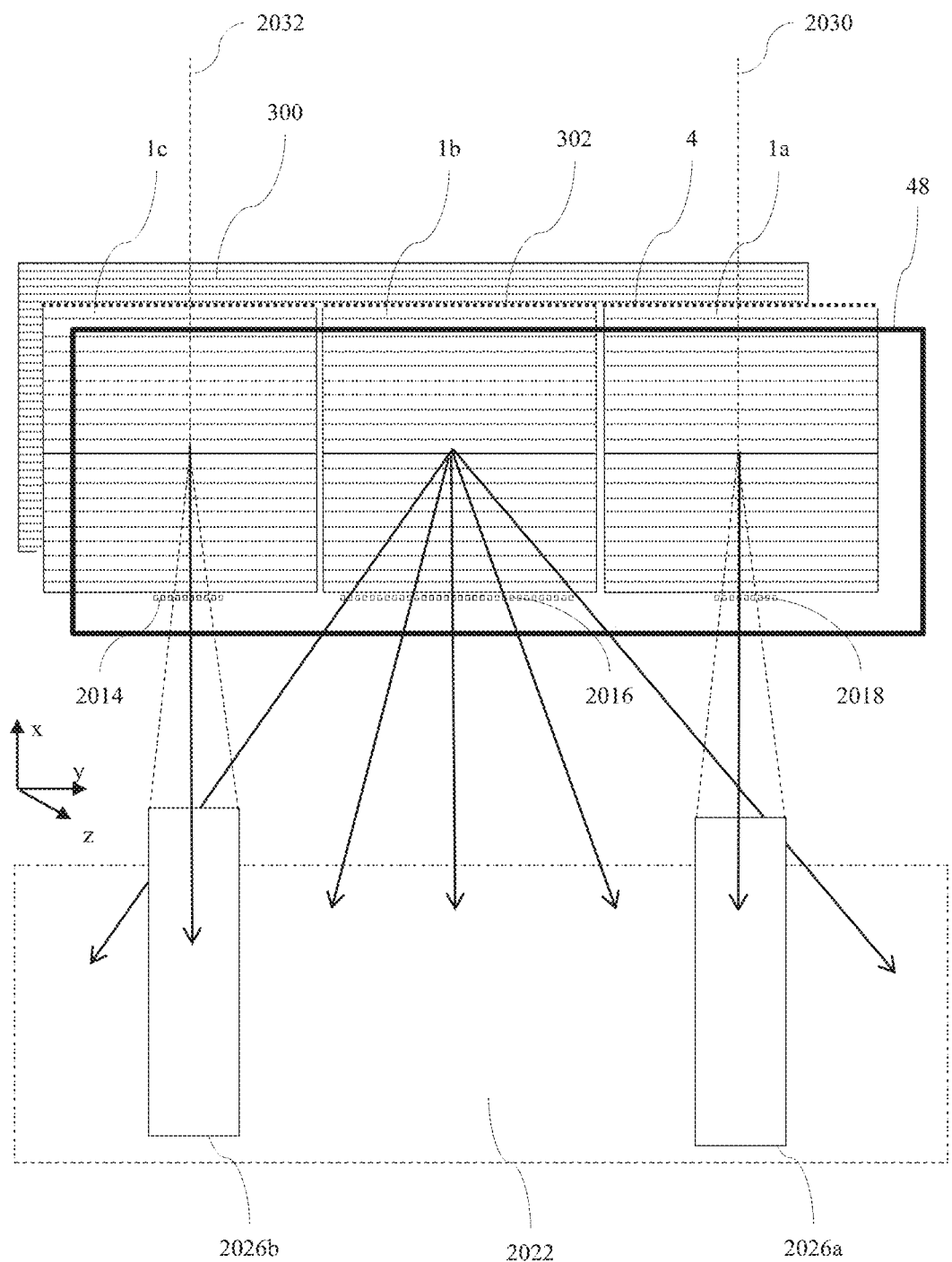
FIG. 23B is a schematic diagram illustrating in perspective front view light directionality towards optical windows from a wide format display in privacy mode comprising segmented directional backlights comprising linear horizontal light extraction features wherein optical windows are aligned with the optical axes of the waveguides, in accordance with the present disclosure.

FIG. 23B is a schematic diagram illustrating in perspective front view light directionality towards optical windows 2026a, 2026b from a wide format display in privacy mode for segmented directional backlights wherein optical windows 2026a, 2026b are aligned with the center-lines 2030, 2032 of the respective waveguide segments 1c, 1a. LED arrays 2018, 2014 may be driven with a narrow width (so that only central LEDs in the arrays 2014, 2018 are driven), while LED array 2016 for the central segment may be provided with a wide width (so that all LEDs in the array 2016 are driven). The width of optical windows 2026a, 2026b, 2028 are thus provided by the width of respective aligned LED arrays 2018, 2014, 2016.

Advantageously the segments 1a, 1b, 1c may be independently controlled by control of width of the illuminated elements in LED arrays 2014, 2016, 2018.

Figure 23C:
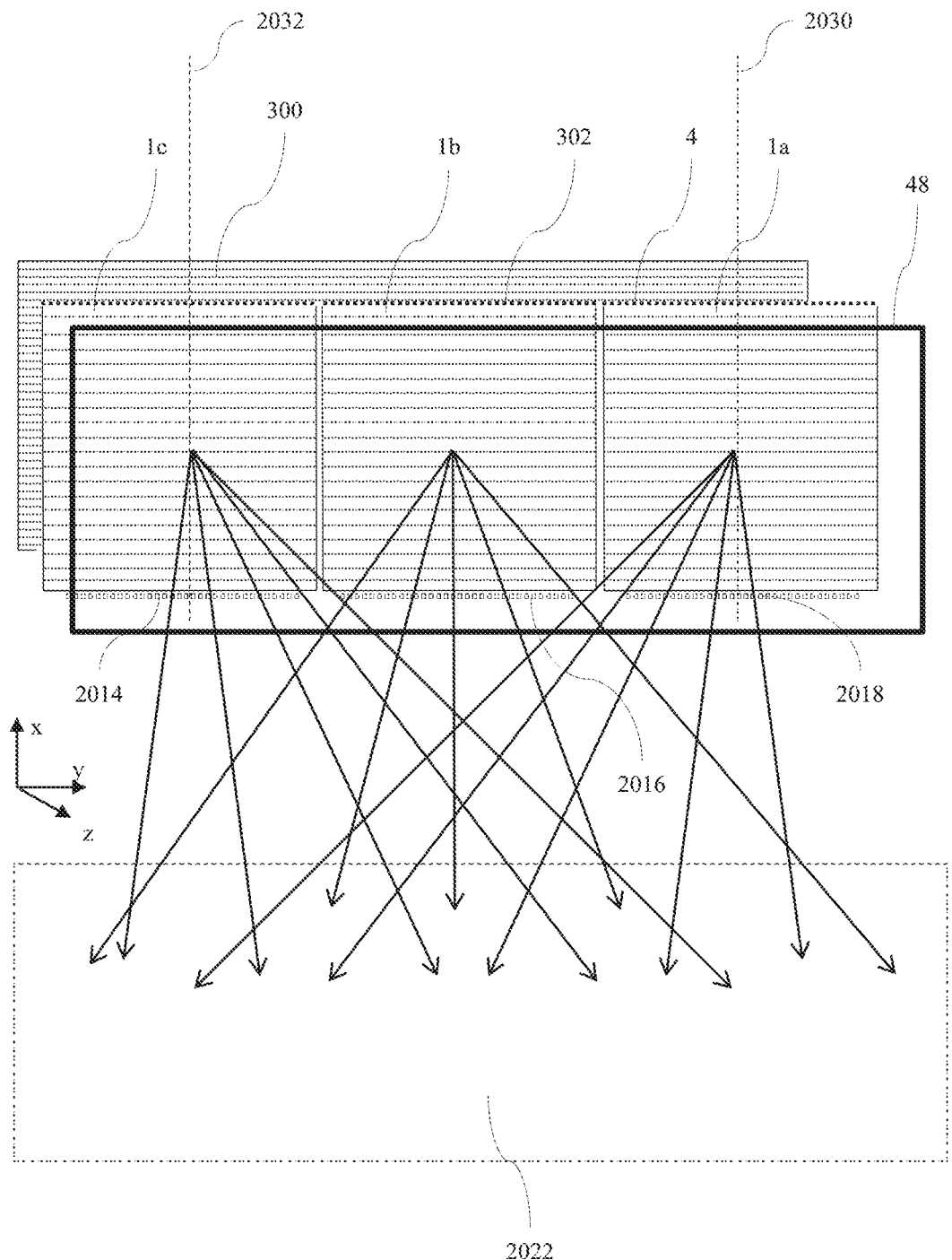
FIG. 23C is a schematic diagram illustrating in perspective front view light directionality towards optical windows from a wide format display in wide angle mode comprising segmented directional backlights comprising linear horizontal light extraction features wherein optical windows are aligned with the optical axes of the waveguides, in accordance with the present disclosure.

FIG. 23C is a schematic diagram illustrating in perspective front view light directionality towards wide angle optical windows 2028 from a wide format display in wide angle mode comprising segmented directional backlights wherein optical windows are aligned with the center-lines 2030, 2032 of the waveguides of the segments 1a, 1b, 1c.

Figure 23D:
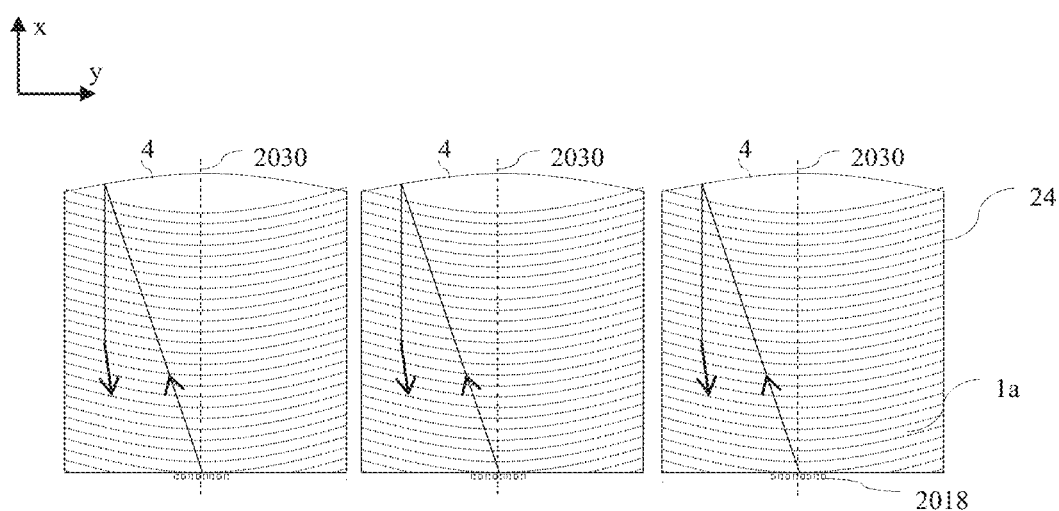
FIG. 23D is a schematic diagram illustrating in front view a wide format display in privacy mode comprising segmented directional backlights comprising curved light extraction features wherein optical windows are aligned with the optical axes of the waveguides, in accordance with the present disclosure.

FIG. 23D is a schematic diagram illustrating in front view a wide format display in privacy mode comprising segmented directional backlights comprising curved light extraction features wherein optical windows are aligned with the optical axes of the waveguides.

Figure 24A:
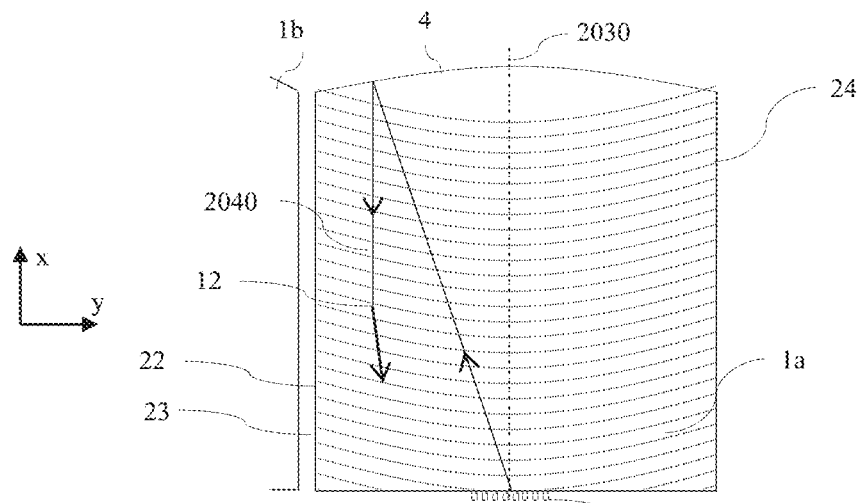
FIG. 24A is a schematic diagram illustrating in front view, on-axis appearance of one segment of a segmented directional waveguide of a directional backlight in privacy mode of operation, in accordance with the present disclosure.

FIG. 24A is a schematic diagram illustrating in front view, on-axis appearance of one segment of a segmented directional waveguide of a directional backlight in privacy mode of operation. In some of the present embodiments, the reflective end 4 is illustrated as a reflective dome; however the reflective end may for example comprise a Fresnel mirror structure.

Segment 1c may comprise a single valve with sides 22, 24. The sides 22a, 24b of the first and second waveguides 1a, 1b that are adjacent are separated by a medium having a lower refractive index than the first and second waveguides. The medium that separates the sides 22a, 24b of the first and second waveguides 1a, 1b that are adjacent is air. A small air gap 23 may thus be arranged between left side 22 of segment 1c and right side 24 of segment 1b. Said air gap 23 may provide total internal reflections within the waveguide 1 of the respective segment, as will be described further herein. Further side mirrors 2045 may be provided on sides 22, 24 for wide angle light propagation as described for example in U.S. Patent Publ. No. 2013-0307831, incorporated by reference herein in its entirety.

Light ray 2040 from an LED near the center-line 2030 of the waveguide segment 1c is directed substantially parallel to sides 22, 24 after reflection from the reflective end 4, and directed by the curved light extraction feature 12 to an optical window 2026a of a passenger 603.

Figure 24B:
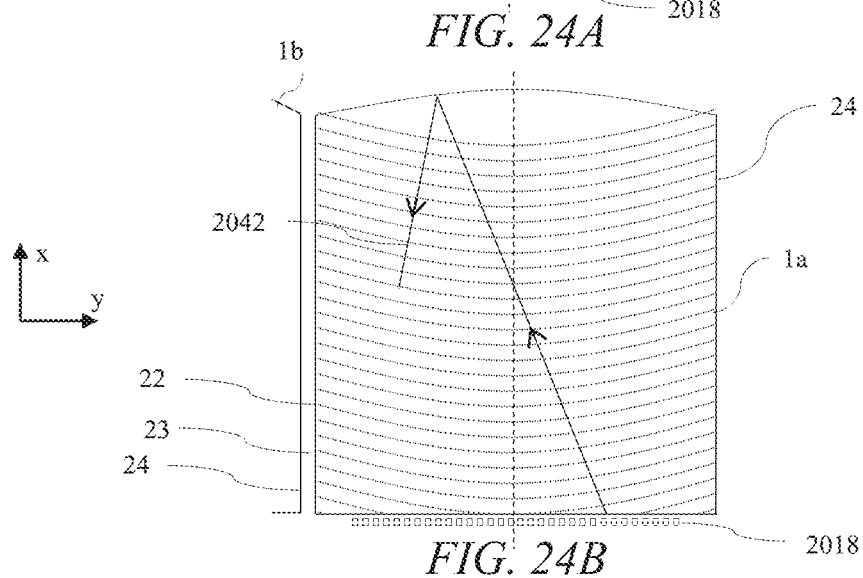
FIG. 24B is a schematic diagram illustrating in perspective corrected front view, off-axis illumination of one segment of a segmented directional waveguide of a directional backlight in wide angle mode of operation, in accordance with the present disclosure.

FIG. 24B is a schematic diagram illustrating in perspective corrected front view, off-axis illumination of one segment 1c of a segmented directional waveguide 1 of a directional backlight in wide angle mode of operation. Ray 2042 is provided by control of off-axis LED of array 2018. Thus light rays may be directed to wide optical window 2028.

Figure 24C:
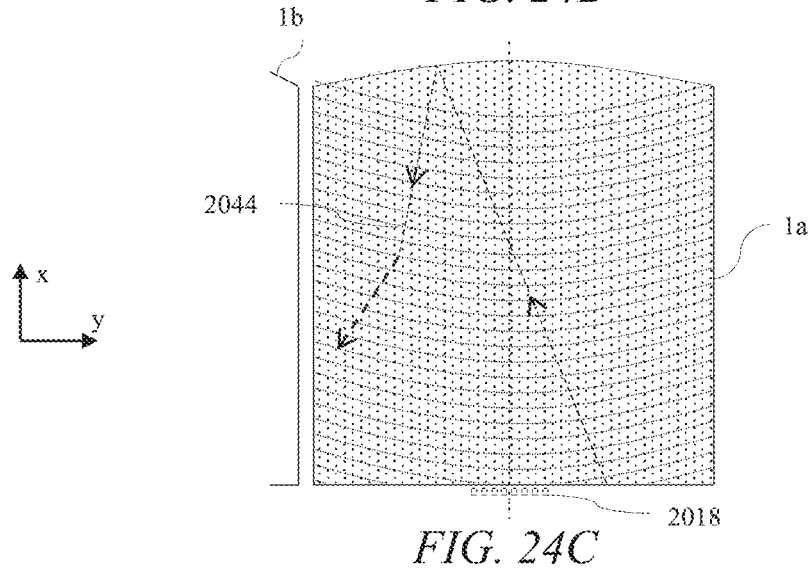
FIG. 24C is a schematic diagram illustrating in perspective corrected front view, off-axis illumination of one segment of a segmented directional waveguide of a directional backlight in privacy mode of operation, in accordance with the present disclosure.

FIG. 24C is a schematic diagram illustrating in perspective corrected front view, off-axis illumination of one segment of a segmented directional waveguide of a directional backlight in privacy mode of operation. In order to provide illumination to driver 601, light ray 2044 would be required. As such light ray is not provided by array 2018, the display is not illuminated and appears dark.

Figure 25A:
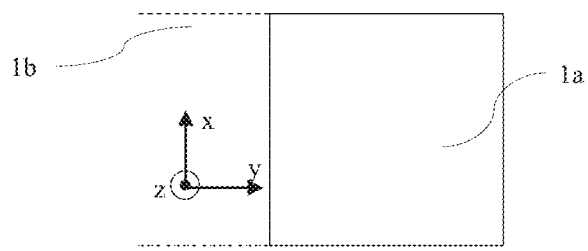
FIG. 25A is a schematic diagram illustrating in front view the appearance of one segment of the segmented backlight in privacy mode of operation for on-axis viewing, in accordance with the present disclosure.

FIG. 25A is a schematic diagram illustrating in front view the appearance of one segment of the segmented backlight in privacy mode of operation for on-axis viewing. Advantageously a uniformly illuminated segment 1c may be provided for the on-axis passenger 603.

Figure 25B:
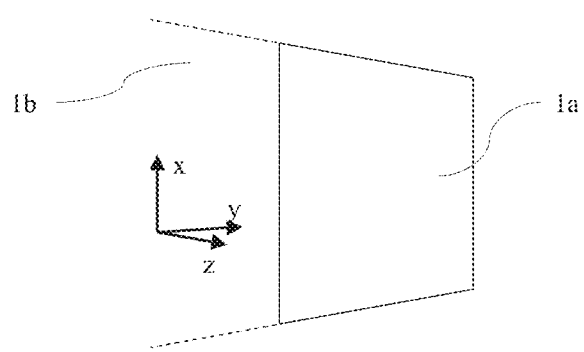
FIG. 25B is a schematic diagram illustrating in perspective view the appearance of one segment of the segmented backlight in wide angle mode of operation for off-axis viewing, in accordance with the present disclosure.

FIG. 25B is a schematic diagram illustrating in perspective view the appearance of one segment of the segmented backlight in wide angle mode of operation for off-axis viewing. Advantageously, the segment 1c is illuminated for the driver 601.

The provision of wide angle illumination for a driver 601 or passenger 603 that is not aligned with either of the center-line 2030 of segment 1c will now be described.

Figure 25C:
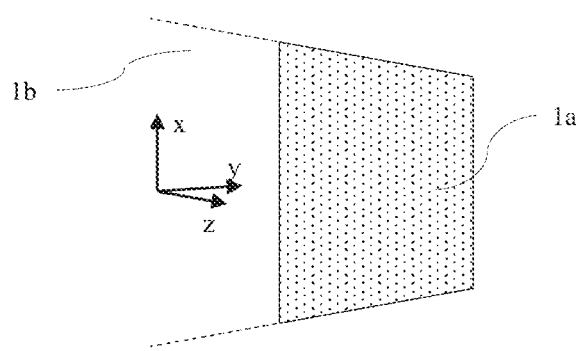
FIG. 25C is a schematic diagram illustrating in perspective view the appearance of one segment of the segmented backlight in privacy mode of operation for off-axis viewing, in accordance with the present disclosure.

FIG. 25C is a schematic diagram illustrating in perspective view the appearance of one segment of the segmented backlight in privacy mode of operation for off-axis viewing. Advantageously the driver 601 sees a reduced luminance for the segment 1c.

The provision of directional illumination to drivers and passengers that are not aligned to the optical axis of the waveguides 1 of the respective segments 1a, 1b, 1c will now be described.

Figure 26:
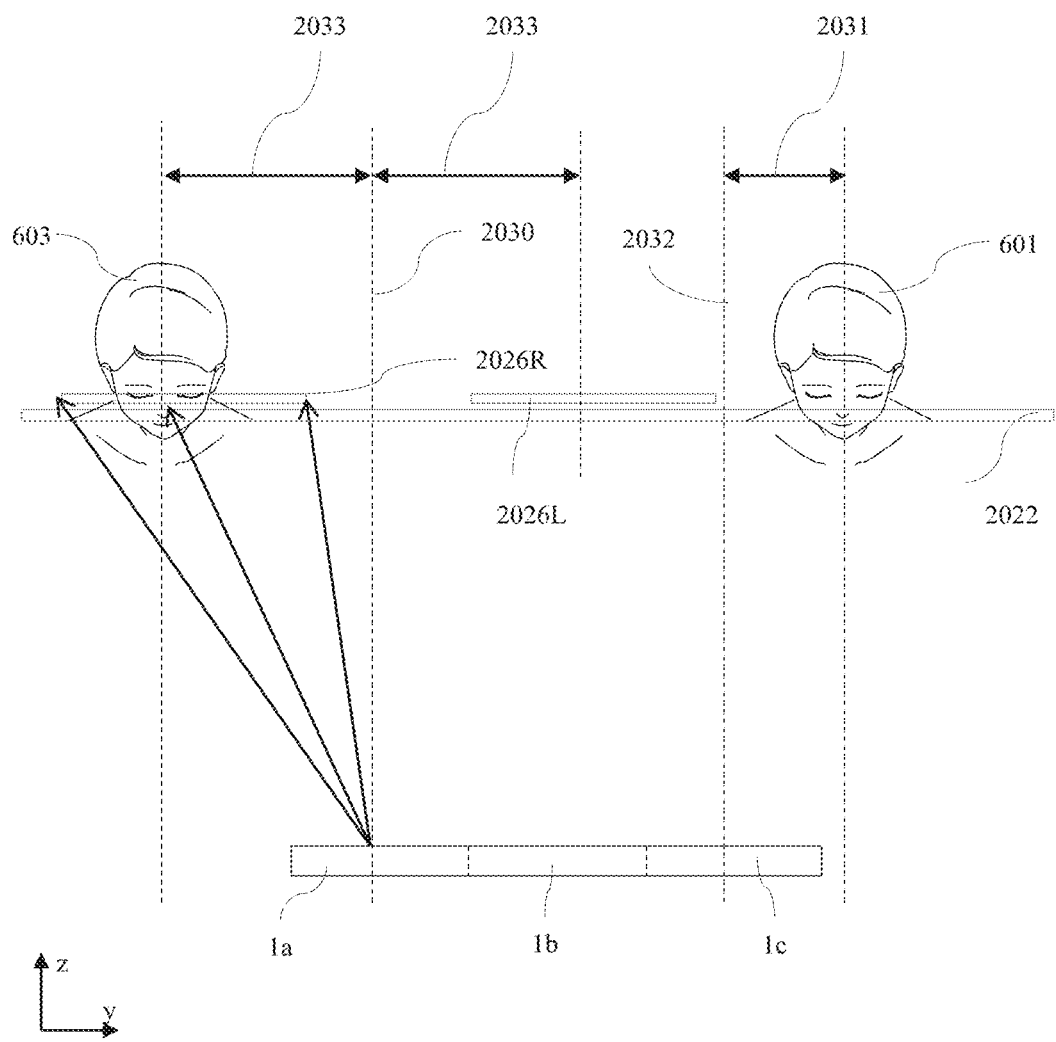
FIG. 26 is a schematic diagram illustrating in top view light directionality towards a driver and a passenger from a wide format display comprising a segmented directional backlight where the passenger is aligned to the right side of the optical axis of one of the directional backlights, in accordance with the present disclosure.

FIG. 26 is a schematic diagram illustrating in top view light directionality towards a driver 601 and a passenger 603 from a wide format display comprising a segmented directional backlight where the passenger 603 is aligned to the right side of the center-line 2030 of one of the directional backlight segments 1c, separated by distance 2033 from the center-line 2030 at the plane of the optical window 2026R. Further the driver 601 may be separated by distance 2031 from the optical axis 2032 of the segment 1a.

The provision of uniform illumination of segment 1c for passenger 603 will now be described.

Figure 27A:
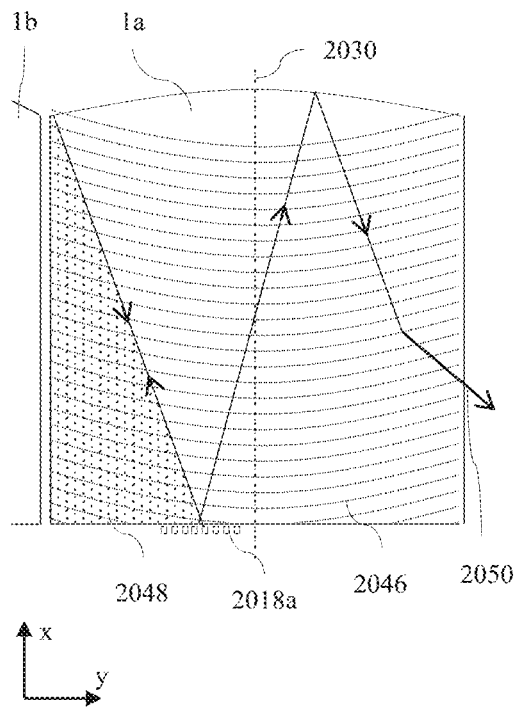
FIG. 27A is a schematic diagram illustrating in perspective corrected front view, right side directed off-axis rays of one segment of a segmented directional waveguide of a directional backlight in privacy mode of operation for a first illumination arrangement, in accordance with the present disclosure.

FIG. 27A is a schematic diagram illustrating in perspective corrected front view, right side directed off-axis rays of one segment 1c of a segmented directional waveguide 1 of a directional backlight in privacy mode of operation for a first illumination arrangement. In operation, light sources of array 2018a are illuminated and light rays from region 2046 are directed as light ray 2050 for example to the off-axis passenger 603 as illustrated in FIG. 26. Void region 2048 is provided as no light rays from array 2018a are provided in this region towards the passenger 603.

It would be desirable to provide illumination into void region 2048.

Figure 27B:
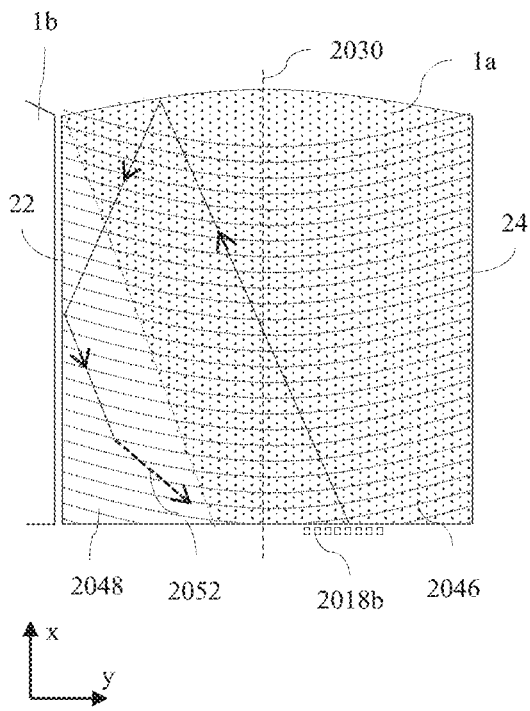
FIG. 27B is a schematic diagram illustrating in perspective corrected front view, right side directed off-axis rays of one segment of a segmented directional waveguide of a directional backlight in privacy mode of operation for a second illumination arrangement arranged to fill illumination voids provided by the first illumination arrangement, in accordance with the present disclosure.

FIG. 27B is a schematic diagram illustrating in perspective corrected front view, right side directed off-axis rays of one segment of a segmented directional waveguide 1c of a directional backlight in privacy mode of operation for a second illumination arrangement arranged to fill illumination voids 2048 provided by the first illumination arrangement. Light sources in array 2018*b* provide rays 2052 that are directed by means of reflection at side 22 of the valve 1 in segment 1*c* to provide illumination of void 2048.

Figure 27C:
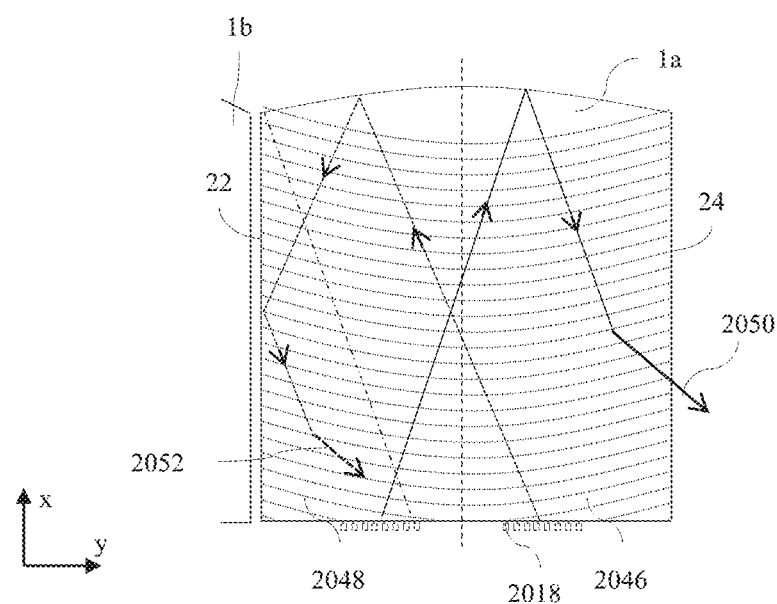
FIG. 27C is a schematic diagram illustrating in perspective corrected front view, right side off-axis rays of one segment of a segmented directional waveguide of a directional backlight in privacy mode of operation for both first and second illumination arrangements, in accordance with the present disclosure.

FIG. 27C is a schematic diagram illustrating in perspective corrected front view, right side off-axis rays of one segment 1*c* of a segmented waveguide of a directional backlight in privacy mode of operation for both first and second illumination arrangements. In combination, arrays 2018*a* and 2018*b* may advantageously achieve uniform illumination of the output of the segment 1*c*.

The appearance of the illumination arrangement of FIG. 27C will now be described.

Figure 28A:
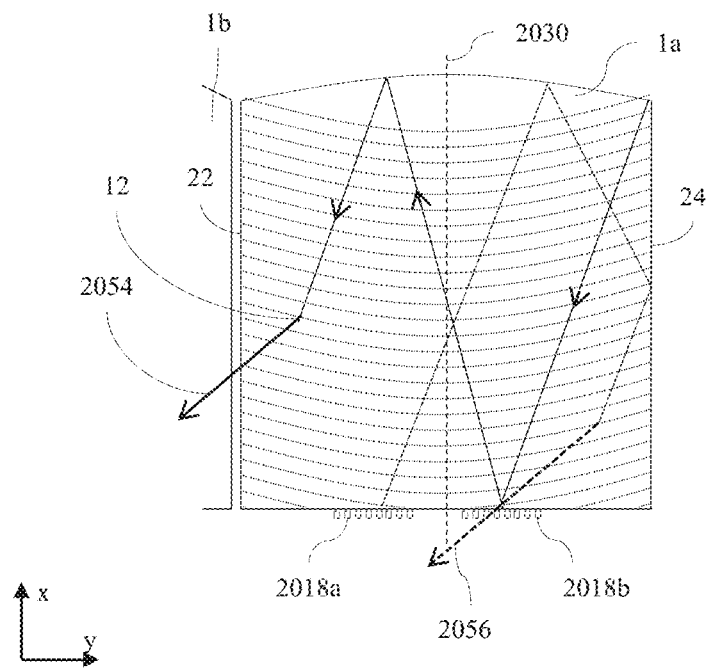
FIG. 28A is a schematic diagram illustrating in perspective corrected front view, left side off-axis appearance of one segment of a segmented directional waveguide of a directional backlight in privacy mode of operation for the first and second illumination arrangements, in accordance with the present disclosure.

FIG. 28A is a schematic diagram illustrating in perspective corrected front view, left side off-axis appearance of one segment 1*c* of a segmented waveguide of a directional backlight in privacy mode of operation for the first and second illumination arrangements. Thus light rays 2054, 2056 from arrays 20181*b*, 2018 respectively.

Figure 28B:
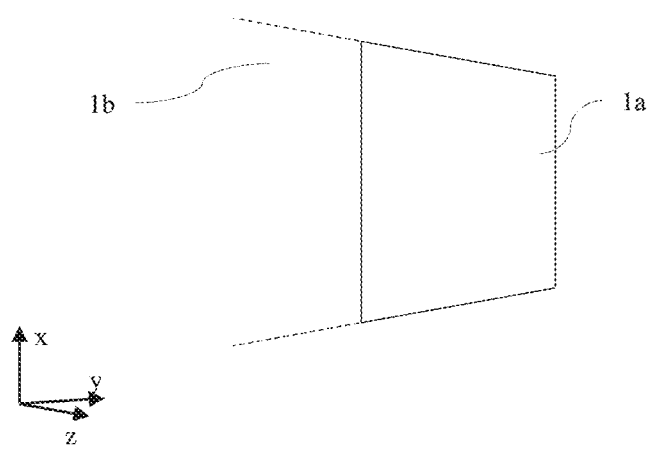
FIG. 28B is a schematic diagram illustrating in perspective view the appearance of one segment of the segmented backlight in privacy mode of operation for left side off-axis viewing for the backlight of FIG. 27A, in accordance with the present disclosure.

FIG. 28B is a schematic diagram illustrating in perspective view the appearance of one segment of the segmented backlight in privacy mode of operation for left side off-axis viewing for the backlight of FIG. 28A. Thus the segment 1*c* may be provided with substantially uniform illumination for a location at the window plane on the left side of the center-line 2030 as illustrated by optical window 2026B in FIG. 26. Such a location may not be the same as the driver 601 location; however, the illumination may distribute some light by scatter and luminance roll-off in the window plane. The driver may see increased luminance in privacy mode of operation of the segment 1*c*, and privacy performance may be compromised.

It would be desirable to increase the privacy performance of the display segment 1*c* for the passenger 603. Further it would be desirable to reduce the visibility of the segment 1*a* that may be observed by the passenger 603 while achieving uniform illumination for the driver 601. Further it would be desirable to provide a single display that may be provided for left and right hand drive vehicles without modification during manufacture or assembly.

Figure 29A:
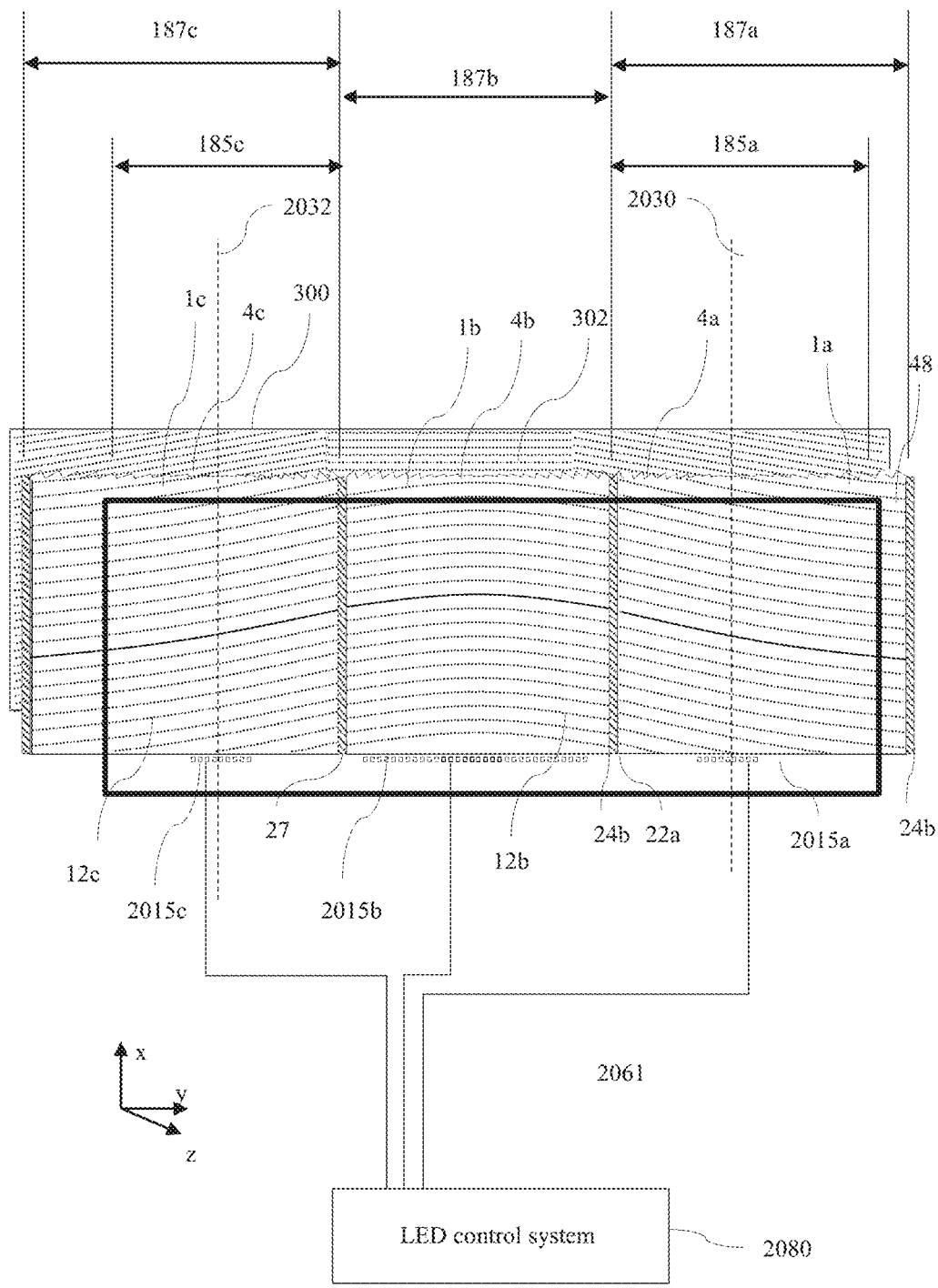
FIG. 29A is a schematic diagram illustrating in perspective front view a segmented directional display comprising different facet arrangements in each waveguide segment, in accordance with the present disclosure.

FIG. 29A is a schematic diagram illustrating in perspective front view a segmented directional display comprising different facet arrangements in each waveguide segment.

Thus a directional display device may comprise plural waveguides 1*a*, 1*b*, 1*c*.

Considering FIG. 13 further, each waveguide 1 of the plural waveguides 1*a*, 1*b*, 1*c* comprises: an input end 2 arranged to receive input light rays 17; a reflective end 4; first and second, opposed guide surfaces 6, 8 extending between the input end 2 and the reflective end 4 for guiding light along the waveguide 1 from the input end 2 to the reflective end 4 for reflection of the input light back along the waveguide 1 as reflected input light; and sides 22, 24 extending between the opposed guide surfaces 6, 8 and between the input end 2 and the reflective end 4, wherein the first guide surface 6 is arranged to guide light by total internal reflection, and the second guide surface 8 comprises light extraction features 12 and intermediate regions 10 between the light extraction features 12, the light extraction features 12 being arranged to deflect the reflected input light rays 17 in directions allowing exit through the first guide surface 6 as output light, the intermediate regions 10 being arranged to direct light along the waveguide without extraction.

In respect of each of the plural waveguides 1*a*, 1*b*, 1*c*, each may have an array of light sources 2015*a*, 2015*b*, 2015*c* disposed at different input positions along the input side 2 of the waveguide and arranged to input input light into the waveguide 1.

Further a transmissive spatial light modulator 48 may be provided, the plural waveguides 1*a*, 1*b*, 1*c* being arranged in a tiled array alongside each other with the first guide surfaces 6 of the plural waveguides 1*a*, 1*b*, 1*c* facing the spatial light modulator 48 and the first ends 2 of the plural waveguides 1*a*, 1*b*, 1*c* on the same side of the array of plural waveguides 1*a*, 1*b*, 1*c*

The spatial light modulator 48 is arranged to receive and modulate the output light from each of the plural waveguides 1*a*, 1*b*, 1*c*.

The plural waveguides 1*a*, 1*b*, 1*c* include a first waveguide 1*a* and a second waveguide 1*b* that are adjacent, wherein the light extraction features 12 of the second waveguide 1*b* are shaped differently from the light extraction features 12 of the first waveguide 1*a*.

The first waveguide 1*a* is arranged at one end of the array of plural waveguides 1*a*, 1*b*, 1*c*.

The width 187*a* of the first waveguide 1*a* may be greater than the width 187*b* of the second waveguide 1*b*. Advantageously, off-axis illumination in wide angle mode to the observer 601 may be provided by reflection from side 24*a*, increasing wide angle uniformity and reducing image artefacts for the filled light. The side 24*a* of the waveguide 1*a* may extend beyond the width of the spatial light modulator 48 in order to achieve improved uniformity in the displayed image. Thus the width of regions 185*a*, 187*b*, 185*c* of the respective waveguides 1*a*, 1*b*, 1*c* that is displayed may be similar. Alternatively the widths 185*a*, 187*b*, 185*c* may be chosen to achieve appropriate privacy imaging regions across the width of the directional display. For example width 187*b* of the central waveguide may be reduced in order to increase the useful width of the privacy regions 185*a*, 185*c*. The shape of the light extraction features 12*b* may be adjusted accordingly to achieve matching with light extraction features 12*a*, 12*c* adjacent waveguides 1*a*, 1*c*.

The sides of the first and second waveguides that are adjacent may alternatively or additionally be separated by a reflective layer 27. Thus sides 22*a*, 24*a* may be coated by a metallic layer or may have a reflective layer such as ESR™ from 3M Corporation adhered to their surface in at least part of the length of the respective sides 22, 24. Both transmitting sides and reflective sides may be provided to achieve desirable angular properties for extracted light, for example to ensure that the light rays 2056 in FIG. 28A remain within the waveguide 1*a* before extraction at features 12*a*. Reflection of light rays 2056 may be provided by metallic reflection, total internal reflection, or Fresnel reflection at material interfaces. The height of the reflective layer 27 may be the same as the height of the sides 22, 24, or may be arranged on part of the height of the sides 22, 24 and an air gap arranged in other parts of the gap between the two sides 22, 24 of adjacent waveguides.

Advantageously, the light that propagates within each waveguide 1*a*, 1*b*, 1*c* may be independently controlled, and light may be partly directed in each waveguide by total internal reflection at sides 22, 24. As described in U.S. Patent Publ. No. 2013-0307831 and incorporated by reference herein in its entirety, such reflection at sides 22, 24 may be used to achieve increased uniformity for off-axis viewing positions, particularly in wide angle mode of operation.

The directional display may further comprise a rear reflector 300 disposed behind the second guide surface 8 of each of the plural waveguides 1*a*, 1*b*, 1*c*. Rear reflectors are described in U.S. Patent Publ. No. 2014-0240828 and in U.S. Patent Publ. No. 2017-0339398, incorporated by reference herein in their entireties.

The rear reflector 300 may comprise an array of reflective facets 302 (as illustrated in FIG. 14) arranged to reflect reflected input light that is transmitted through the light extraction features 12 of the first and second waveguides 1a, 1b, back through the first and second waveguides 1a, 1b to exit through the first guide surface 6.

LED control system 2080 may be provided to control the light sources of the arrays 2015a, 2015b, 2015c of LEDs. Thus a directional display apparatus may comprise a directional display device and a control system 2080 arranged to control the light sources.

The structure and operation of the waveguides 1a, 1b will now be described in further detail.

Figure 29B:
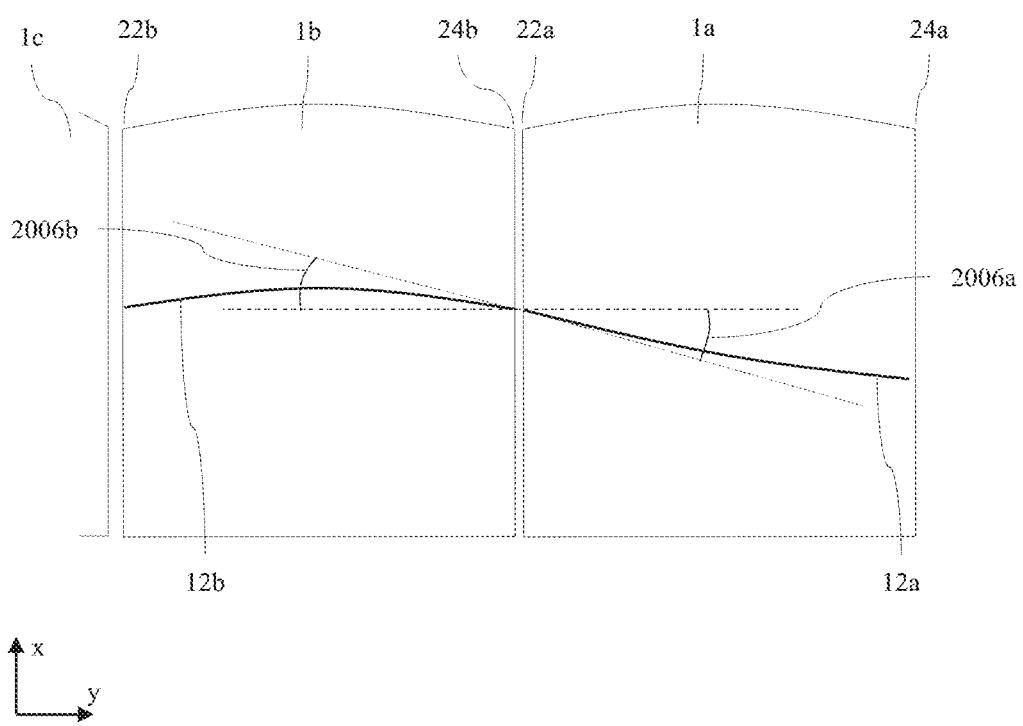
FIG. 29B is a schematic diagram illustrating in front view a segmented directional display with angularly aligned light extraction features, in accordance with the present disclosure.

FIG. 29B is a schematic diagram illustrating in front view a segmented directional display with angularly aligned light extraction features. Along the sides 22a, 24a and 22b, 24b of the first and second waveguides 1a, 1b that are adjacent, the ends of the light extraction features 12a, 12b of the second waveguide 1b are aligned angularly with respect to the lateral direction with the ends of the light extraction features 12a. of the first waveguide 1a.

Angle 2006a illustrates the angle between lateral direction (y-axis) and the tangent of the end of the light extraction feature 12a of the first waveguide 1a at the left side 22a of the first waveguide 1a. Angle 2006b illustrates the angle between lateral direction (y-axis) and the tangent of the end of the light extraction feature 12b of the second waveguide 1b at the right side 24b of the second waveguide 1b. Thus angles 2006a and 2006b are substantially the same.

Figure 29C:
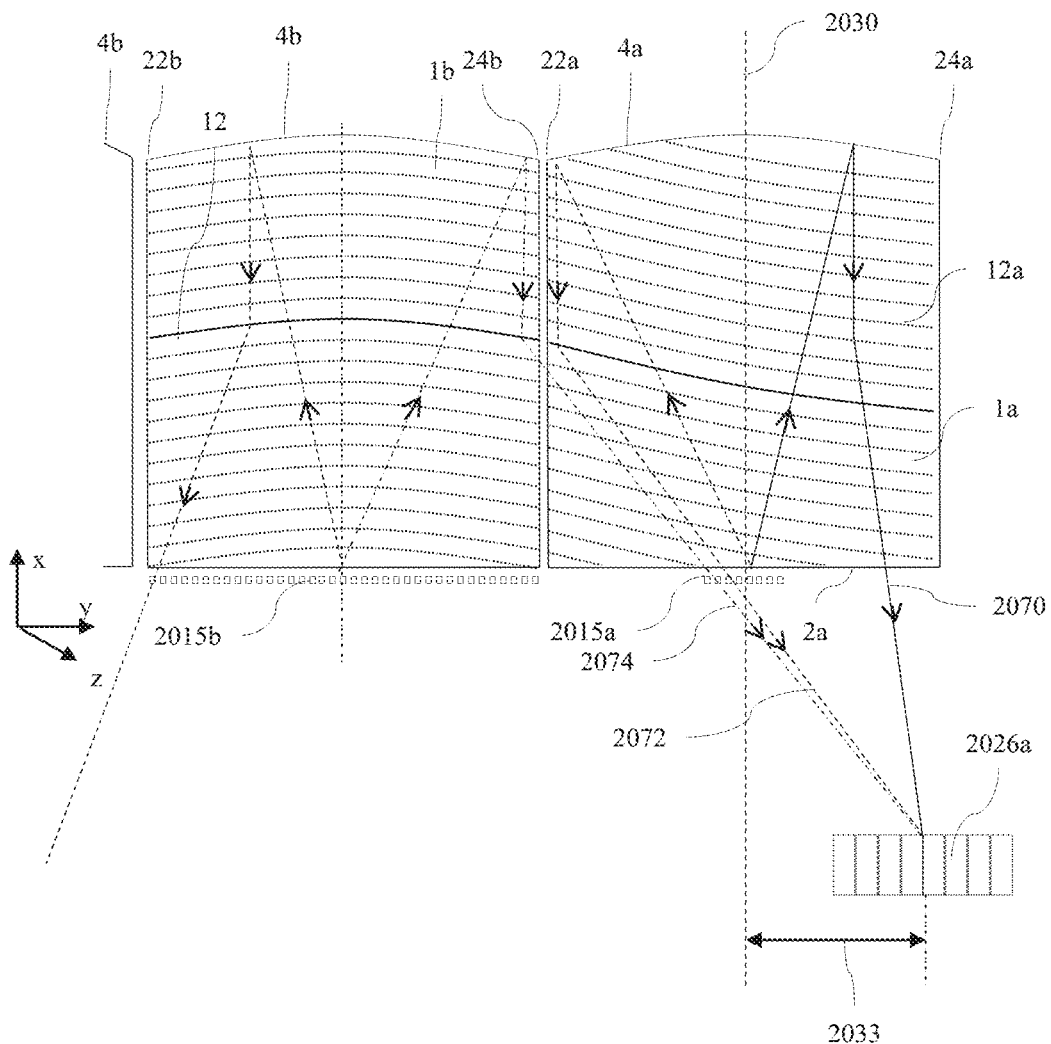
FIG. 29C is a schematic diagram illustrating in perspective front view a segmented directional backlight comprising different facet arrangements in each waveguide segment, in accordance with the present disclosure.

FIG. 29C is a schematic diagram illustrating in perspective front view a segmented directional backlight comprising different facet arrangements in each waveguide segment and further illustrating light ray propagation in the first and second waveguides 1a, 1b.

The reflective end 4a, 4b, 4c of each of the plural waveguides 1a, 1b, 1c has positive optical power in the lateral direction. The reflective ends 4a, 4b, 4c may be arranged to provide substantially collimated light within the respective waveguides 1a, 1b, 1c. Such collimated light advantageously provides uniform illumination of the waveguide across at least part of the width of the waveguide 1 in the lateral direction and provides substantially similar optical performance down the length of the waveguide, achieving vertical uniformity of output. Advantageously the display luminance with vertical direction may be substantially uniform.

In a lateral direction between the sides 22a, 24a of the first waveguide 1a, the light extraction features 12a of the first waveguide 1a are curved and have positive optical power with respect to the reflected input light rays 2070 that are reflected from the reflective end 4a.

In a lateral direction between the sides 22b, 24b of the second waveguide 1b, the light extraction features 12b of the second waveguide 1b are curved and have negative optical power with respect to the reflected input light rays 2074 that are reflected from the reflective end 4b.

The reflective end 4a, 4b of each of the plural waveguides 1a, 1b may have positive optical power in the lateral direction. The light rays 2070, 2072, 2074 from a central LED of the array 2015a are substantially collimated and parallel to the sides 22a, 24a and 22b, 24b of the respective light guides 1a, 1b. Illumination voids (as illustrated in FIG. 27A for example) may be eliminated for an off-axis viewing position, and advantageously uniformity may be improved.

In a lateral direction between the sides 22a, 24a of the first waveguide 1a, the light extraction features 12a of the first waveguide 1a are curved and have positive optical power with respect to the reflected input light, and in a lateral direction between the sides 22b, 24b of the second waveguide 1b, the light extraction features 12b of the second waveguide are curved and have negative optical power with respect to the reflected input light from the reflective end 4b.

LEDs of array 2015a are directed to optical windows 2026a by the waveguide 1a. Thus the first waveguide 1a is arranged to image the light sources of array 2015a disposed at different input positions along the input surface 2a of the first waveguide 1a, in the lateral direction, so that the output light rays 2070, 2072 from the first waveguide 1a is directed into respective optical windows 2026a in output directions that are distributed in dependence on the input positions of the light sources of the array 2015a.

Figure 29D:
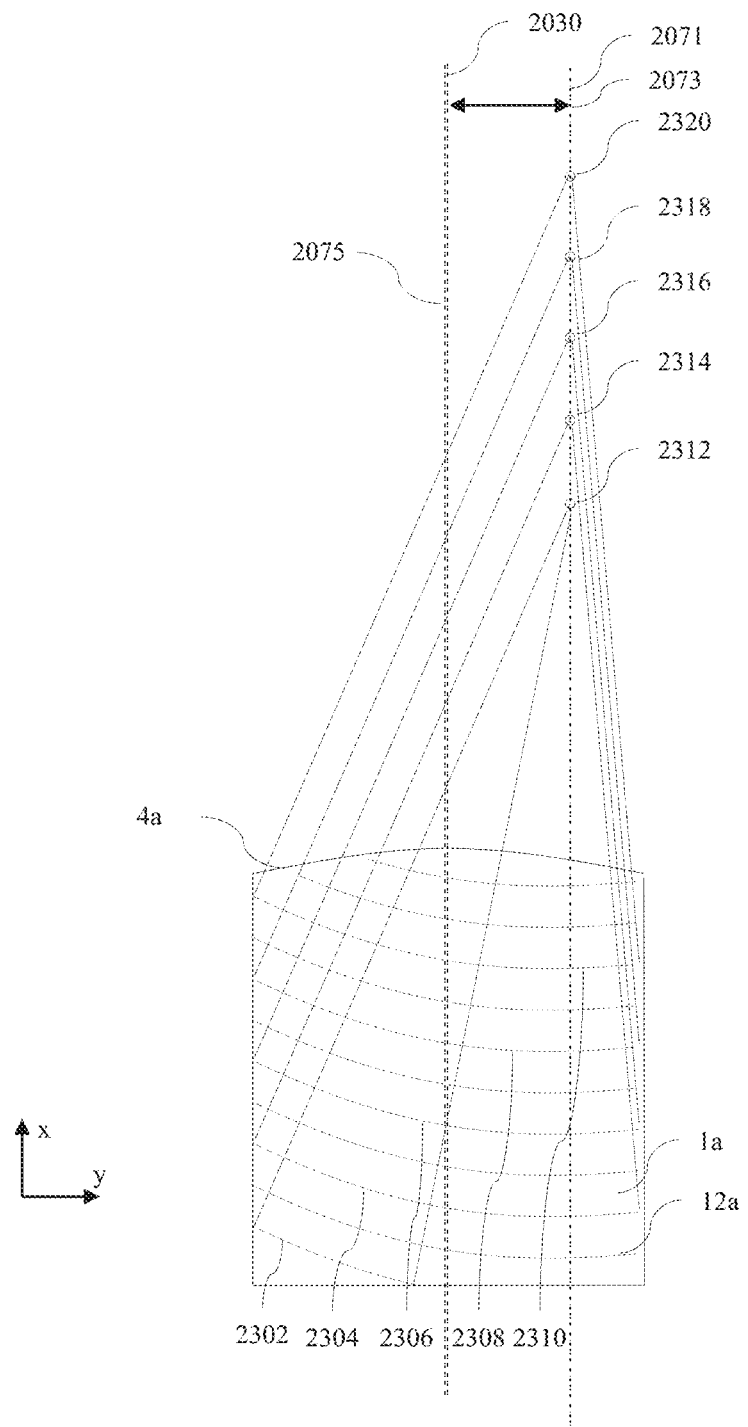
FIG. 29O is a schematic diagram illustrating in front view arrangement of offset curved facets for off-axis optical windows, in accordance with the present disclosure.
FIG. 29E is a schematic diagram illustrating in front view arrangement of offset curved facets and offset optical axis of the reflective end for off-axis optical windows, in accordance with the present disclosure.

FIG. 29D is a schematic diagram illustrating in front view arrangement of offset curved facets for off-axis optical windows 2026a, The optical axis 2071 of the curved light extraction features 12a of the first waveguide 1a may be defined as being the lateral location for the features 12a that are parallel to the lateral direction. The respective light extraction features 2302, 2304, 2306, 2308, 2310 may have centers of curvature 2312, 2314, 2316, 2318, 2320 that are offset in the vertical direction (that is orthogonal to the lateral direction). The first waveguide 1a is arranged at one end of the array of plural waveguides 1a, 1b, 1c.

Advantageously the light extraction features may be formed by tooling in a manner so not as to provide overlapping light extraction features. Further the imaging properties along the length of rays 2070 while propagating within the waveguide 1a after reflection from the reflective end 4a and before extraction at light extraction features 12a are substantially the same. Advantageously the vertical uniformity of output light is improved, increasing uniformity.

The optical axis 2075 of the reflective end 4a may be defined as being the lateral location for the surface of the reflective end 4a that is parallel to the lateral direction. The center-line 2030 may be aligned with the optical axis 2075 of the curved reflective end 4a.

Thus the reflective end 4a of the first waveguide 1a and the light extraction features 12a of the first waveguide 1a. have respective optical axes 2075, 2071 that are offset from each other in the lateral direction.

The offset optical axis 2071 of the curved light extraction features 12a may advantageously achieve off-axis optical windows 2026 without voids as described elsewhere herein.

In operation in wide angle mode, it is desirable to direct light from the waveguide 1a on the right side of the segmented backlight to an observer (such as the driver) that may be at high off-axis angles. The offset optical axis 2075 of the reflective end 4a may provide improved aberrations for such off-axis viewing. Advantageously, uniformity in wide angle mode may be increased in comparison to arrangements wherein the optical axis 2075 of the curved reflective end 4a is aligned with the center-line 2030.

It may be desirable to provide uniform illumination in wide angle mode to an observer other than the privacy user.

Figure 29E:
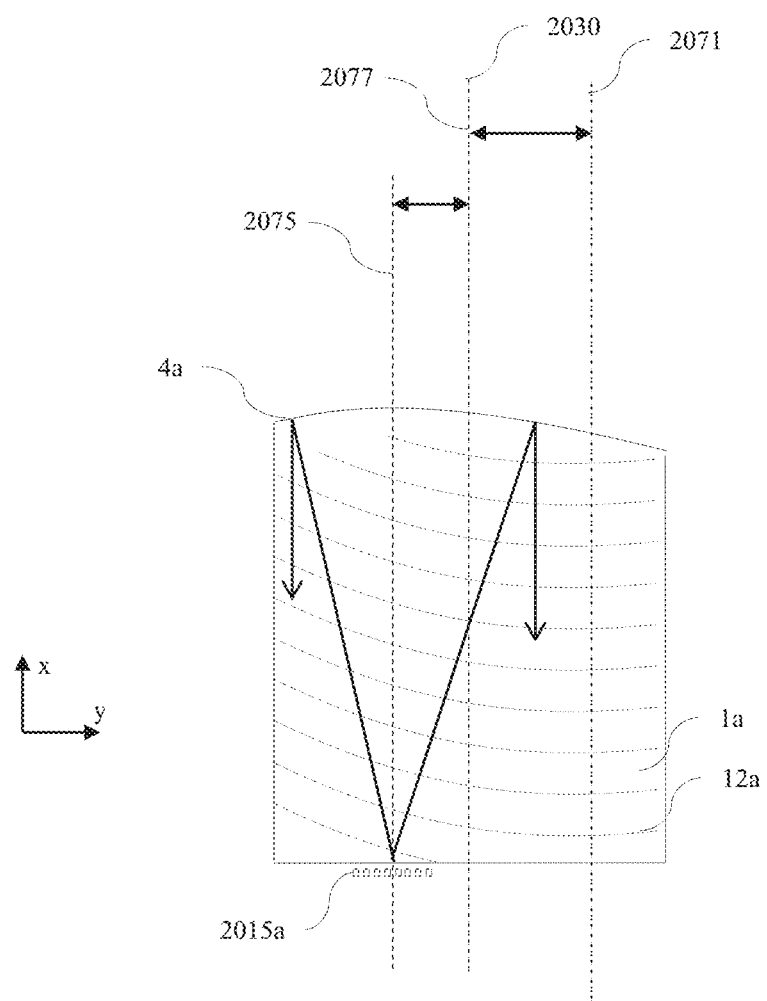

FIG. 29E is a schematic diagram illustrating in front view arrangement of offset curved facets and offset optical axis of the reflective end for off-axis optical windows. Thus the reflective end 4a of the first waveguide 1a and the light extraction features 12a of the first waveguide 1a have respective optical axes 2075, 2071 that are offset from each other in the lateral direction, and are further offset from the center-line of the waveguide 1.

Both optical axes 2071, 2075 may be offset by distances 2073, 2077 respectively from the center-line 2030. Thus the array 2015a and optical axis 2075 may be offset from the center-line of the waveguide 1a. Advantageously, light may be directed to the optical windows 2026a in privacy mode without voids. Further the aberrations for illumination of optical window 2022 to off-axis observer 601 as illustrated in FIG. 26 may be reduced. Advantageously uniformity may be increased for observer 601.

The operation of the reflective end 4a and the light extraction features 12a of the first waveguide 1a will now be described.

Figures 30A, 31A:
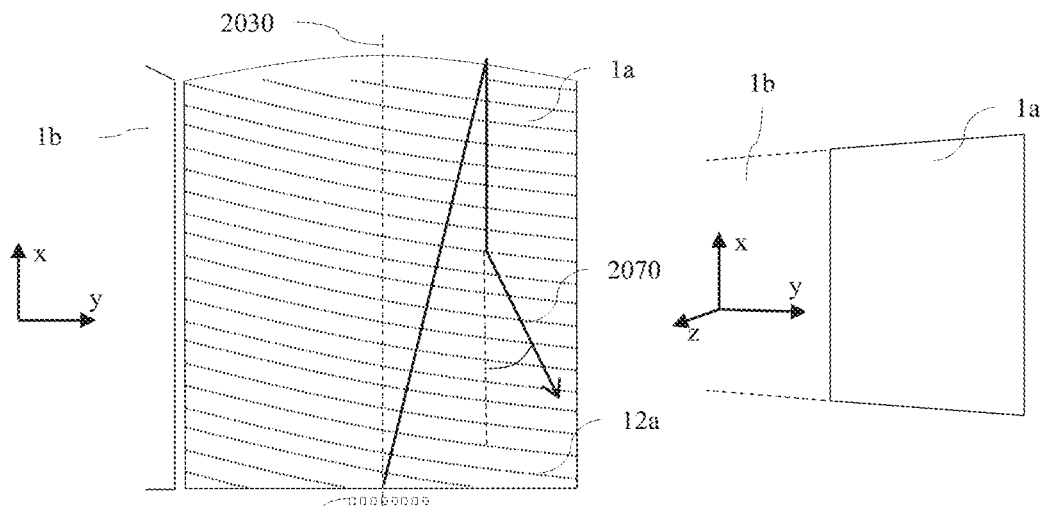
FIG. 30A is a schematic diagram illustrating in perspective corrected front view, right side off-axis appearance of one segment of a segmented directional waveguide of a directional backlight in privacy mode of operation comprising light extraction features that are inclined to the optical axis, in accordance with the present disclosure.
FIG. 31A is a schematic diagram illustrating in front view the appearance of one segment of the segmented backlight in privacy mode of operation for off-axis right sided viewing in Privacy mode, in accordance with the present disclosure.
Figures 30B, 31B:
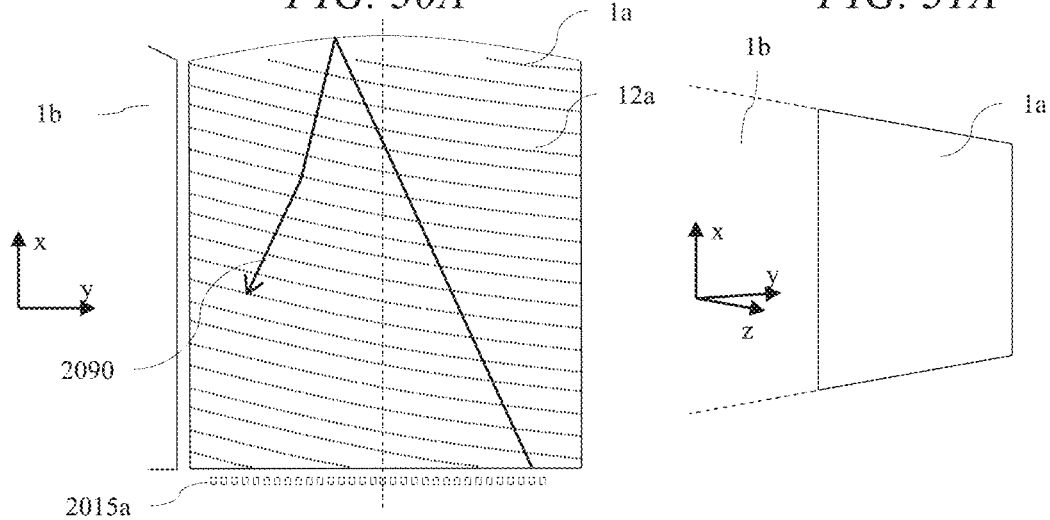
FIG. 30B is a schematic diagram illustrating in perspective corrected front view, off-axis illumination of one segment of a segmented directional waveguide of a directional backlight in wide angle mode of operation comprising light extraction features that are inclined to the optical axis, in accordance with the present disclosure.
FIG. 31B is a schematic diagram illustrating in front view the appearance of one segment of the segmented backlight in privacy mode of operation for off-axis left sided viewing in wide angle mode, in accordance with the present disclosure.
Figures 30C, 31C:
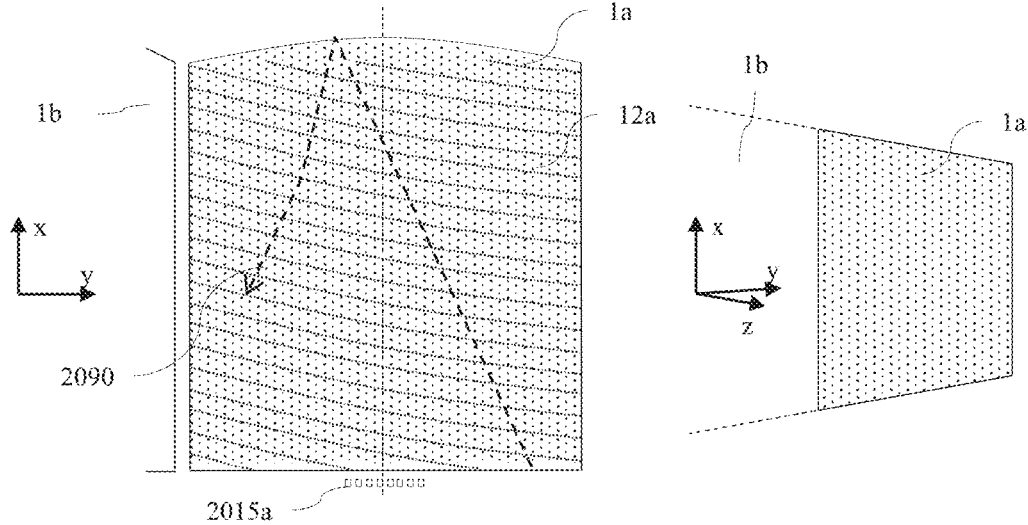
FIG. 30C is a schematic diagram illustrating in perspective corrected front view, off-axis illumination of one segment of a segmented directional waveguide of a directional backlight in privacy mode of operation comprising light extraction features that are inclined to the optical axis, in accordance with the present disclosure.
FIG. 31C is a schematic diagram illustrating in front view the appearance of one segment of the segmented backlight in privacy mode of operation for off-axis left sided viewing in Privacy mode, in accordance with the present disclosure.
Figure 32A:
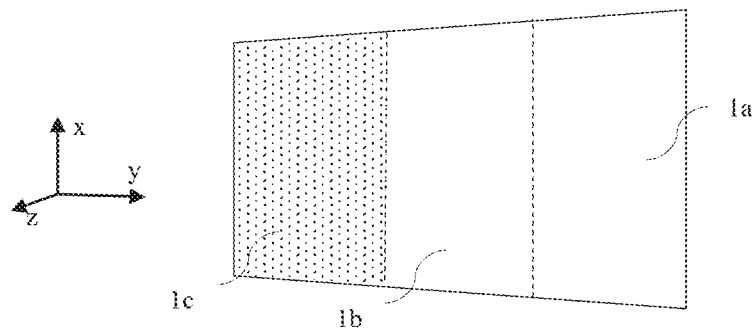
FIG. 32A, FIG. 32B, FIG. 32C, and FIG. 32D are schematic diagrams illustrating in perspective views the appearance of three segments of a segmented backlight operating in privacy and wide angle modes for right and left viewing positions, in accordance with the present disclosure.
Figure 32B:
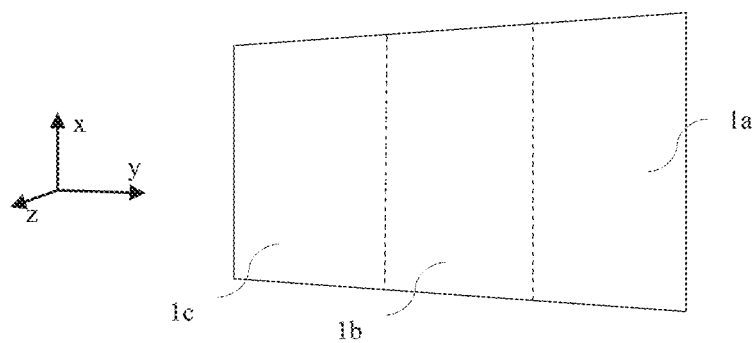
Figure 32C:
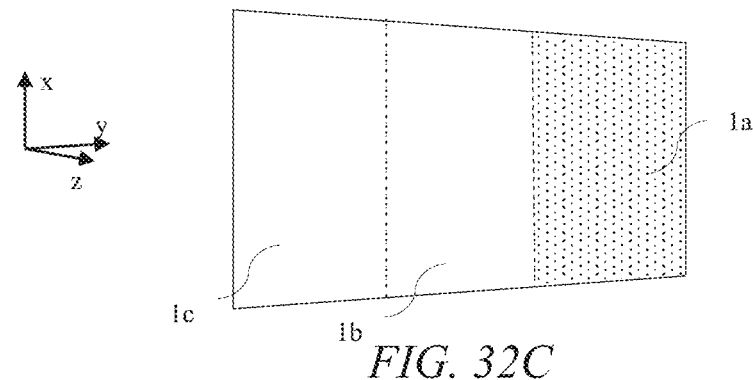
Figure 32D:
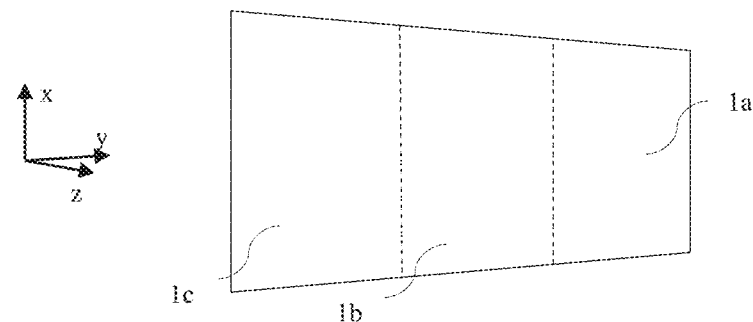

FIG. 30A is a schematic diagram illustrating in perspective corrected front view, right side off-axis appearance of one segment of a segmented directional waveguide 1a of a directional backlight in privacy mode of operation comprising light extraction features 12a that are inclined to the optical axis. FIG. 30B is a schematic diagram illustrating in perspective corrected front view, off-axis illumination of one segment of a segmented directional waveguide of a directional backlight in wide angle mode of operation comprising light extraction features that are inclined to the optical axis. FIG. 30C is a schematic diagram illustrating in perspective corrected front view, off-axis illumination of one segment of a segmented directional waveguide of a directional backlight in privacy mode of operation comprising light extraction features that are inclined to the optical axis.

FIG. 31A is a schematic diagram illustrating in front view the appearance of one segment of the segmented backlight in privacy mode of operation for off-axis right sided viewing in Privacy mode. FIG. 31B is a schematic diagram illustrating in front view the appearance of one segment of the segmented backlight in privacy mode of operation for off-axis left sided viewing in wide angle mode. FIG. 31C is a schematic diagram illustrating in front view the appearance of one segment of the segmented backlight in privacy mode of operation for off-axis left sided viewing in Privacy mode.

Thus in privacy mode, the optical windows 2026a that are formed by rays 2070 provide substantially uniform illumination for a viewer on the right side of the center-line 2030 of the waveguide 1a. Further, the off-axis observer to the left side of the waveguide 1a may observe uniform low luminance from the waveguide 1a. In wide mode of operation, the width of illuminated LEDs in the array 2015 is increased so that both observers may see a substantially uniformly illuminated waveguide 1a.

Advantageously, an off-axis privacy display with uniform luminance in privacy and wide angle modes is provided.

The modes of operation of the arrangement of FIG. 29A will now be described.

Figure 33A:
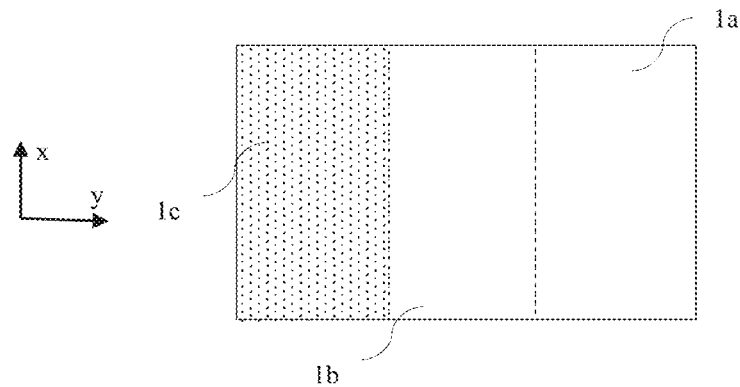
FIG. 33A, FIG. 33B, and FIG. 33C are schematic diagrams illustrating in front views the appearance of three segments of a segmented backlight operating in privacy and wide angle modes for a centrally located observer, in accordance with the present disclosure.
Figure 33B:
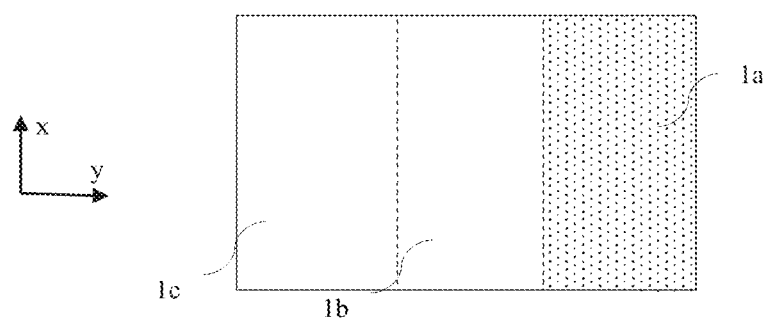
Figure 33C:
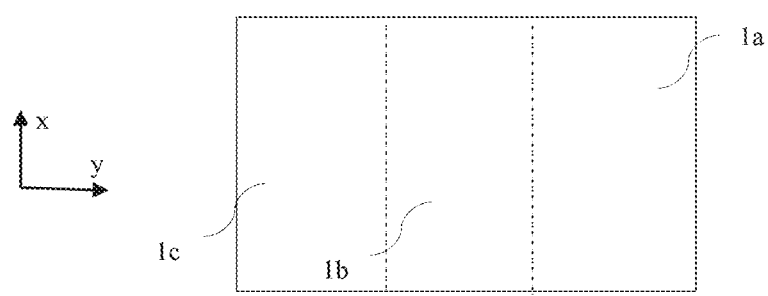

FIGS. 32A-D are schematic diagrams illustrating in perspective views the appearance of three segments of a segmented backlight operating in privacy and wide angle modes for right and left viewing positions. FIGS. 33A-C are schematic diagrams illustrating in front views the appearance of three segments of a segmented backlight operating in privacy and wide angle modes for a centrally located observer.

Thus in one mode of operation a passenger may see a dark image for the waveguide and illuminated images for the waveguides 1a, 1b. Similarly a driver may see a dark passenger image from waveguide 1a, and illuminated images for the waveguides 1b, 1c. Both viewers may see a fully illuminated display when both displays are in wide angle mode. Advantageously information that is not intended for passenger or driver may be provided, and switching between privacy and wide angle modes achieved.

Further centrally located observers (such as rear seat passengers may be provided with full area illumination or partial illumination, although the level of privacy performance may be degraded.

Arrangements of rear reflectors 300 will now be described.

Figure 34A:
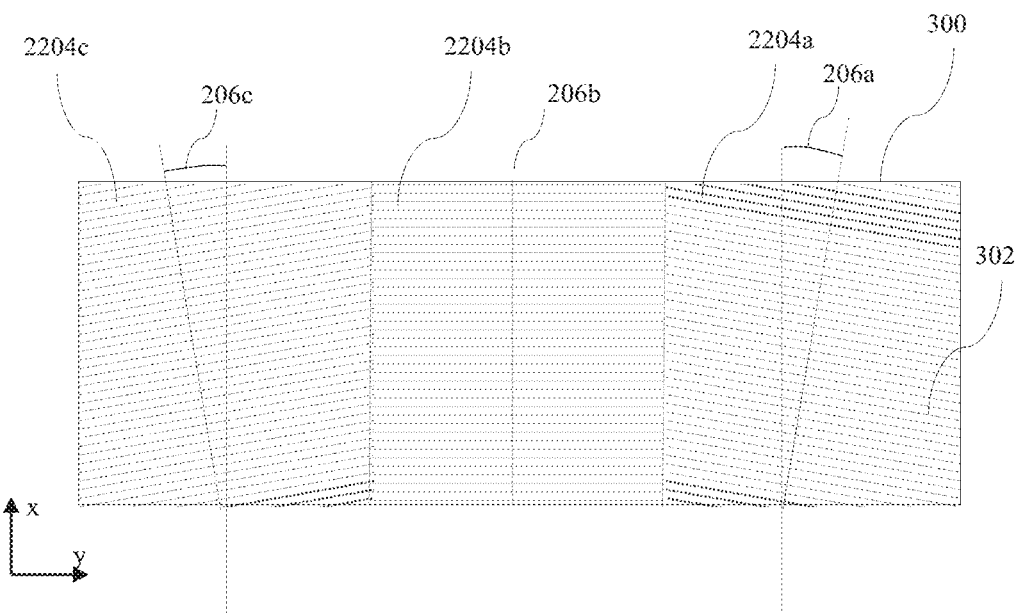
FIG. 34A and FIG. 34B are schematic diagrams illustrating in front views the appearance of rear reflectors for the arrangement of FIG. 29A, in accordance with the present disclosure.
Figure 34B:
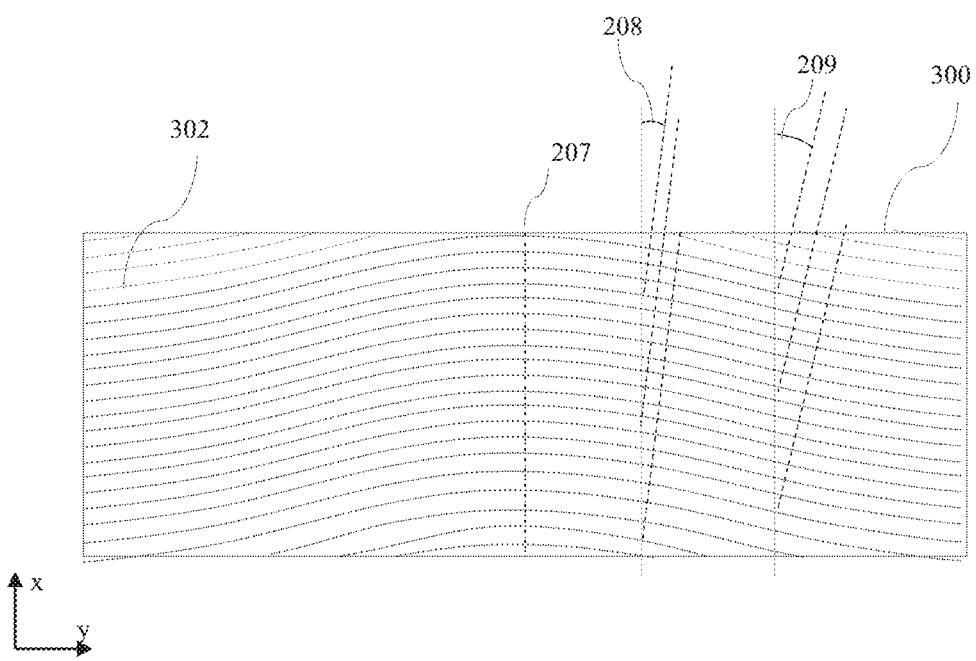

FIGS. 34A-B are schematic diagrams illustrating in front views the appearance of rear reflectors for the arrangement of FIG. 29A. As illustrated in FIG. 34A, the rear reflector 300 may have parts 2204a, 2204b, 2204c that are arranged behind each of the plural waveguides 1a, 1b, 1c. The facets 2202 of the rear reflector may be linear and may be inclined at angles 206a, 206b, 206c to the optical axis 2075 of the reflective end 4a, 4b, 4c of the waveguides 1a, 1b, 1c.

The inclinations 206a, 206b, 206c of the facets 2202 may be similar to the inclinations of the light extraction features 12 of the respective aligned waveguides 1a, 1b, 1c.

Advantageously display luminance may be increased, by collection of light rays that are transmitted through the light extraction features 12a, 12b, 12c of the waveguides 1a, 1b, 1c. Further optical windows may be provided to the respective observers.

For example the optical windows provided by light transmitted through the features 12a, and reflected by facets 2202 in part 2204a of the rear reflector 300 may be aligned with the optical windows or 2026a provided by reflection at the facets 2202. Alternatively the optical windows for the light reflected from the rear reflector may be arranged at different window locations. For example the light extraction features 12a may be curved whereas the features 2202 may be linear. Advantageously different window locations may provide improved display uniformity roll-off for lateral movement of the observer as described in U.S. Patent Publ. No. 2017-0339398, incorporated by reference herein in its entirety.

As illustrated in FIG. 34B the reflective facets 2202 may be curved in the lateral direction with different optical power in the parts of the rear reflector behind the first and second waveguides 1a, 1b. Thus the tilt angles 2207, 2208, 2209 of the reflective facets 2202 may vary with lateral position across the rear reflector and may be the same as the tilt angles of the light extraction features 12a, 12b of the respective waveguides 1a, 1b.

Figure 35A:
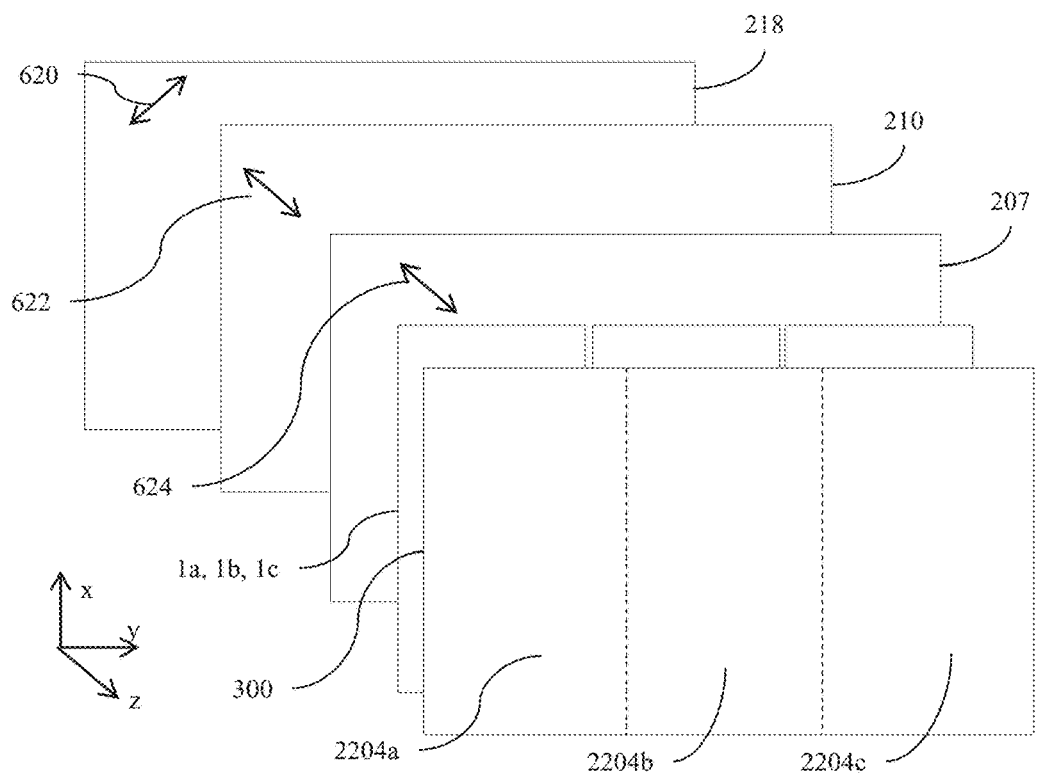
FIG. 35A is a schematic diagram illustrating in perspective rear view a stack of polarization management components of a directional display apparatus comprising a twisted nematic liquid crystal spatial light modulator, in accordance with the present disclosure.

FIG. 35A is a schematic diagram illustrating in perspective rear view a stack of polarization management components of a directional display apparatus comprising a twisted nematic liquid crystal spatial light modulator 48. Referring to the optical stack of FIG. 14 for example, output polarizer 218 may have an electric vector transmission direction 620 of +45 degrees, with input polarizer 210 having an electric vector transmission direction 622 of 45 degrees. Reflective polarizer 207 may have an electric vector transmission direction 624 that is aligned with the direction 622 of input polarizer 210.

Rear reflector 300 may be arranged with facets 2202, 2303 that are elongate in the lateral direction (for example parallel to the y-axis). Alternatively and as described herein the facets 2202, 2303 may have a curvature about the z-axis. Said curvature may be arranged to provide control of window plane location that is matched to or different from the window plane location from the waveguide 1, as described in U.S. Patent Publ. No. 2017-0339398 and incorporated by reference herein in its entirety.

The propagation of polarization states in the arrangement of FIG. 35A will now be described.

Figure 35B:
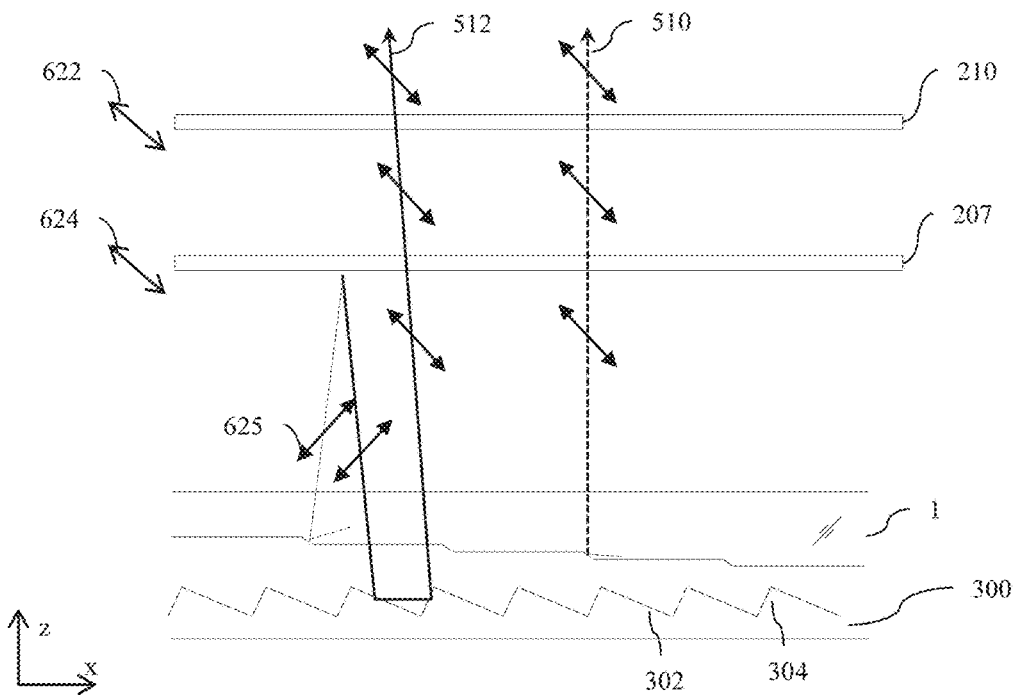
FIG. 35B is a schematic diagram illustrating in side view recirculated polarized light propagation in the directional display of FIG. 35A, in accordance with the present disclosure.

FIG. 35B is a schematic diagram illustrating in side view recirculated polarized light propagation in the directional display of FIG. 35A. Light ray 510 illustrates that light with −45 degrees linear polarization state is transmitted through the reflective polarizer 207 and input polarizer 210. Light ray 512 illustrates propagation of light from the waveguide 1 that has a +45 degrees polarization state. After reflection at the reflective polarizer 207 and rear reflector 300 surface 302, the polarization state is rotated to −45 degrees and transmitted through the input polarizer 210 of the LCD.

Thus the spatial light modulator 48 may be arranged to modulate a first polarization component, the directional display device further comprising a reflective polarizer 207 disposed between the first guide surfaces 6 of the plural waveguides 1a, 1b, is and the spatial light modulator 48. The reflective polarizer 207 may be arranged to transmit the first polarization component 624 and to reflect a second polarization 625 component of the output light that is orthogonal to the first polarization component 624 as rejected light, and the rear reflector 2202 may further comprise intermediate facets 304 extending between the reflective facets 2202 of the rear reflector 300 and inclined in opposite senses from the reflective facets 2202 of the rear reflector 300 in a common plane. Pairs of a reflective facet 2202 and an intermediate facet 304 together form corner facets arranged to reflect the rejected light for supply back to the spatial light modulator 48 by rays 512, the pairs of a reflective facet 2202 and an intermediate facet 304 being inclined in a plane that is oriented around the normal to the spatial light modulator 48 so that the rear reflector 300 converts the second polarization component 625 of the rejected light into the first polarization component 624 on reflection.

The rear reflector 300 may have parts 2204a, 2204b, 2204c behind each of the plural waveguides 1a, 1b, 1c and the reflective facets may be curved in the lateral direction with different optical power in the parts of the rear reflector behind the first and second waveguides 1a, 1b.

Advantageously the light efficiency of the display may be increased. Further the vertical viewing angle may be improved.

The propagation of polarized light in a directional display comprising an In Plane Switching (IPS) LCD will now be described.

Figure 36A:
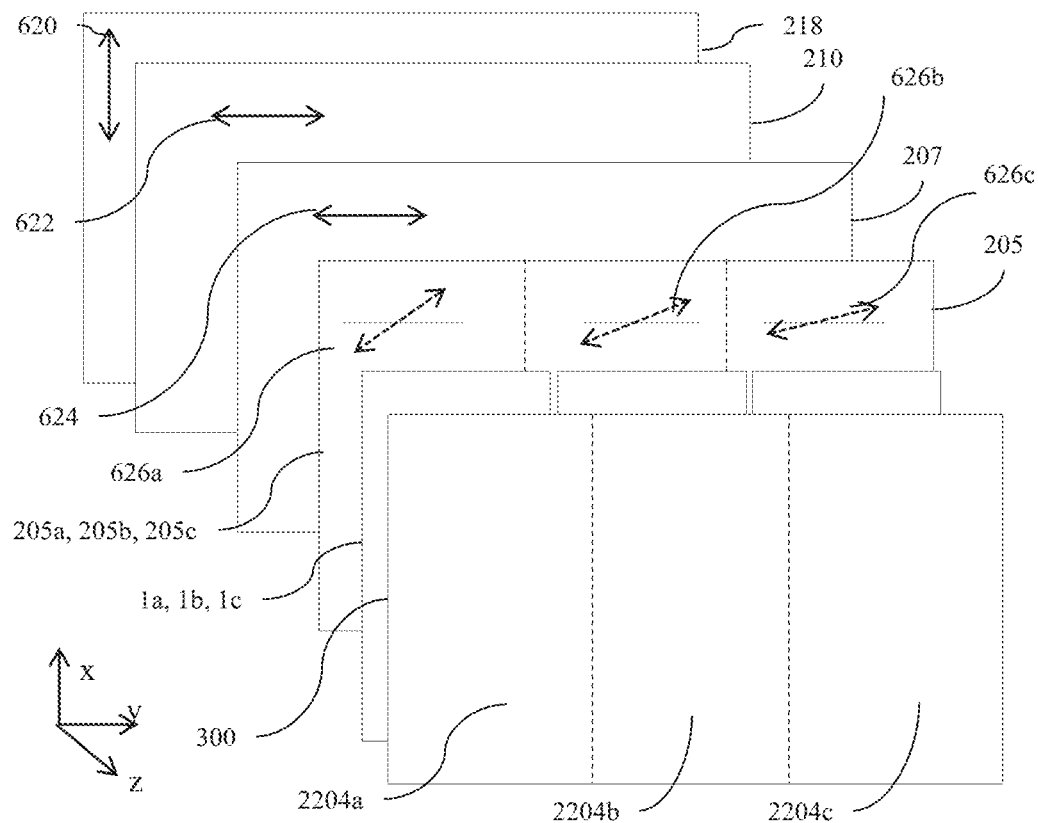
FIG. 36A is a schematic diagram illustrating in perspective rear view a stack of polarization management components of a directional display apparatus comprising an in plane switching mode liquid crystal spatial light modulator, in accordance with the present disclosure.
Figure 36B:
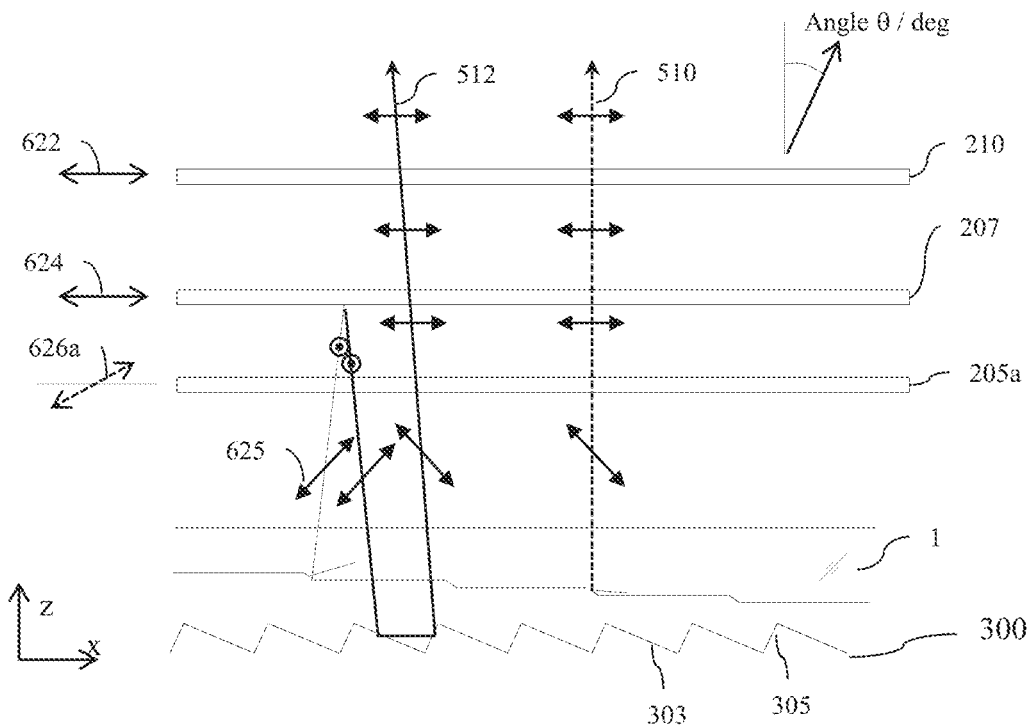
FIG. 36B is a schematic diagram illustrating in side view recirculated polarized light propagation in the directional display of FIG. 36A, in accordance with the present disclosure.

FIG. 36A is a schematic diagram illustrating in perspective rear view a stack of polarization management components of a directional display apparatus comprising an in plane switching mode liquid crystal spatial light modulator and FIG. 36B is a schematic diagram illustrating in side view recirculated polarized light propagation in the directional display of FIG. 36A.

By way of comparison to the arrangement of FIG. 35A the output polarization electric vector direction 620 may be 90 degrees and the input polarizer direction 622 may be 0 degrees to a predetermined direction that is the lateral direction. To achieve polarization rotation at the rear reflector 300, a 45 degrees linear polarization state is provided by means of an adjustment retarder 205a, 205b, 205c disposed between the reflective polarizer 207 and the rear reflector 300. The adjustment retarder 205a, 205b, 205c may have a slow axis direction 626a, 626b, 626c that is similar to 22.5 degrees or 67.5 degrees and may be a half wave retarder at a wavelength of 500 nm for example. The adjustment retarder slow axis direction 626a, 626b, 626c may be inclined differently for different portions of the retarder 205a, 205b, 205c, to achieve substantially 45 degree polarization state incident on each of the portions of the rear reflector. Advantageously the efficiency of the polarization recirculation can be increased.

In operation, polarized light at +45 degrees from the waveguides 1a, b, 1c propagating along ray 512. may be rotated to a 90 degrees linear polarization by adjustment retarder 205a, 205b, 205c before reflection by the reflective polarizer 207 and reflection from the rear reflector 300 to provide a −45 degrees polarization state. Said polarization state may be further rotated by the adjustment retarder 205 so that a 0 degrees linear polarization is provided to be transmitted through the reflective polarizer 207 and input polarizer 210.

Advantageously polarization recirculation is achieved in directional displays comprising an input polarizer that has an electric vector transmission axis that is not inclined at 45 degrees to the elongate facets of the rear reflector.

Figure 37:
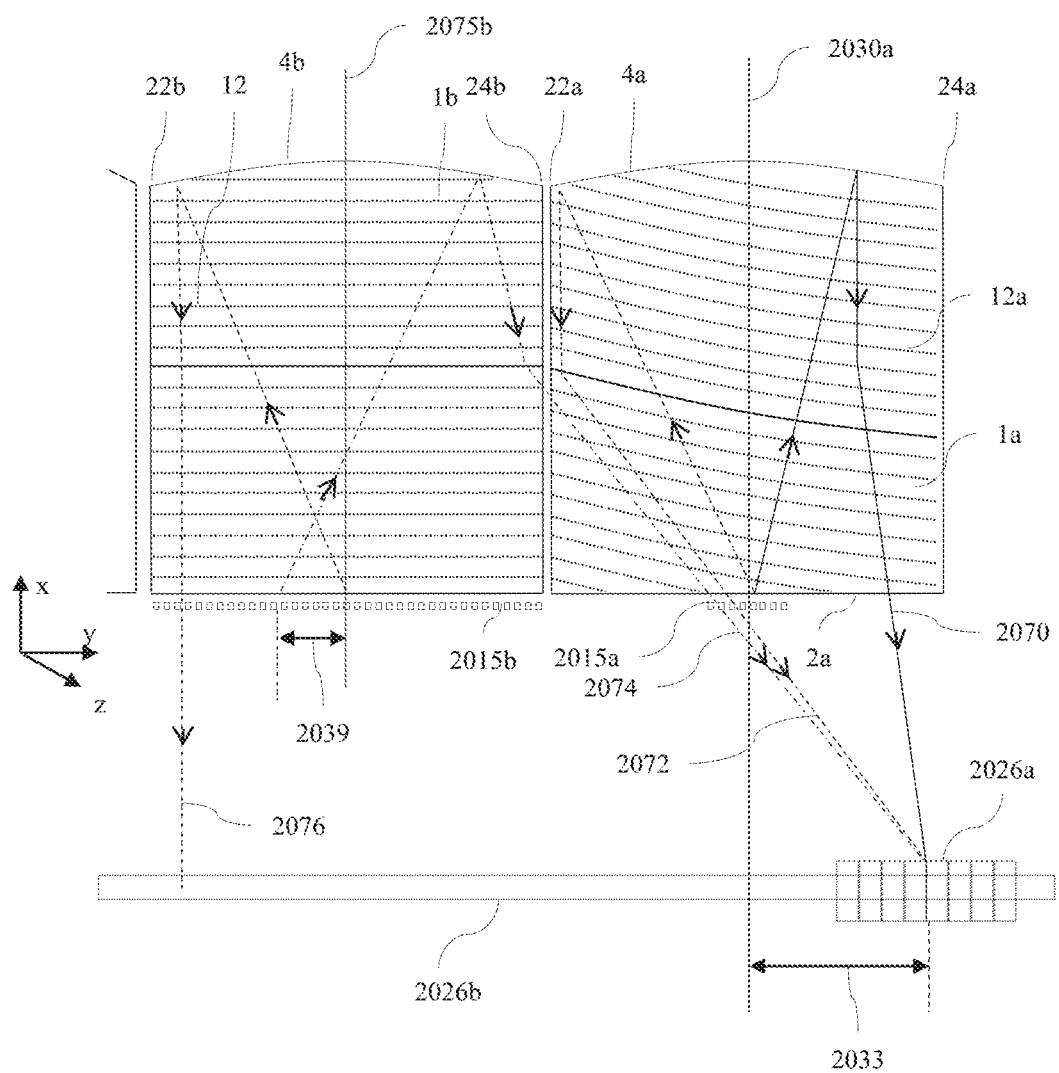
FIG. 37 and FIG. 38 are schematic diagrams illustrating in perspective front view segmented directional backlights comprising linear light extraction features for at least one of the waveguides, in accordance with the present disclosure.
Figure 38:
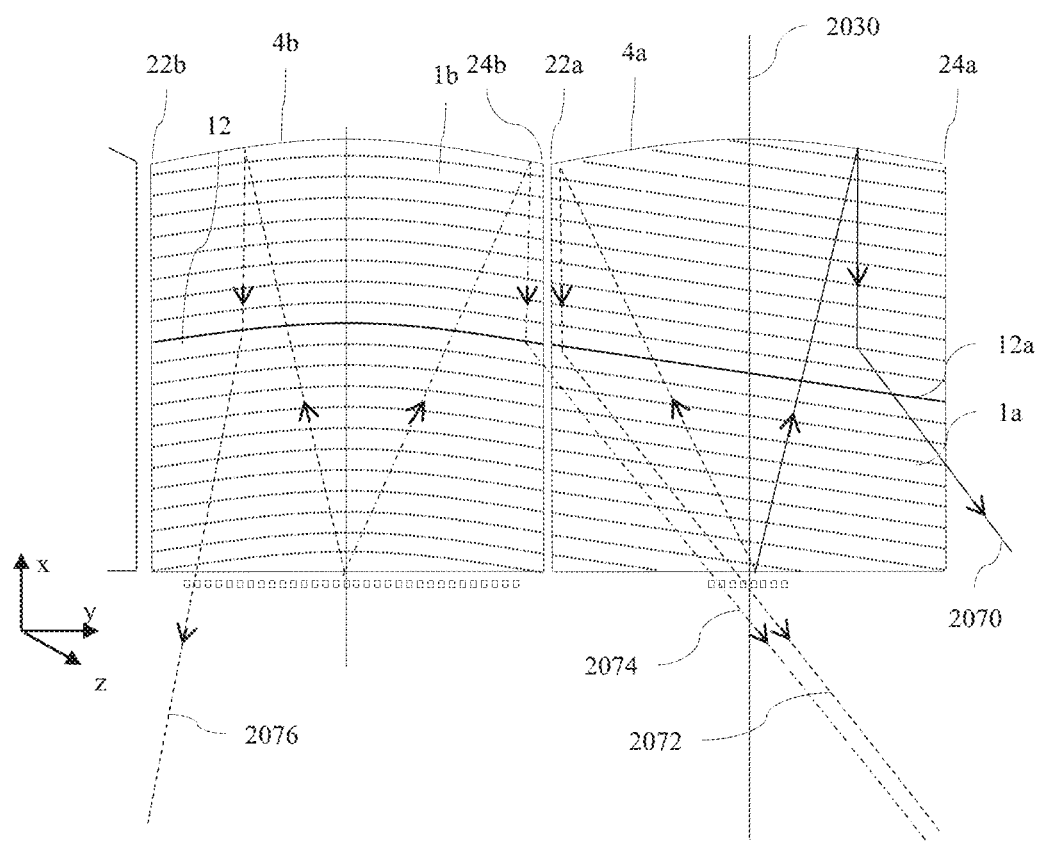

FIGS. 37 and 38 are schematic diagrams illustrating in front view segmented directional backlights comprising linear light extraction features for at least one of the waveguides of the plurality of waveguides 1a, 1b, 1c.

FIG. 37 is a schematic diagram illustrating in front view a segmented directional backlight comprising linear light extraction features for the waveguide 1b, in a lateral direction between the sides 22a, 24a of the first waveguide 1a, the light extraction features 12a of the first waveguide 1a are curved and have positive optical power with respect to the reflected input light, and in a lateral direction between the sides 22h, 24h of the second waveguide 1b, the light extraction features 12b of the second waveguide are straight and have zero optical power with respect to the reflected input light. In a lateral direction between the sides of the second waveguide, the light extraction features 12 of the second waveguide 1b are straight.

In operation, light rays 2076 from the reflective end 4b are directed in a direction parallel to the optical axis 2075b of the waveguide 1b.

In embodiments comprising light extraction features 12 with zero optical power with respect to the reflected input light from the reflected end 4, direct light rays 2076 from an LED of the array 2015 into the same parallel directions towards the observer 601, 603 across the width of the waveguide. Such rays thus do not cross at a window plane in front of the display. Thus an observer in front of the display will observer light from different LEDs across the width of the display. Advantageously, the luminance of the part of the display that is normal to the observer may have the highest luminance. Such a display appearance provides comfortable visual roll off of display lateral luminance with observer lateral position.

By way of comparison, light extraction features 12 with positive optical power with respect to the reflected input light from the reflected end 4, direct light rays 2072 from an LED of the array 2015 are directed into the same optical window 2026 towards the observer 601, 603 across the width of the waveguide, and thus the direction of the light rays 2070, 2072 are different across the width of the respective waveguide 1. Thus an observer in front of the display at the window plane will observer light from the same LED across the whole width of the display. Advantageously the region of observation of an image with low privacy level is optimized.

The ends of the light extraction features 12b of the second waveguide 1b are aligned angularly with respect to the lateral direction with the ends of the light extraction features 12a of the first waveguide 1a.

In comparison to the arrangement of FIG. 29C, the lateral uniformity of the display in wide angle mode may advantageously be improved.

FIG. 38 is a schematic diagram illustrating in front view a segmented directional backlight comprising linear light extraction features for the waveguide 1a. The light extraction features 12a of the first waveguide 1a are straight and inclined at an angle 2065 with respect to a lateral direction between the sides 22a, 24a of the first waveguide 1a. In a lateral direction between the sides 22b, 24b of the second waveguide 1b, the light extraction features 12b of the second waveguide 1b are curved and have negative optical power with respect to the reflected input light rays 2074 that are reflected from the reflective end 4b. The light extraction features 12 of the first waveguide 1a are straight and inclined with respect to a lateral direction between the sides 22a, 24a of the first waveguide 1a.

Advantageously the waveguide 1b may only be operated in wide angle mode, and have features 12b that are angularly aligned at side 24b to features 12a. at side 22a of waveguide 1a. Thus the visibility of seam between the two waveguides may be increased. Further, the waveguide 1a is arranged with features 12a that have zero optical power. Advantageously the luminance of the output light at the side 22a increases for an observer that moves towards the side 22a. Such a luminance increase is advantageously perceived as a comfortable luminance change. By way of comparison the arrangement of FIG. 29C will become darker at the side 22a as the observer moves towards the side 22a. Such a luminance change is perceived as less comfortable and is described further in U.S. Patent Publ. No. 2017-0339398, incorporated by reference herein in its entirety.

Figure 39A:
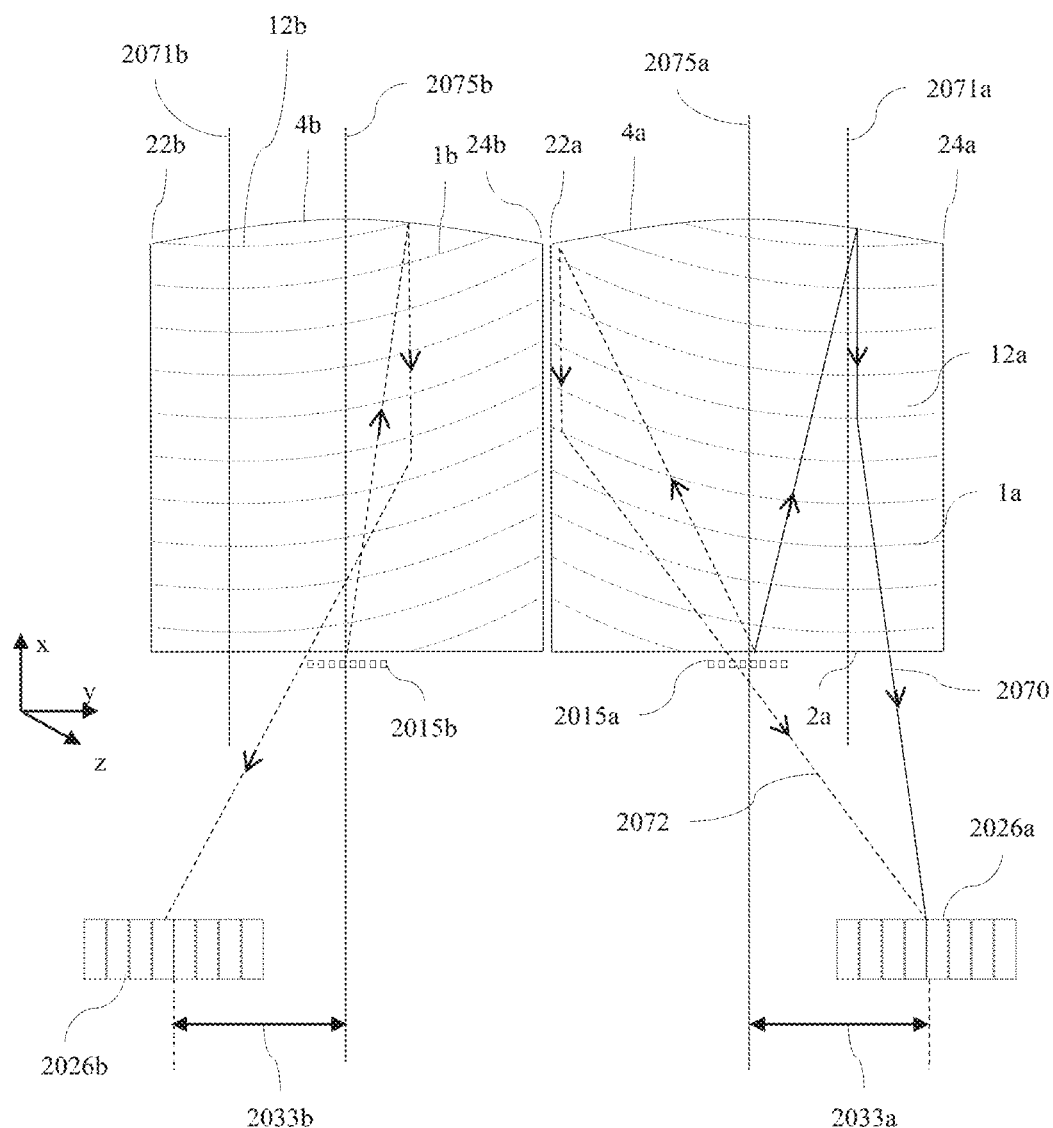
FIG. 39A is a schematic diagram illustrating in perspective front view a segmented directional backlight comprising curved light extraction features that have optical axes that are offset with respect to the respective curved reflective end in opposite senses, in accordance with the present disclosure.

FIG. 39A is a schematic diagram illustrating in perspective front view segmented directional backlights 1a, 1b comprising curved light extraction features 112a, 12b that have optical axes that are offset with respect to the respective curved reflective end in opposite senses. The reflective end 4b of the second waveguide 1b and the light extraction features 12b of the second waveguide 1b have respective optical axes 2075b, 2071b that are offset from each other in the lateral direction in an opposite sense from the sense in which the optical axes 2075a, 2071a of the reflective end 4a of the first waveguide 1a and the light extraction features 12a of the first waveguide 1a are offset. The light extraction features 12b of the second waveguide 1b are inclined with respect to the lateral direction between the sides 22b, 24b of the second waveguide 1b in an opposite sense from the sense in which the light extraction features 12a of the first waveguide 1a are inclined with respect to the lateral direction between the sides 22a, 24b of the first waveguide 1a. The left and tight segments may thus have symmetric optical properties, to advantageously provide a centrally located segmented directional display.

Figure 39B:
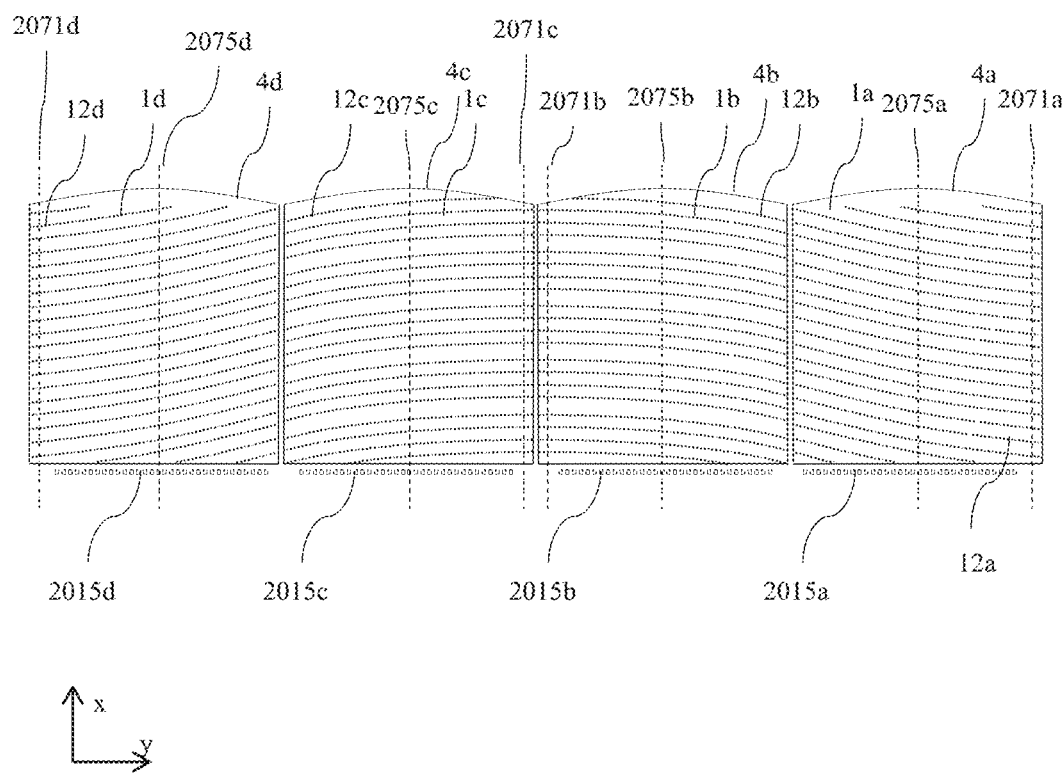
FIG. 39B is a schematic diagram illustrating in front view a segmented directional backlight comprising four waveguides comprising light extraction features that have optical axes that are offset with respect to the respective curved reflective end, in accordance with the present disclosure.

FIG. 39B is a schematic diagram illustrating in front view a segmented directional backlight comprising four waveguides comprising light extraction features that have optical axes 2071a-d that are offset with respect to the respective curved reflective ends 4a-d.

Advantageously, the curvature of the features 12b, 12d may be reduced to achieve reduced optical power across the width of the respective waveguides 1a, 1b. Aberrations may be reduced, and uniformity of wide mode viewing improved.

The present embodiments refer to lateral control of angular output of directional display apparatuses. In automotive applications, it is desirable to reduce reflections from glass surfaces in the vehicle, particularly from windscreens for driver information displays and center stack displays.

Figure 40A:
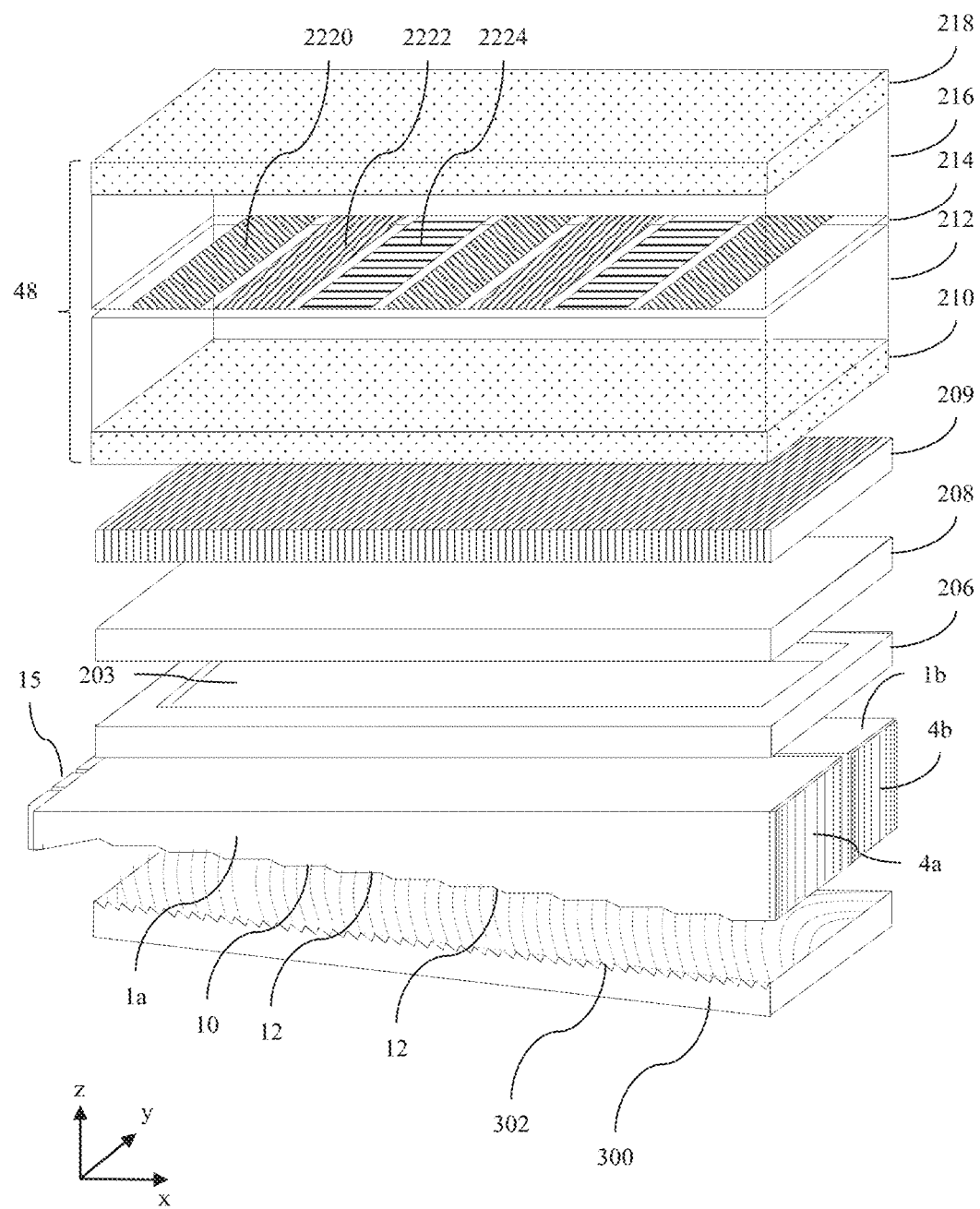
FIG. 40A is a schematic diagram illustrating in perspective side view a directional display comprising segmented directional backlights and a light control film, in accordance with the present disclosure.
Figure 40B:
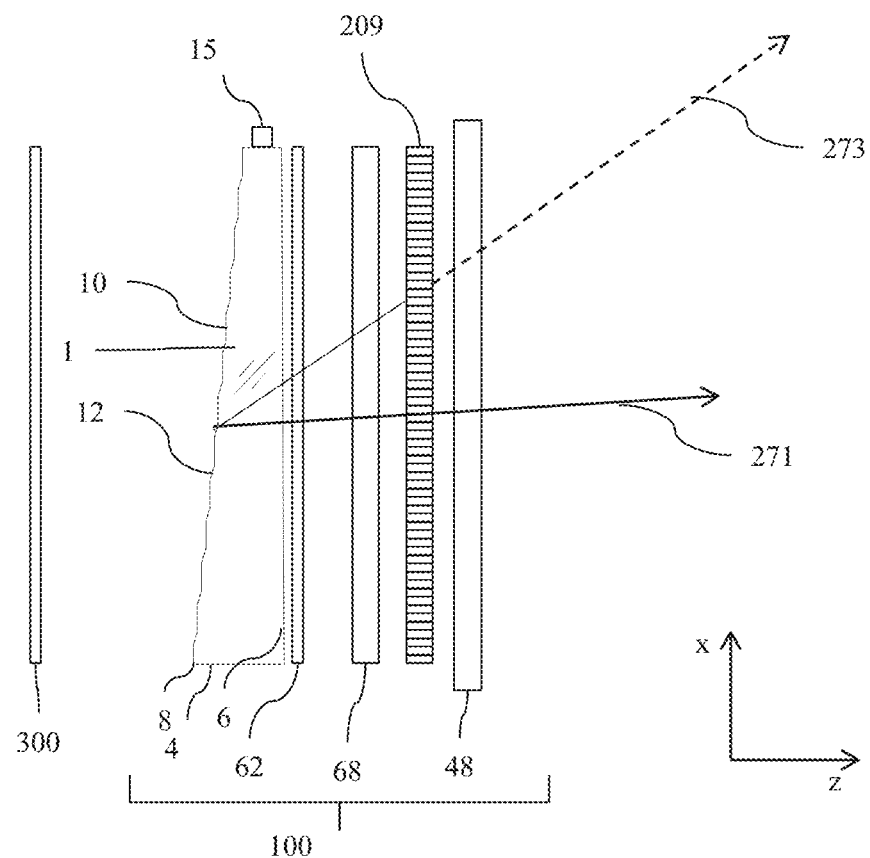
FIG. 40B is a schematic diagram illustrating in side view light output from a directional display comprising a directional backlight and a light control film, in accordance with the present disclosure.
Figure 41:
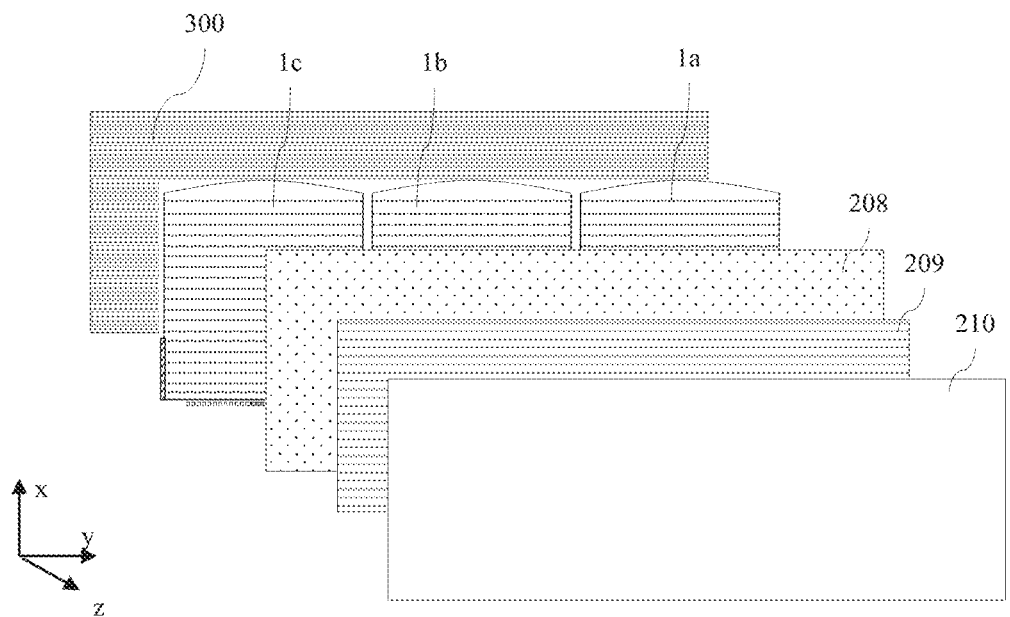
FIG. 41 is a schematic diagram illustrating in perspective front view a directional display comprising segmented directional backlights and a light control film, in accordance with the present disclosure.

FIG. 40A is a schematic diagram illustrating in perspective side view a directional display comprising segmented directional backlights and a light control film (LCF) 209; and FIG. 40B is a schematic diagram illustrating in side view light output from a directional display comprising a directional backlight and LCF 209. Further FIG. 41 is a schematic diagram illustrating in perspective front view a directional display backlight comprising segmented directional backlights and a light control film 209

LCF 209 may comprise a micro-louver structure such as ALCF™ from 3M Corporation and may be provided with substrates of controlled birefringence. LCF 209 may be arranged between a reflective polarizer in optical stack 208 and an absorbing polarizer 210 of an LCD spatial light modulator 48. As illustrated in FIG. 40B, rays 271 may be provided on-axis and with lateral directionality preserved, whereas rays 273 that are off-axis in the x-z plane are attenuated by the LCF 209. Advantageously reflections from windscreens are reduced, and night time operation enhanced. Further lateral directionality is preserved so that increased stray light reduction may be achieved as described elsewhere herein.

Figure 42:
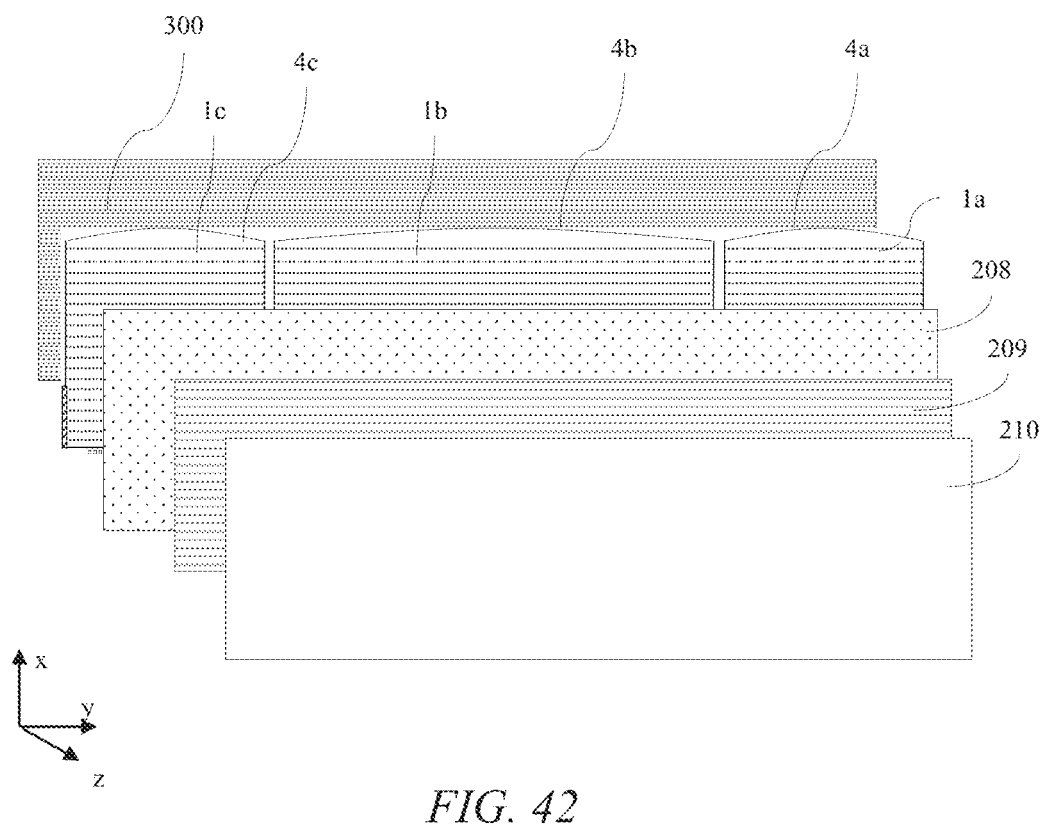
FIG. 42 is a schematic diagram illustrating in perspective front view a directional display comprising waveguides with different aspect ratios, in accordance with the present disclosure.

FIG. 42 is a schematic diagram illustrating in perspective front view a directional display backlight comprising waveguides 1a, 1b, 1c with different aspect ratios. In an illustrative example the waveguides 1a, 1c may be square whereas the waveguide 1b may have a 16:9 aspect ratio.

Advantageously, aberrations may be reduced in the switchable privacy waveguides 1a, 1c so that improved off-axis privacy performance may be achieved due to the reduced numerical aperture of the reflective ends 4a, 4c. Wider aspect ratio central waveguide 1b may be provided to advantageously achieve increased display active area for the wide field of view operation. The increased aberrations of the central waveguide may be more easily compensated in wide angle mode operation in comparison to privacy mode operation.

It may be desirable to achieve further reduction of seam visibility between adjacent waveguides 1a, 1b.

Figure 43:
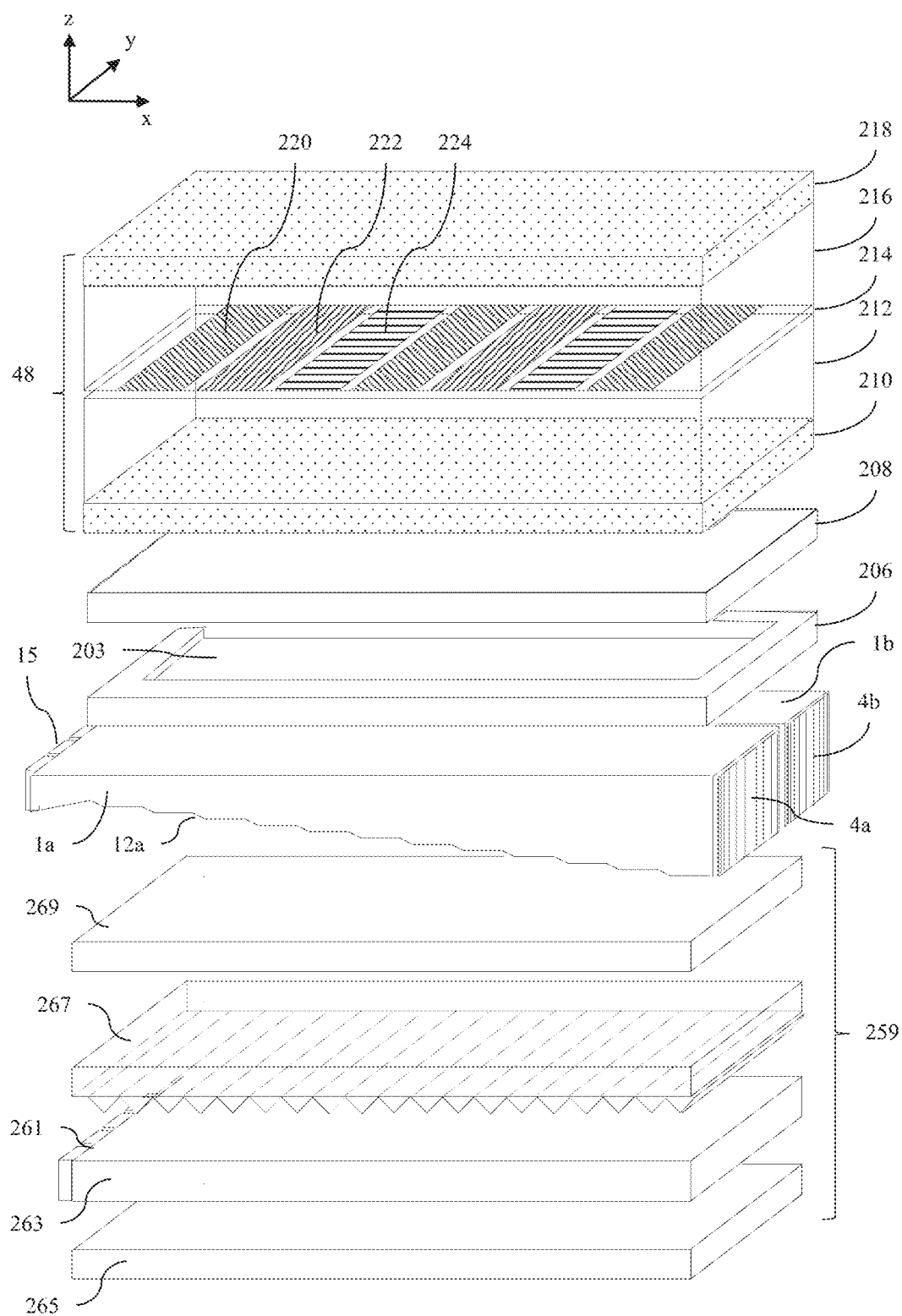
FIG. 43 is a schematic diagram illustrating in perspective front view a directional display comprising segmented directional backlights of and a wide angle backlight, in accordance with the present disclosure.

FIG. 43 is a schematic diagram illustrating in perspective front view a directional display comprising segmented directional backlights comprising waveguides 1a, 1b and a wide angle backlight 259. Wide angle backlight 259 may comprise light sources 261, scattering waveguide 263, rear scattering or planar reflector 265, light deflecting film 267 such as BEF™ from 3M Corporation and a diffuser layer 269. In operation in wide angle mode, the light sources 261 are driven and light directed into waveguide 263 from which it is scattered onto rear reflector 265 and light deflecting film 267. Uniform illumination may be provided across the area of diffuser 269 to illuminate the rear of directional waveguides 1a, 1b.

In Privacy modes of operation, each of the waveguides 1a, 1b may be arranged to direct light to respective display users, and light sources 261 are un-driven. Facets 12a, 12b may be coated to prevent light transmission into the wide angle backlight 259 and degradation of privacy mode of operation.

Advantageously the backlight 259 may hide gaps between the waveguides 1a, 1b and provide uniform illumination in a wide angle mode of operation. In Privacy modes of operation, advantageously multiple display users may be illuminated independently.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional display device comprising:
   plural waveguides, wherein each waveguide comprises:
   an input end arranged to receive input light;
   a reflective end;
   first and second, opposed guide surfaces extending between the input end and the reflective end for guiding light along the waveguide from the input end to the reflective end for reflection of the input light back along the waveguide as reflected input light; and
   sides extending between the opposed guide surfaces and between the input end and the reflective end,
   wherein the first guide surface is arranged to guide light by total internal reflection, and the second guide surface comprises light extraction features and intermediate regions between the light extraction features, the light extraction features being arranged to deflect the reflected input light in directions allowing exit through the first guide surface as output light, the intermediate regions being arranged to direct light along the waveguide without extraction; and
   in respect of each of the plural waveguides, an array of light sources disposed at different input positions along the input side of the waveguide and arranged to input input light into the waveguide,
   a transmissive spatial light modulator, the plural waveguides being arranged in a tiled array alongside each other with the first guide surfaces of the plural waveguides facing the spatial light modulator and the first ends of the plural waveguides on the same side of the array of plural waveguides, the spatial light modulator being arranged to receive and modulate the output light from each of the plural waveguides;
   the plural waveguides including a first waveguide and a second waveguide that are adjacent, wherein the light extraction features of the second waveguide are shaped differently from the light extraction features of the first waveguide, and, along the sides of the first and second waveguides that are adjacent, the ends of the light extraction features of the second waveguide are aligned angularly with respect to the lateral direction with the ends of the light extraction features of the first waveguide.

2. A directional display device according to claim 1, wherein
   in a lateral direction between the sides of the first waveguide, the light extraction features of the first waveguide are curved and have positive optical power with respect to the reflected input light, and
   in a lateral direction between the sides of the second waveguide, the light extraction features of the second waveguide are curved and have negative optical power with respect to the reflected input light.

3. A directional display device according to claim 1, wherein
   the light extraction features of the first waveguide are straight and inclined with respect to a lateral direction between the sides of the first waveguide, and
   in a lateral direction between the sides of the second waveguide, the light extraction features of the second waveguide are curved and have negative optical power with respect to the reflected input light.

4. A directional display device according to claim 1, wherein the first waveguide is arranged at one end of the array of plural waveguides.

5. A directional display device according to claim 1, wherein the reflective end of each of the plural waveguides has positive optical power in the lateral direction.

6. A directional display device according to claim 5, wherein the reflective end of the first waveguide and the light extraction features of the first waveguide have respective optical axes that are offset from each other in the lateral direction.

7. A directional display device according to claim 1, wherein the sides of the first and second waveguides that are adjacent are separated by a medium having a lower refractive index than the first and second waveguides.

8. A directional display device according to claim 7, wherein the medium that separates the sides of the first and second waveguides that are adjacent is air.

9. A directional display device according to claim 1, wherein the sides of the first and second waveguides that are adjacent are separated by a reflective layer.

10. A directional display device according to claim 1, wherein the first waveguide is arranged to image the light sources disposed at different input positions along the input side of the first waveguide, in the lateral direction, so that the output light from the first waveguide is directed into respective optical windows in output directions that are distributed in dependence on the input positions of the light sources.

11. A directional display device according to claim 1, further comprising a rear reflector disposed behind the second guide surface of each of the plural waveguides, the rear reflector comprising an array of reflective facets arranged to reflect reflected input light that is transmitted through the light extraction features of the first and second waveguides, back through the first and second waveguides to exit through the first guide surface,
   wherein the rear reflector has parts behind each of the plural waveguides and the reflective facets are curved in the lateral direction with different optical power in the parts of the rear reflector behind the first and second waveguides.

12. A directional display device according to claim 11, wherein
the spatial light modulator is arranged to modulate a first polarization component, the directional display device further comprises a reflective polarizer disposed between the first guide surfaces of the plural waveguide and the spatial light modulator and arranged to transmit the first polarization component and to reflect a second polarization component of the output light that is orthogonal to the first polarization component as rejected light, and
the rear reflector further comprises intermediate facets extending between the reflective facets of the rear reflector and inclined in opposite senses from the reflective facets of the rear reflector in a common plane, so that pairs of a reflective facet and an intermediate facet together form corner facets arranged to reflect the rejected light for supply back to the spatial light modulator, the pairs of a reflective facet and an intermediate facet being inclined in a plane that is oriented around the normal to the spatial light modulator so that the rear reflector converts the second polarization component of the rejected light into the first polarization component on reflection.

13. A directional display apparatus comprising:
a directional display device according to claim 1; and
a control system arranged to control the light sources.

14. A directional display device comprising:
plural waveguides, wherein each waveguide comprises:
an input end arranged to receive input light;
a reflective end;
first and second, opposed guide surfaces extending between the input end and the reflective end for guiding light along the waveguide from the input end to the reflective end for reflection of the input light back along the waveguide as reflected input light; and
sides extending between the opposed guide surfaces and between the input end and the reflective end,
wherein the first guide surface is arranged to guide light by total internal reflection, and the second guide surface comprises light extraction features and intermediate regions between the light extraction features, the light extraction features being arranged to deflect the reflected input light in directions allowing exit through the first guide surface as output light, the intermediate regions being arranged to direct light along the waveguide without extraction; and
in respect of each of the plural waveguides, an array of light sources disposed at different input positions along the input side of the waveguide and arranged to input input light into the waveguide,
a transmissive spatial light modulator, the plural waveguides being arranged in a tiled array alongside each other with the first guide surfaces of the plural waveguides facing the spatial light modulator and the first ends of the plural waveguides on the same side of the array of plural waveguides, the spatial light modulator being arranged to receive and modulate the output light from each of the plural waveguides;
the plural waveguides including a first waveguide and a second waveguide that are adjacent, wherein
in a lateral direction between the sides of the first waveguide, the light extraction features of the first waveguide are curved and have positive optical power with respect to the reflected input light, and
in a lateral direction between the sides of the second waveguide, the light extraction features of the second waveguide are straight and have zero optical power with respect to the reflected input light, or are curved and have negative optical power with respect to the reflected input light.

15. A directional display device according to claim 14, wherein the first waveguide is arranged at one end of the array of plural waveguides.

16. A directional display device according to claim 14, wherein the reflective end of each of the plural waveguides has positive optical power in the lateral direction.

17. A directional display device according to claim 16, wherein the reflective end of the first waveguide and the light extraction features of the first waveguide have respective optical axes that are offset from each other in the lateral direction.

18. A directional display device according to claim 14, wherein, in the lateral direction between the sides of the second waveguide, the light extraction features of the second waveguide have negative optical power with respect to the reflected input light.

19. A directional display device according to claim 14, wherein the sides of the first and second waveguides that are adjacent are separated by a medium having a lower refractive index than the first and second waveguides.

20. A directional display device according to claim 19, wherein the medium that separates the sides of the first and second waveguides that are adjacent is air.

21. A directional display device according to claim 14, wherein the sides of the first and second waveguides that are adjacent are separated by a reflective layer.

22. A directional display device according to claim 14, wherein, along the sides of the first and second waveguides that are adjacent, the ends of the light extraction features of the second waveguide are aligned angularly with respect to the lateral direction with the ends of the light extraction features of the first waveguide.

23. A directional display device according to claim 14, wherein the first waveguide is arranged to image the light sources disposed at different input positions along the input side of the first waveguide, in the lateral direction, so that the output light from the first waveguide is directed into respective optical windows in output directions that are distributed in dependence on the input positions of the light sources.

24. A directional display device according to claim 14, further comprising a rear reflector disposed behind the second guide surface of each of the plural waveguides, the rear reflector comprising an array of reflective facets arranged to reflect reflected input light that is transmitted through the light extraction features of the first and second waveguides, back through the first and second waveguides to exit through the first guide surface,
wherein the rear reflector has parts behind each of the plural waveguides and the reflective facets are curved in the lateral direction with different optical power in the parts of the rear reflector behind the first and second waveguides.

25. A directional display device according to claim 24, wherein
the spatial light modulator is arranged to modulate a first polarization component,
the directional display device further comprises a reflective polarizer disposed between the first guide surfaces of the plural waveguide and the spatial light modulator and arranged to transmit the first polarization component and to reflect a second polarization component of the output light that is orthogonal to the first polarization component as rejected light, and the rear reflector further comprises intermediate facets extending between the reflective facets of the rear reflector and inclined in opposite senses from the reflective facets of the rear reflector in a common plane, so that pairs of a reflective facet and an intermediate facet together form corner facets arranged to reflect the rejected light for supply back to the spatial light modulator, the pairs of a reflective facet and an intermediate facet being inclined in a plane that is oriented around the normal to the spatial light modulator so that the rear reflector converts the second polarization component of the rejected light into the first polarization component on reflection.

26. A directional display apparatus comprising:
a directional display device according to claim 14; and
a control system arranged to control the light sources.

27. A directional display device comprising:
plural waveguides, wherein each waveguide comprises:
an input end arranged to receive input light;
a reflective end;
first and second, opposed guide surfaces extending between the input end and the reflective end for guiding light along the waveguide from the input end to the reflective end for reflection of the input light back along the waveguide as reflected input light; and
sides extending between the opposed guide surfaces and between the input end and the reflective end,
wherein
the reflective end has positive optical power in the lateral direction between the sides of the waveguide, and
the first guide surface is arranged to guide light by total internal reflection, and the second guide surface comprises light extraction features and intermediate regions between the light extraction features, the light extraction features being arranged to deflect the reflected input light in directions allowing exit through the first guide surface as output light, the intermediate regions being arranged to direct light along the waveguide without extraction; and
in respect of each of the plural waveguides, an array of light sources disposed at different input positions along the input side of the waveguide and arranged to input input light into the waveguide,
a transmissive spatial light modulator, the plural waveguides being arranged in a tiled array alongside each other with the first guide surfaces of the plural waveguides facing the spatial light modulator and the first ends of the plural waveguides on the same side of the array of plural waveguides, the spatial light modulator being arranged to receive and modulate the output light from each of the plural waveguides;
the plural waveguides including a first waveguide and a second waveguide that are adjacent, wherein the light extraction features of the second waveguide are shaped differently from the light extraction features of the first waveguide.

28. A directional display device according to claim 27, wherein,
in a lateral direction between the sides of the first waveguide, the light extraction features of the first waveguide are curved and have positive optical power with respect to the reflected input light, and the reflective end of the first waveguide and the light extraction features of the first waveguide have respective optical axes that are offset from each other in the lateral direction.

29. A directional display device according to claim 28, wherein, in a lateral direction between the sides of the second waveguide, the light extraction features of the second waveguide are curved and have negative optical power with respect to the reflected input light.

30. A directional display device according to claim 28, wherein, in a lateral direction between the sides of the second waveguide, the light extraction features of the second waveguide are straight.

31. A directional display device according to claim 28, wherein, in a lateral direction between the sides of the second waveguide, the light extraction features of the second waveguide are curved and have positive optical power with respect to the reflected input light.

32. A directional display device according to claim 31, wherein, the reflective end of the second waveguide and the light extraction features of the second waveguide have respective optical axes that are offset from each other in the lateral direction in an opposite sense from the sense in which the optical axes of the reflective end of the first waveguide and the light extraction features of the first waveguide are offset.

33. A directional display device according to claim 27, wherein the light extraction features of the first waveguide are straight and inclined with respect to a lateral direction between the sides of the first waveguide.

34. A directional display device according to claim 33, wherein, in a lateral direction between the sides of the second waveguide, the light extraction features of the second waveguide are curved and have negative optical power with respect to the reflected input light.

35. A directional display device according to claim 33, wherein, in a lateral direction between the sides of the second waveguide, the light extraction features of the second waveguide are straight.

36. A directional display device according to claim 35, wherein the light extraction features of the second waveguide are inclined with respect to the lateral direction between the sides of the second waveguide in an opposite sense from the sense in which the light extraction features of the first waveguide are inclined with respect to the lateral direction between the sides of the first waveguide.

37. A directional display device according to claim 27, wherein the first waveguide is arranged at one end of the array of plural waveguides.

38. A directional display device according to claim 27, wherein the sides of the first and second waveguides that are adjacent are separated by a medium having a lower refractive index than the first and second waveguides.

39. A directional display device according to claim 38 wherein the medium that separates the sides of the first and second waveguides that are adjacent is air.

40. A directional display device according to claim 27, wherein the sides of the first and second waveguides that are adjacent are separated by a reflective layer.

41. A directional display device according to claim 27 wherein, along the sides of the first and second waveguides that are adjacent, the ends of the light extraction features of the second waveguide are aligned angularly with respect to the lateral direction with the ends of the light extraction features of the first waveguide.

42. A directional display device according to claim 27, wherein the first waveguide is arranged to image the light sources disposed at different input positions along the input side of the first waveguide, in the lateral direction, so that the output light from the first waveguide is directed into respective optical windows in output directions that are distributed in dependence on the input positions of the light sources.

43. A directional display device according to claim 27, further comprising a rear reflector disposed behind the second guide surface of each of the plural waveguides, the rear reflector comprising an array of reflective facets arranged to reflect reflected input light that is transmitted through the light extraction features of the first and second waveguides, back through the first and second waveguides to exit through the first guide surface, wherein the rear reflector has parts behind each of the plural waveguides and the reflective facets are curved in the lateral direction with different optical power in the parts of the rear reflector behind the first and second waveguides.

44. A directional display device according to claim 43, wherein the spatial light modulator is arranged to modulate a first polarization component, the directional display device further comprises a reflective polarizer disposed between the first guide surfaces of the plural waveguide and the spatial light modulator and arranged to transmit the first polarization component and to reflect a second polarization component of the output light that is orthogonal to the first polarization component as rejected light, and the rear reflector further comprises intermediate facets extending between the reflective facets of the rear reflector and inclined in opposite senses from the reflective facets of the rear reflector in a common plane, so that pairs of a reflective facet and an intermediate facet together form corner facets arranged to reflect the rejected light for supply back to the spatial light modulator, the pairs of a reflective facet and an intermediate facet being inclined in a plane that is oriented around the normal to the spatial light modulator so that the rear reflector converts the second polarization component of the rejected light into the first polarization component on reflection.

45. A directional display apparatus comprising:

a directional display device according to claim 27; and a control system arranged to control the light sources.

* * * * *